(12) United States Patent
Toma et al.

(10) Patent No.: US 11,310,507 B2
(45) Date of Patent: *Apr. 19, 2022

(54) DATA OUTPUT APPARATUS, DATA OUTPUT METHOD, AND DATA GENERATION METHOD

(71) Applicant: Panasonic Intellectual Property Management Co., Ltd., Osaka (JP)

(72) Inventors: Tadamasa Toma, Osaka (JP); Masayuki Kozuka, Osaka (JP); Takahiro Nishi, Nara (JP); Kengo Terada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/825,575

(22) Filed: Mar. 20, 2020

(65) Prior Publication Data

US 2020/0221096 A1 Jul. 9, 2020

Related U.S. Application Data

(63) Continuation of application No. 16/184,323, filed on Nov. 8, 2018, now Pat. No. 10,645,390, which is a (Continued)

(30) Foreign Application Priority Data

Jun. 4, 2015 (JP) ................................ 2015-114300

(51) Int. Cl.
*H04N 19/136* (2014.01)
*H04N 19/85* (2014.01)
(Continued)

(52) U.S. Cl.
CPC ......... *H04N 19/136* (2014.11); *H04N 7/0255* (2013.01); *H04N 7/08* (2013.01);
(Continued)

(58) Field of Classification Search
None
See application file for complete search history.

(56) References Cited

U.S. PATENT DOCUMENTS 8,994,744 B2    3/2015  Sterling
9,219,898 B2   12/2015  Doser
(Continued)

FOREIGN PATENT DOCUMENTS

CN    103843058    6/2014
EP    1 845 704   10/2007
(Continued)

OTHER PUBLICATIONS

International Search Report of PCT application No. PCT/JP2015/003015 dated Aug. 4, 2015.
(Continued)

*Primary Examiner* — Reza Aghevli
(74) *Attorney, Agent, or Firm* — Wenderoth, Lind & Ponack, L.L.P.

(57) ABSTRACT

A data output apparatus includes: a video decoder that decodes a video stream to generate a first video signal; an external metadata acquisition unit that acquires one or more pieces of metadata corresponding to one or more first conversion modes; an HDR metadata interpreter that interprets one of the one or more pieces of metadata to acquire characteristic data and conversion auxiliary data; a DR converter that supports one or more second conversion modes and performs conversion processing of a luminance range of the first video signal based on the conversion auxiliary data to generate a second video signal; and an
(Continued)

HDMI output unit that outputs the second video signal to a display apparatus.

2 Claims, 45 Drawing Sheets

Related U.S. Application Data continuation of application No. 15/006,820, filed on Jan. 26, 2016, now Pat. No. 10,171,812, which is a continuation of application No. PCT/JP2015/003015, filed on Jun. 17, 2015.

(60) Provisional application No. 62/018,010, filed on Jun. 27, 2014.

(51) Int. Cl.
| | |
|---|---|
| H04N 19/44 | (2014.01) |
| H04N 19/46 | (2014.01) |
| H04N 19/70 | (2014.01) |
| H04N 21/84 | (2011.01) |
| H04N 21/41 | (2011.01) |
| H04N 21/43 | (2011.01) |
| H04N 21/44 | (2011.01) |
| H04N 7/08 | (2006.01) |
| H04N 21/4363 | (2011.01) |
| H04N 21/462 | (2011.01) |
| H04N 21/4402 | (2011.01) |
| H04N 21/63 | (2011.01) |
| H04N 7/025 | (2006.01) |
| H04N 21/436 | (2011.01) |
| H04N 21/61 | (2011.01) |
| H04N 5/57 | (2006.01) |

(52) U.S. Cl.
CPC ............ *H04N 19/44* (2014.11); *H04N 19/46* (2014.11); *H04N 19/70* (2014.11); *H04N 19/85* (2014.11); *H04N 21/4122* (2013.01); *H04N 21/43635* (2013.01); *H04N 21/4402* (2013.01); *H04N 21/4621* (2013.01); *H04N 21/4622* (2013.01); *H04N 21/631* (2013.01); *H04N 21/84* (2013.01); *H04N 5/57* (2013.01); *H04N 21/43615* (2013.01); *H04N 21/6112* (2013.01)

(56) References Cited

U.S. PATENT DOCUMENTS

| | | | | |
|---|---|---|---|---|
| 9,264,683 | B2* | 2/2016 | Hattori | G06T 5/007 |
| 9,536,275 | B1* | 1/2017 | Diard | G06T 15/005 |
| 9,679,365 | B2* | 6/2017 | Zhai | H04N 19/46 |
| 9,681,091 | B2* | 6/2017 | Elliott | H04N 7/01 |
| 9,706,184 | B2* | 7/2017 | Uchimura | G11B 27/329 |
| 9,754,629 | B2 | 9/2017 | Mertens | |
| 10,015,505 | B2* | 7/2018 | Hattori | H04N 19/85 |
| 10,728,567 | B2* | 7/2020 | Hattori | G09G 5/02 |
| 10,798,398 | B2* | 10/2020 | Hattori | H04N 19/70 |
| 2007/0223813 | A1* | 9/2007 | Segall | H04N 1/6027 |
| | | | | 382/166 |
| 2011/0090959 | A1 | 4/2011 | Wiegand | |
| 2011/0128438 | A1* | 6/2011 | Yamashita | H04N 9/04513 |
| | | | | 348/384.1 |
| 2011/0194618 | A1* | 8/2011 | Gish | G06T 5/50 |
| | | | | 375/240.25 |
| 2012/0314129 | A1 | 12/2012 | Mertens | |
| 2013/0038790 | A1* | 2/2013 | Seetzen | G09G 5/02 |
| | | | | 348/453 |
| 2013/0120656 | A1* | 5/2013 | Wilson | H04N 21/25825 |
| | | | | 348/563 |
| 2014/0037206 | A1* | 2/2014 | Newton | H04N 1/646 |
| | | | | 382/166 |
| 2014/0044372 | A1 | 2/2014 | Mertens | |
| 2014/0078165 | A1* | 3/2014 | Messmer | H04N 21/440227 |
| | | | | 345/589 |
| 2014/0125696 | A1* | 5/2014 | Newton | G09G 5/377 |
| | | | | 345/629 |
| 2014/0192149 | A1 | 7/2014 | Wang | |
| 2014/0210847 | A1* | 7/2014 | Knibbeler | G06T 5/50 |
| | | | | 345/589 |
| 2015/0063465 | A1* | 3/2015 | Hattori | H04N 19/46 |
| | | | | 375/240.25 |
| 2015/0103919 | A1* | 4/2015 | Hattori | H04N 19/70 |
| | | | | 375/240.25 |
| 2015/0117791 | A1 | 4/2015 | Mertens | |
| 2015/0201222 | A1* | 7/2015 | Mertens | H04N 19/196 |
| | | | | 382/233 |
| 2015/0208024 | A1 | 7/2015 | Takahashi | |
| 2015/0208078 | A1 | 7/2015 | Takahashi | |
| 2015/0208102 | A1 | 7/2015 | Takahashi | |
| 2015/0243243 | A1* | 8/2015 | Greenebaum | H04N 19/182 |
| | | | | 345/506 |
| 2015/0341611 | A1* | 11/2015 | Oh | H04N 5/775 |
| | | | | 386/230 |
| 2015/0358646 | A1* | 12/2015 | Mertens | H04N 9/68 |
| | | | | 382/166 |
| 2016/0014422 | A1 | 1/2016 | Su | |
| 2016/0080714 | A1* | 3/2016 | Tsukagoshi | H04N 19/85 |
| | | | | 348/453 |
| 2016/0142695 | A1* | 5/2016 | Uchimura | G11B 27/105 |
| | | | | 386/300 |
| 2016/0173845 | A1* | 6/2016 | Uchimura | H04N 9/8707 |
| | | | | 386/300 |
| 2016/0191883 | A1* | 6/2016 | Uchimura | G11B 20/10 |
| | | | | 386/300 |
| 2016/0212399 | A1* | 7/2016 | Uchimura | H04N 19/70 |
| 2016/0292834 | A1 | 10/2016 | Tsuru | |
| 2016/0366449 | A1 | 12/2016 | Stessen | |
| 2017/0064385 | A1 | 3/2017 | Nakajima | |
| 2017/0070701 | A1 | 3/2017 | Nakajima | |
| 2017/0078706 | A1* | 3/2017 | Van Der Vleuten | H04N 19/46 |
| 2018/0322679 | A1* | 11/2018 | Kunkel | G06K 9/6201 |
| 2018/0367819 | A1* | 12/2018 | Van Der Vleuten | H04N 19/98 |
| 2020/0068229 | A1* | 2/2020 | Tsukagoshi | H04N 5/20 |

FOREIGN PATENT DOCUMENTS

| | | | |
|---|---|---|---|
| EP | 2175660 | 4/2010 | |
| EP | 2 487 892 | 8/2012 | |
| JP | 2007-257641 | 10/2007 | |
| JP | 2008-167418 | 7/2008 | |
| JP | 2011-119828 | 6/2011 | |
| JP | 2012/172460 | 12/2012 | |
| KR | 20150063465 A * | 6/2015 | ............ C04B 38/10 |
| WO | 2008/085150 | 7/2008 | |
| WO | 2011/107905 | 9/2011 | |
| WO | 2012/089766 | 7/2012 | |
| WO | 2013/046095 | 4/2013 | |
| WO | 2013/046096 | 4/2013 | |
| WO | 2014/002901 | 1/2014 | |
| WO | WO-2014002901 A * | 1/2014 | ............ H04N 19/70 |
| WO | 2014/091984 | 6/2014 | |
| WO | WO-2014091984 A1 * | 6/2014 | ............ H04N 19/85 |
| WO | 2014/208344 | 12/2014 | |
| WO | 2014/208345 | 12/2014 | |
| WO | 2014/208346 | 12/2014 | |
| WO | WO-2014208344 A1 * | 12/2014 | ............... H04N 5/76 |
| WO | WO-2014208345 A1 * | 12/2014 | ............ G11B 27/329 |
| WO | WO-2014208346 A1 * | 12/2014 | ............ G11B 20/10 |
| WO | 2015/005189 | 1/2015 | |
| WO | 2015/008683 | 1/2015 | |
| WO | 2015/008684 | 1/2015 | |
| WO | 2015/008685 | 1/2015 | |
| WO | WO-2015005189 A1 * | 1/2015 | ......... H04N 21/4854 |
| WO | WO-2015008683 A1 * | 1/2015 | ............... H04N 7/01 |
| WO | WO-2015008684 A1 * | 1/2015 | ............... H04N 5/76 |
| WO | WO-2015008685 A1 * | 1/2015 | ......... H04N 21/4402 |
| WO | 2015/025726 | 2/2015 | |

(56) References Cited

FOREIGN PATENT DOCUMENTS

| WO | WO-2015025726 A1 | * | 2/2015 | ....... H04N 21/42646 |
| WO | 2015/174108 | | 11/2015 | |
| WO | WO-2015174108 A1 | * | 11/2015 | ............. G09G 5/006 |
| WO | 2016/063746 | | 4/2016 | |
| WO | WO-2016063746 A1 | * | 4/2016 | ............... H04N 9/87 |

OTHER PUBLICATIONS

Extended European Search Report dated May 18, 2017 in the related European Patent Application No. 15811066.8.
Hattori S et al: "AVC: Signalling of Luminance Dynamic Range in Tone mapping information SEI", 102. MPEG Meeting; Oct. 15, 2012-Oct. 19, 2012; Shanghai; (Motion Picture Expert Group or ISO/IEC JTC1/SC29/WG11), No. m26686, Oct. 5, 2012 (Oct. 5, 2012), XP030055019.
English Translation of Chinese Search Report dated Apr. 22, 2019 for the related Chinese Patent Application No. 201580000951.1.
S.Hattori et al: "Signalling of Luminance Dynamic Range in Tone mapping information SEI", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, JCTVC-J0149, pp. 1-7.
Communication pursuant to Article 94(3) EPC dated Feb. 23, 2022 for the related European Patent Application No. 20184242.4, 6 pages.

* cited by examiner

FIG. 4

| | DR CONVERSION ||| HDR CONTROL INFORMATION |||
|---|---|---|---|---|---|---|
| | STATIC HDR METADATA (FOR EACH TITLE) || DYNAMIC HDR METADATA (FOR EACH FRAME) | STATIC HDR METADATA (FOR EACH TITLE) || DYNAMIC HDR METADATA (FOR EACH FRAME) |
| | NECESSARY METADATA | OPTIONAL METADATA | OPTIONAL METADATA | NECESSARY METADATA | OPTIONAL METADATA | OPTIONAL METADATA |
| BASIC SCHEME | NA | NA | NA | METADATA a | METADATA b | NA |
| EXTENDED SCHEME A | METADATA A1 | METADATA A2 | METADATA A3 | METADATA A4 | METADATA A5 | METADATA A6 |
| EXTENDED SCHEME B | METADATA B1 | METADATA B2 | NA | METADATA B4 | NA | NA |
| EXTENDED SCHEME C | NA | NA | NA | METADATA C4 | METADATA C5 | METADATA C6 |
| EXTENDED SCHEME D | METADATA D1 | NA | NA | METADATA B4 | NA | METADATA D6 |
| RESERVE | TBD | TBD | TBD | TBD | TBD | TBD |
| RESERVE | TBD | TBD | TBD | TBD | TBD | TBD |
| RESERVE | TBD | TBD | TBD | TBD | TBD | TBD |
| RESERVE | TBD | TBD | TBD | TBD | TBD | TBD |

FIG. 16

| CONVERSION MODE IN WHICH HDR METADATA IS PROVIDED | PRESENCE OF SUPPORT OF CONVERSION PROCESSING IN DATA OUTPUT APPARATUS | PRESENCE OF SUPPORT OF CONVERSION PROCESSING IN DISPLAY APPARATUS | INSTRUCTIONS OF HDR METADATA INTERPRETER |
|---|---|---|---|
| MODE 1 | YES | NO | DR CONVERTER CONVERTS DYNAMIC RANGE IN MODE 2.<br>* REPRODUCIBILITY FOR MASTER IMAGE IS HIGHER IN MODE 2 THAN IN MODE 1. |
| MODE 2 | YES | NO | |
| MODE 3 | NO | NO | |

FIG. 17

| CONVERSION MODE IN WHICH HDR METADATA IS PROVIDED | PRESENCE OF SUPPORT OF CONVERSION PROCESSING IN DATA OUTPUT APPARATUS | PRESENCE OF SUPPORT OF CONVERSION PROCESSING IN DISPLAY APPARATUS | INSTRUCTIONS OF HDR METADATA INTERPRETER |
|---|---|---|---|
| MODE 1 | YES | YES | DR CONVERTER DOES NOT PERFORM CONVERSION PROCESSING AND TRANSMITS METADATA CORRESPONDING TO CONVERSION PROCESSING IN MODE 2 AS HDMI CONTROL INFORMATION, ETC. DISPLAY APPARATUS CONVERTS DYNAMIC RANGE IN MODE 2. * REPRODUCIBILITY FOR MASTER IMAGE IS HIGHER IN MODE 2 THAN IN MODE 1. |
| MODE 2 | NO | YES | |
| MODE 3 | NO | NO | |

FIG. 18

| CONVERSION MODE IN WHICH HDR METADATA IS PROVIDED | PRESENCE OF SUPPORT OF CONVERSION PROCESSING IN DATA OUTPUT APPARATUS | PRESENCE OF SUPPORT OF CONVERSION PROCESSING IN DISPLAY APPARATUS | WHETHER DATA OUTPUT APPARATUS CAN ACQUIRE PARAMETER OF DISPLAY APPARATUS REQUIRED FOR CONVERSION PROCESSING | INSTRUCTIONS OF HDR METADATA INTERPRETER |
|---|---|---|---|---|
| MODE 1 | YES | YES | YES | DR CONVERTER CONVERTS DYNAMIC RANGE IN MODE 2. DATA OUTPUT APPARATUS ACQUIRES REQUIRED PARAMETER SUCH AS PEAK LUMINANCE OF DISPLAY APPARATUS SEPARATELY FROM DISPLAY APPARATUS. |
| MODE 2 | YES | NO | YES | |
| MODE 3 | YES | NO | NO | * WHETHER PARAMETER OF DISPLAY APPARATUS IS REQUIRED DIFFERS DEPENDING ON CONVERSION MODE. |

FIG. 20

| RESOLUTION AND DYNAMIC RANGE OF VIDEO SIGNAL IN CONTENT | RESOLUTION OF DISPLAY APPARATUS AND PRESENCE OF SUPPORT OF HDR SIGNAL | OUTPUT SIGNAL FROM DATA OUTPUT APPARATUS |
|---|---|---|
| 4K+HDR | 4K+HDR | 4K+HDR |
| 4K+HDR | 2K+HDR | 2K+HDR |
| 4K+HDR | 2K+SDR | 2K+SDR |
| 2K+HDR | 4K+HDR | 4K+HDR |
| 2K+HDR | 2K+HDR | 2K+HDR |
| 2K+HDR | 2K+SDR | 2K+SDR |
| 2K+SDR | 4K+HDR | 4K+SDR |
| 2K+SDR | 2K+HDR | 2K+SDR |
| 2K+SDR | 2K+SDR | 2K+SDR |

FIG. 28

| | SDR (FIRST LUMINANCE RANGE) | HDR (SECOND LUMINANCE RANGE) |
|---|---|---|
| 2K (FIRST RESOLUTION) | 2K_SDR-ENABLED BD | 2K_HDR-ENABLED BD |
| 4K (SECOND RESOLUTION) | 4K_SDR-ENABLED BD | 4K_HDR-ENABLED BD |

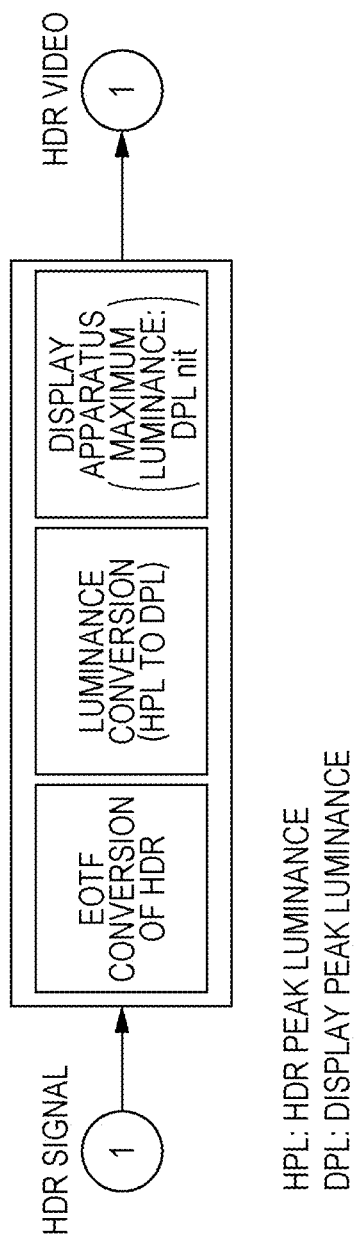

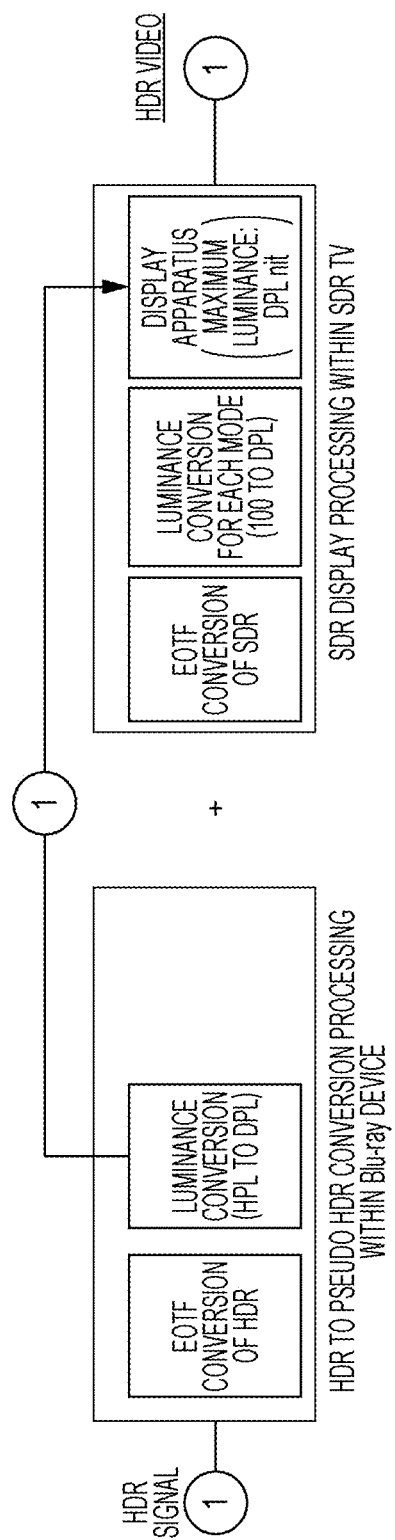

HPL: HDR PEAK LUMINANCE
DPL: DISPLAY PEAK LUMINANCE
CPL: CONTENT PEAK LUMINANCE
CAL: CONTENT AVERAGE LUMINANCE

HPL: HDR PEAK LUMINANCE
DPL: DISPLAY PEAK LUMINANCE
CPL: CONTENT PEAK LUMINANCE
CAL: CONTENT AVERAGE LUMINANCE

DATA OUTPUT APPARATUS, DATA OUTPUT METHOD, AND DATA GENERATION METHOD

BACKGROUND

1. Technical Field

The present disclosure relates to a data output apparatus, a data output method, and a data generation method.

2. Description of the Related Art

Conventionally, an image signal processing apparatus for improving a displayable luminance level is disclosed (for example, refer to Patent Literature 1).

CITATION LIST

Patent Literature

PTL 1: Unexamined Japanese Patent Publication No. 2008-167418

SUMMARY

In one general aspect, the techniques disclosed here feature a data output apparatus including: a decoder that decodes a video stream to generate a first video signal; an acquisition unit that acquires one or more pieces of metadata corresponding to one or more first conversion modes in which a luminance range of a video signal is converted; an interpreter that interprets one of the one or more pieces of metadata to acquire characteristic data indicating a luminance range of the first video signal, and conversion auxiliary data for converting the luminance range of the first video signal; a control information generator that converts the characteristic data into control information according to a predetermined transmission protocol; a converter that supports one or more second conversion modes in which a luminance range of a video signal is converted, the converter for performing conversion processing of the luminance range of the first video signal in one of the one or more second conversion modes based on the conversion auxiliary data to generate a second video signal with a luminance range narrower than the luminance range of the first video signal; and an output unit that outputs the second video signal and the control information to a display apparatus in accordance with the transmission protocol.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 4 is a diagram illustrating an example of HDR metadata;

FIG. 16 is a diagram illustrating an example of instructions of an HDR metadata interpreter;

FIG. 17 is a diagram illustrating an example of the instructions of the HDR metadata interpreter;

FIG. 18 is a diagram illustrating an example of the instructions of the HDR metadata interpreter;

FIG. 20 is a diagram illustrating an example of combination of characteristics of a video signal and a display apparatus, and output signals of the data output apparatus;

FIG. 28 is a diagram illustrating types of BD;

FIG. 35A is a diagram illustrating an example of display processing to convert an HDR signal and to perform HDR display within an HDR TV;

FIG. 35B is a diagram illustrating an example of display processing to perform HDR display using an HDR-enabled playback apparatus and SDR TV;

DETAILED DESCRIPTION

Figure 1:
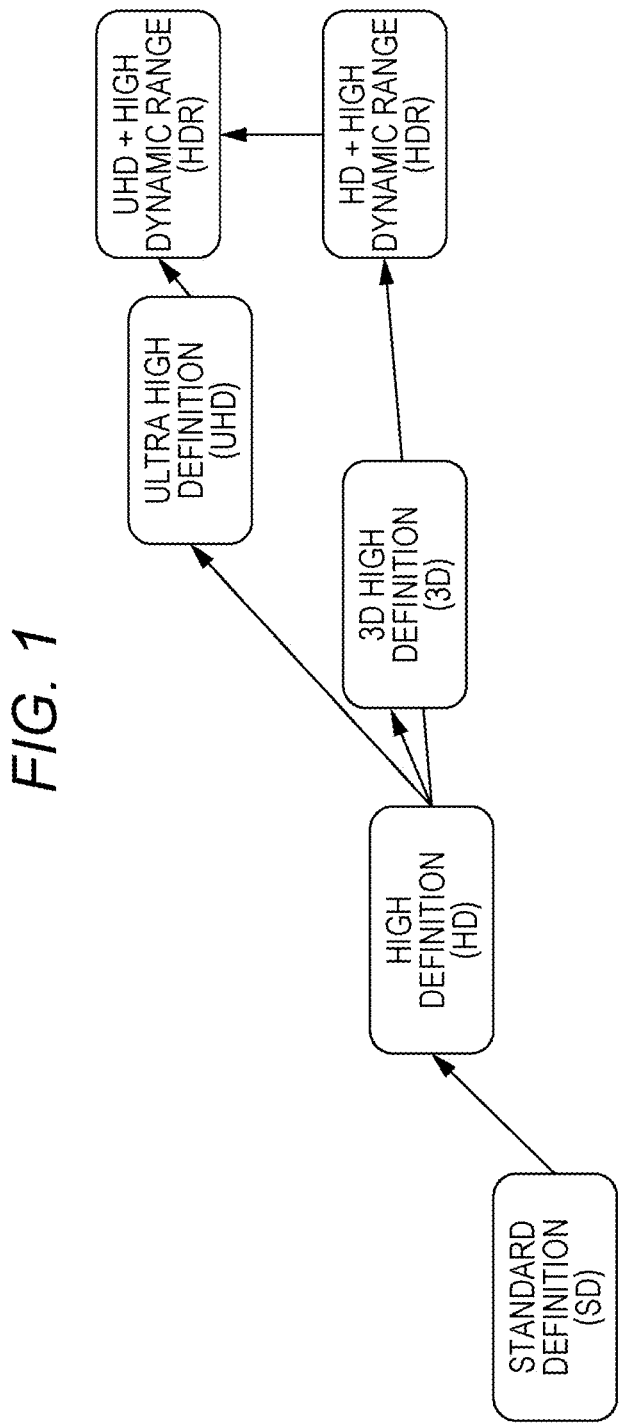
FIG. 1 is a diagram illustrating evolution of video techniques.

A data output apparatus according to one aspect of the present disclosure is a data output apparatus including: a decoder that decodes a video stream to generate a first video signal; an acquisition unit that acquires one or more pieces of metadata corresponding to one or more first conversion modes in which a luminance range of a video signal is converted; an interpreter that interprets one of the one or more pieces of metadata to acquire characteristic data indicating a luminance range of the first video signal, and conversion auxiliary data for converting the luminance range of the first video signal; a control information generator that converts the characteristic data into control information according to a predetermined transmission protocol; a converter that supports one or more second conversion modes in which a luminance range of a video signal is converted, the converter for performing conversion processing of the luminance range of the first video signal in one of the one or more second conversion modes based on the conversion auxiliary data to generate a second video signal with a luminance range narrower than the luminance range of the first video signal; and an output unit that outputs the second video signal and the control information to a display apparatus in accordance with the transmission protocol.

This allows the data output apparatus to change the luminance range of the video signal based on the one or more pieces of metadata, and to output the converted video signal and the control information.

For example, the interpreter may further determine which of the data output apparatus and the display apparatus is to perform the conversion processing based on the one or more first conversion modes, the one or more second conversion modes, and one or more third conversion modes in which a luminance range of a video signal is converted, the one or more third conversion modes being supported by the display apparatus.

This allows the data output apparatus to determine which of the data output apparatus and the display apparatus is to perform the conversion processing based on the first conversion modes corresponding to the one or more pieces of metadata, the second conversion modes supported by the data output apparatus, and the third conversion modes supported by the display apparatus. This allows the data output apparatus to determine the apparatus to perform the conversion processing appropriately.

For example, the converter may support a plurality of second conversion modes including the one or more second conversion modes, and may include a plurality of mode processors that support the plurality of second conversion modes on a one-to-one basis, and perform processing of the supported second conversion modes.

For example, the converter may include a basic processor that performs processing common to the one or more second conversion modes, and one or more extended mode processors that support the one or more second conversion modes on a one-to-one basis, and perform processing of the supported second conversion modes.

For example, the interpreter may further determine a conversion mode which is included in the one or more first conversion modes, and is included in the one or more second conversion modes, as a conversion mode of the conversion processing to be performed by the data output apparatus.

This allows the data output apparatus to determine the conversion mode to be used based on the first conversion modes corresponding to the one or more pieces of metadata and the second conversion modes supported by the data output apparatus.

For example, the interpreter may further determine a conversion mode which is included in the one or more first conversion modes, and is included in at least one of the one or more second conversion modes and the third conversion modes, as a conversion mode of the conversion processing to be performed by the data output apparatus or the display apparatus.

This allows the data output apparatus to determine the conversion mode to be used based on the first conversion modes corresponding to the one or more pieces of metadata, the second conversion modes supported by the data output apparatus, and the third conversion modes supported by the display apparatus.

For example, the acquisition unit may acquire a plurality of pieces of metadata corresponding to a plurality of first conversion modes including the one or more first conversion modes, the converter may support a plurality of second conversion modes including the one or more second conversion modes, and the interpreter may determine, as a conversion mode of the conversion processing to be performed by the data output apparatus or the display apparatus, a conversion mode with highest reproducibility for a master image which is an image that is output without conversion of the luminance range, from among a plurality of conversion modes which are included in the plurality of first conversion modes, and are included in at least one of the plurality of second conversion modes and the third conversion modes.

This allows the data output apparatus to select the conversion mode with highest reproducibility for the master image, and thus to improve image quality of the video displayed.

For example, when the determined conversion mode of the conversion processing is included in the second conversion modes and is not included in the third conversion modes, the interpreter may determine that the data output apparatus is to perform the conversion processing.

For example, when the determined conversion mode of the conversion processing is included in the third conversion modes and is not included in the second conversion modes, the interpreter may determine that the display apparatus is to perform the conversion processing.

For example, the interpreter may further determine the conversion mode of the conversion processing to be performed by the data output apparatus or the display apparatus, according to whether a parameter for each of the plurality of first conversion modes is acquirable from the display apparatus.

This allows the data output apparatus to determine the conversion mode to be used according to whether the parameter of the display apparatus is acquirable, and thus to select more appropriate conversion mode.

For example, the interpreter may determine, as a conversion mode of the conversion processing to be performed by the data output apparatus or the display apparatus, a conversion mode which is included in the plurality of first conversion modes, is included in at least one of the plurality of second conversion modes and the third conversion modes, and for which the parameter is acquirable from the display apparatus.

For example, the parameter may indicate a maximum value of a displayable luminance range of the display apparatus or a displayable display mode of the display apparatus.

For example, the data output apparatus may further include a down conversion unit that generates a third video signal by lowering resolution of the first video signal, and the output unit may further output the third video signal to the display apparatus.

This allows the data output apparatus, for example, to change the resolution of the video signal into resolution suitable for the display apparatus or the like.

For example, the converter may further perform the conversion processing of a luminance range of the third video signal based on the conversion auxiliary data in one of the one or more second conversion modes to generate a fourth video signal with a luminance range narrower than the luminance range of the third video signal, and the output unit may further output the fourth video signal to the display apparatus.

This allows the data output apparatus, for example, to change the resolution and the luminance range of the video signal into resolution and luminance range suitable for the display apparatus or the like.

For example, when the display apparatus does not support display of a video with the resolution of the first video signal, (1) the down conversion unit may generate the third video signal, and (2) the output unit may output the third video signal to the display apparatus.

For example, when the display apparatus does not support display of a video with the luminance range of the first video signal, (1) the converter may generate the second video signal, and (2) the output unit may output the second video signal and the control information to the display apparatus.

A data output method according to one aspect of the present disclosure is a data output method in a data output apparatus. The data output method includes: a decoding step of decoding a video stream to generate a first video signal; an acquisition step of acquiring one or more pieces of metadata corresponding to one or more first conversion modes in which a luminance range of a video signal is converted; an interpretation step of interpreting one of the one or more pieces of metadata to acquire characteristic data indicating a luminance range of the first video signal, and conversion auxiliary data for converting the luminance range of the first video signal; a control information generation step of converting the characteristic data into control information according to a predetermined transmission protocol; a conversion step of generating a second video signal with a luminance range narrower than the luminance range of the first video signal, by a converter that supports one or more second conversion modes in which a luminance range of a video signal is converted performing conversion processing of the luminance range of the first video signal in one of the one or more second conversion modes based on the conversion auxiliary data; and an output step of outputting the second video signal and the control information to a display apparatus in accordance with the transmission protocol.

This allows the data output method to determine which of the data output apparatus and display apparatus is to perform the conversion processing based on the first conversion modes corresponding to the plurality of pieces of metadata, the second conversion modes supported by the data output apparatus, and the third conversion modes supported by the display apparatus. This allows the data output method to determine the apparatus to perform the conversion processing appropriately.

A non-transitory computer-readable recording medium according to one aspect of the present disclosure causes a computer to execute the data output method.

A data generation method according to one aspect of the present disclosure is a data generation method to be performed by a data generation apparatus. The data generation method includes: a first generation step of generating one or more pieces of metadata corresponding to one or more conversion modes in which a luminance range of a video signal is converted; and a second generation step of generating a video stream including the video signal, the one or more pieces of metadata, and a conversion mode number indicating a number of one or more conversion modes.

This allows the data generation method to generate the video stream including the metadata corresponding to the one or more conversion modes. This allows the playback apparatus or the like that plays the video stream to select an appropriate conversion mode.

Note that these general or specific aspects may be implemented using a system, a method, an integrated circuit, a computer program, or a computer-readable recording medium such as a CD-ROM, or may be implemented using any combination of a system, a method, an integrated circuit, a computer program, and a computer-readable recording medium.

Features described above will be mainly described in [10. Example of storage of a plurality of pieces of HDR metadata] to [13. Data output apparatus configuration example 2].

The exemplary embodiment described below indicates one specific example of the present disclosure. Numerical values, shapes, materials, and components, dispositions and connection forms of the components, steps, order of the steps, and the like that are indicated in the following exemplary embodiment are one example, and do not intend to limit the present disclosure. Also, among the components described in the following exemplary embodiment, components that are not described in an independent claim which represents the highest concept are described as optional components.

Exemplary Embodiment

1. Background

An HDR (High Dynamic Range) signal, which is an image signal with a luminance range higher than a luminance range of a conventional image signal, is delivered via a delivery medium, such as a package medium including a Blu-ray (registered trademark, and so on) disc that stores the HDR signal, broadcast, and OTT (Over The Top). Here, OTT means content or service provided on the Internet, such as a website, video, and voice, or a company that provides such content or service. The delivered HDR signal is decoded by a device such as a Blu-ray device. The decoded HDR signal is sent to an HDR-enabled display apparatus (such as a television, projector, tablet, and smart phone), and an HDR video is played by the HDR-enabled display apparatus.

An HDR technique is still in an early stage, and it is assumed that a new HDR scheme will be developed after the HDR technique introduced first is adopted. In this case, the new HDR scheme can be adopted by storing the HDR signal (and metadata) of the newly created HDR scheme in the HDR delivery medium. The present disclosure implements a method and apparatus that maintain compatibility by ensuring HDR playback of a delivery medium that stores a new HDR signal form (metadata) with an original technique without changing a decoding apparatus designed for an original delivery medium (for example, Blu-ray device). This method and apparatus enable an HDR decoding apparatus that supports the new scheme (for example, Blu-ray device) to support processing by the new HDR scheme.

First, transition of video techniques will be described with reference to FIG. 1. FIG. 1 is a diagram illustrating evolution of the video techniques.

Until now, high definition of video has focused on increase in a number of display pixels. So-called 2K video is widely used, from 720×480-pixel Standard Definition (SD) video to 1920×1080-pixel High Definition (HD) video.

In recent years, introduction of so-called 4K video has started with a view toward higher definition of video, including 3840×1920-pixel Ultra High Definition (UHD) video and 4096×1920-pixel 4K video.

In addition to high resolution of video through introduction of 4K, consideration is given to high definition of video through extension of a dynamic range, enlargement of a color gamut, and addition or improvement of a frame rate.

Among those improvements, regarding the dynamic range, HDR (High Dynamic Range) attracts attention as a scheme that supports a luminance range with an extended maximum luminance value for representing bright light including specular reflection light that cannot be represented by current TV signals with brightness more similar to actual brightness while maintaining dark area gradation in conventional video. Specifically, while a scheme of the luminance range supported by conventional TV signals is referred to as SDR (Standard Dynamic Range) with the maximum luminance value of 100 nit, HDR is assumed to extend the maximum luminance value to 1,000 nit or more. Standardization of HDR is under way in organizations such as SMPTE (Society of Motion Picture & Television Engineers) and ITU-R (International Telecommunications Union Radiocommunications Sector).

Assumed specific application of HDR includes broadcast, package media (such as Blu-ray disc), and Internet delivery, similarly to HD and UHD.

Hereinafter, in an HDR-enabled video, luminance of the video includes a luminance value within the luminance range of HDR. A luminance signal obtained through quantization of the luminance value of the video is referred to as an HDR signal. In an SDR-enabled video, luminance of the video includes a luminance value within the luminance range of SDR. A luminance signal obtained through quantization of the luminance value of the video is referred to as an SDR signal.

Figure 2:
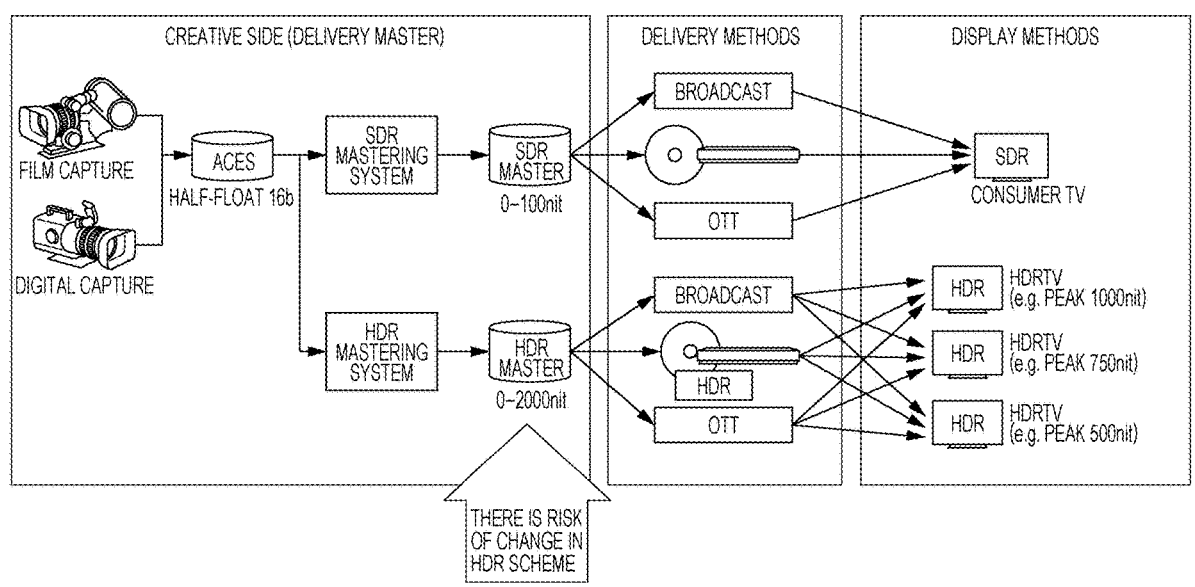
FIG. 2 is a diagram illustrating a relationship among masters, delivery schemes, and display apparatuses in introducing HDR.

2. Relationship Among Masters, Delivery Schemes, and Display Apparatuses in Introducing HDR FIG. 2 is a diagram illustrating a flowchart for producing SDR and HDR masters for home entertainment, and a relationship among delivery media and display apparatuses.

A concept of HDR has been proposed and effectiveness of HDR in a concept level has been confirmed. In addition, a first implementation method of HDR has been proposed. However, HDR content has not been made in large quantities using this method, and the first implementation method has not been verified. Therefore, when full-fledged production of HDR content starts in the future, the current production scheme of HDR, particularly metadata may change.

3. How to Use EOTF

Figure 3:
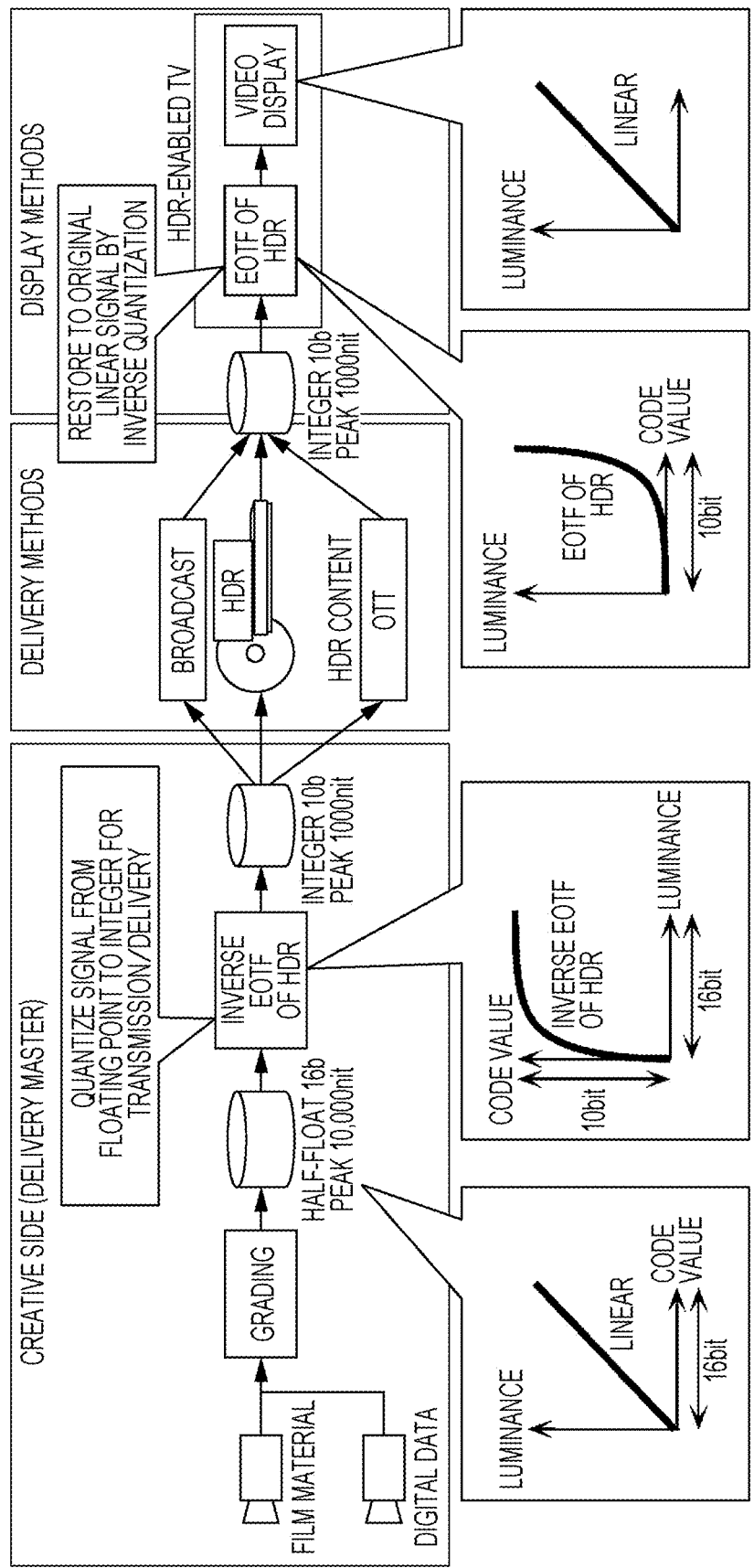
FIG. 3 is an illustrative diagram of a determination method of a code value of a luminance signal to be stored in content, and a process of restoring a luminance value from the code value during playback.

FIG. 3 is an illustrative diagram of a determination method of a code value of the luminance signal to be stored in content, and a process of restoring the luminance value from the code value during playback.

The luminance signal indicating luminance in this example is an HDR-enabled HDR signal. An image after grading is quantized by inverse EOTF of HDR, and the code value corresponding to the luminance value of the image is determined. Processing such as image coding is performed based on this code value, and a video stream is generated. During playback, a decoding result of the stream is converted into a linear signal through inverse quantization based on EOTF of HDR, and the luminance value for each pixel is restored. Hereinafter, quantization of HDR using inverse EOTF is referred to as "inverse EOTF conversion of HDR". Inverse quantization of HDR using EOTF is referred to as "EOTF conversion of HDR". Similarly, quantization of SDR using inverse EOTF is referred to as "inverse EOTF conversion of SDR". Inverse quantization of SDR using EOTF is referred to as "EOTF conversion of SDR".

By using this luminance value and metadata, a video conversion processor performs conversion into the luminance value that can be displayed by a video display unit, so that the video display unit can display the HDR video. For example, when peak luminance of an original HDR video is 2,000 nit and peak luminance of the video display unit is 800 nit, the luminance may be lowered through conversion.

Thus, the scheme of the HDR master is implemented through combination of EOTF and metadata, and the HDR signal. Therefore, there is a possibility that time will come when more efficient EOTF and metadata are developed and an HDR scheme using such EOTF and metadata should be adopted.

Although it is unknown at this time what kind of scheme this new scheme will be, a possibility that EOTF will be changed and a possibility that metadata will be added are conceivable. In this case, the HDR signal itself will also change.

It is an object of the present disclosure to spread the use of HDR by reducing a risk that a user who has purchased an HDR-enabled device needs to purchase a new device again, even when a transmission format of HDR is changed as described above.

4. Metadata

FIG. 4 is a diagram illustrating an example of HDR metadata. The HDR metadata includes conversion auxiliary information used for changing the luminance range of a video signal (DR conversion), and HDR control information. Each piece of the information is one of, for example, static HDR metadata provided for each title, and, for example, dynamic HDR metadata provided for each frame. The static HDR metadata is classified into one of necessary metadata (basic data) and optional metadata (extended data), and the dynamic HDR metadata is classified into optional metadata. Note that details of each piece of the information will be described later.

5. HDR Metadata

Parameters indicating characteristics at a time of mastering in HDR content include the static HDR metadata that is fixed for each title or each playlist, and the dynamic HDR metadata that is variable for each scene. Here, the title and playlist are information indicating a continuously played video signal. Hereinafter, the continuously played video signal is referred to as a continuous playback unit.

For example, the static HDR metadata includes at least one of a type of EOTF function (curve), 18% gray value, diffuse white value, knee point, and clip point. EOTF is information that associates a plurality of luminance values with a plurality of code values, and is information for changing the luminance range of the video signal. Since the other information is attribute information regarding luminance of the video signal, the static HDR metadata may be called information regarding the luminance range of the video signal, and information for specifying the luminance range of the video signal.

Specifically, the 18% gray value and the diffuse white value indicate the luminance value (nit) in a video with predetermined brightness that serves as a reference, in other words, indicate reference brightness in the video. More specifically, the 18% gray value indicates the luminance value (nit) after mastering of a body with a brightness of 18 nit before mastering. The diffuse white value indicates the luminance value (nit) corresponding to white color.

Each of the knee point and clip point is a parameter of the EOTF function, and indicates a point at which the characteristic in EOTF changes. Specifically, the knee point indicates a change point from which an increment in the luminance value mapped on EOTF as luminance of the video signal (output luminance) over an increment in an original luminance value at a time of photographing (input luminance) becomes a value different from 1:1. For example, in FIG. 40A described later, the knee point is information for specifying a point of deviation from linear change. The clip point indicates a point at which clipping is started in the EOTF function. Here, clipping refers to converting an input luminance value equal to or greater than a certain value into an identical output luminance value. For example, in FIG. 40B described later, the clip point indicates a point from which the output luminance value will not change.

Figure 37A:
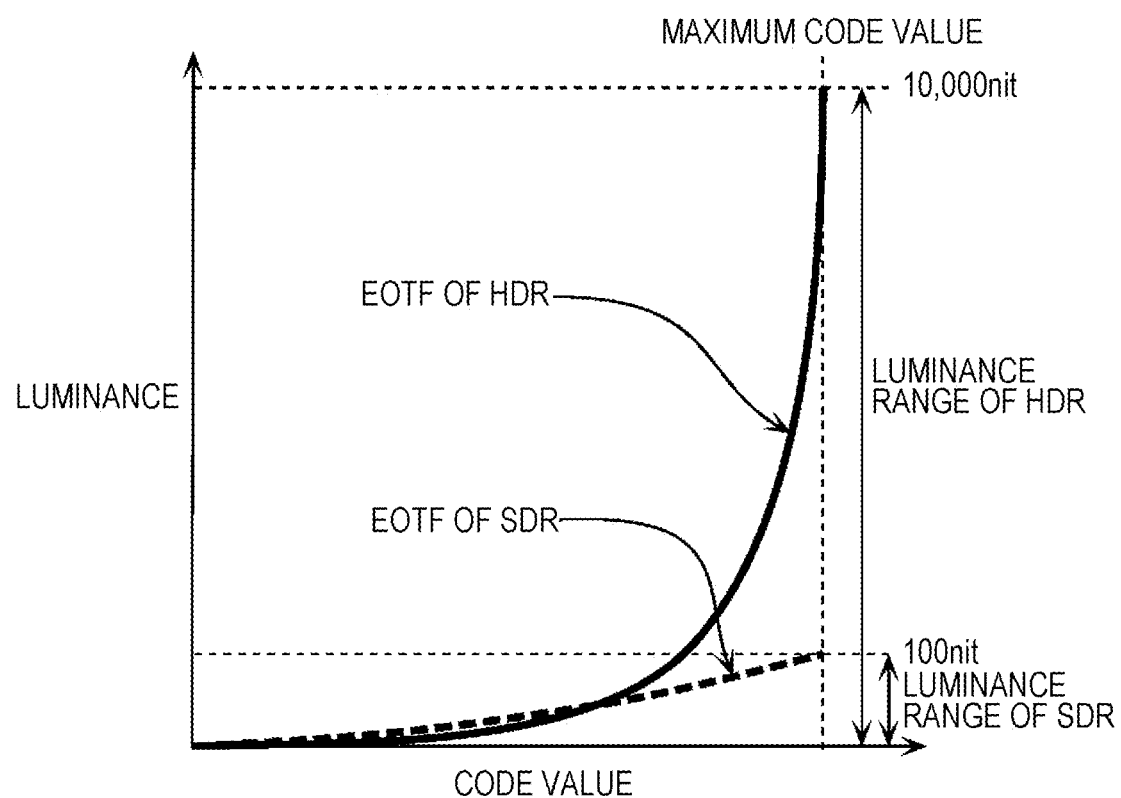
FIG. 37A is a diagram illustrating an example of EOTF (Electro-Optical Transfer Function) that supports each of HDR and SDR.

The type of EOTF function (curve) is, for example, EOTF of HDR and EOTF of SDR illustrated in FIG. 37A.

Thus, a content data generation method according to the present exemplary embodiment is a content data generation method for generating content data. The content data generation method includes: a first generation step of generating a video signal, and the static HDR metadata (first metadata) including information used in common to a plurality of images included in a continuous playback unit of the video signal (video signal that constitutes the continuous playback unit), the information regarding the luminance range of the video signal; and a second generation step of generating the content data by associating the continuous playback unit with the static HDR metadata. For example, the information regarding the luminance range of the video signal is information for converting the luminance range of the video signal.

The static HDR metadata includes information for specifying EOTF that associates the plurality of luminance values with the plurality of code values. The luminance value in the video signal is coded as the code value.

The static HDR metadata further includes information indicating the luminance value in the video signal with predetermined reference brightness, or information indicating a point from which the characteristic in EOTF changes. For example, the static HDR metadata includes information indicating the luminance value corresponding to white color in the video signal (diffuse white value).

In the first generation step is further generated the dynamic HDR metadata (second metadata), which is information used in common to units finer than the continuous playback unit, and is information regarding the luminance range of the video signal. For example, the information regarding the luminance range of the video signal is information for converting the luminance range of the video signal.

The dynamic HDR metadata is data such as a parameter indicating a mastering characteristic different for each scene. Here, the mastering characteristic indicates a relationship between original luminance (before mastering) and luminance after mastering. For example, the parameter indicating the mastering characteristic is information similar to the above-described static HDR metadata, and in other words, is at least one piece of information included in the static HDR metadata.

Figure 5:
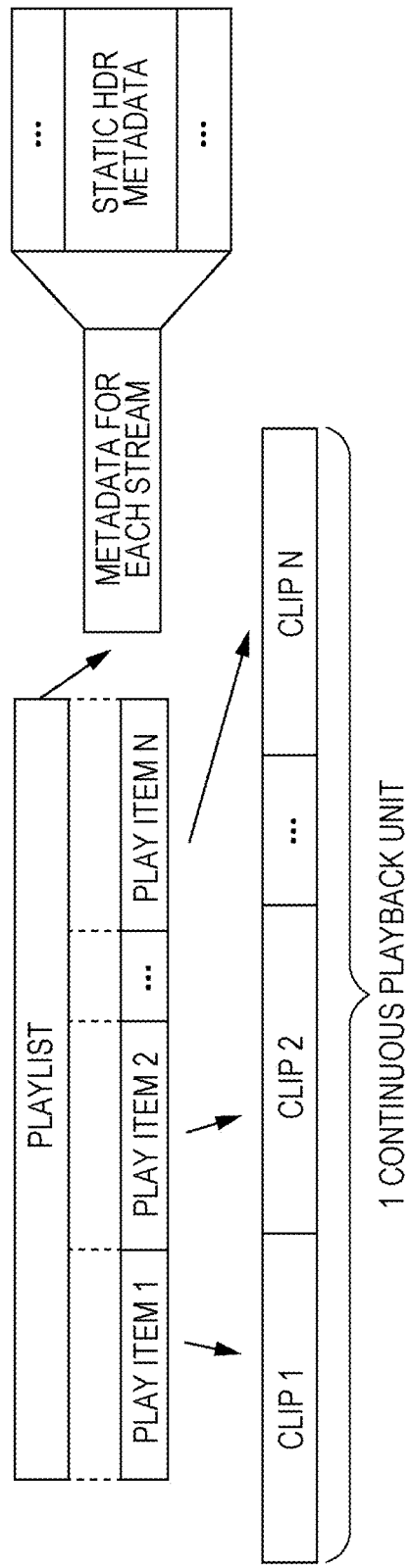
FIG. 5 is a diagram illustrating an example of storage of static HDR metadata.

FIG. 5 is a diagram illustrating an example of storage of the static HDR metadata. This example is an example of storing the static HDR metadata in the playlist in a package medium such as a Blu-ray disc.

The static HDR metadata is stored as one of the metadata for each stream referenced from the playlist. In this case, static HDR metadata is fixed for each playlist. That is, the static HDR metadata is stored in association with each playlist.

In OTT, the static HDR metadata may be stored in a manifest file that is referenced before acquisition of the stream. That is, the content data generation method according to the present exemplary embodiment may include generating the video signal as a video stream, and storing the static HDR metadata in the manifest file that is referenced before acquisition of the video stream.

In broadcast, the static HDR metadata may be stored in a descriptor indicating an attribute of the stream. That is, the content data generation method according to the present exemplary embodiment may include generating the content data as the video stream, and storing the static HDR metadata independently of the video stream as an identifier indicating the attribute of the video stream. For example, the static HDR metadata may be stored as a descriptor in MPEG2-TS.

When the static HDR metadata is fixed for each title, the static HDR metadata may be stored as management information indicating the attribute of the title.

Figure 6:
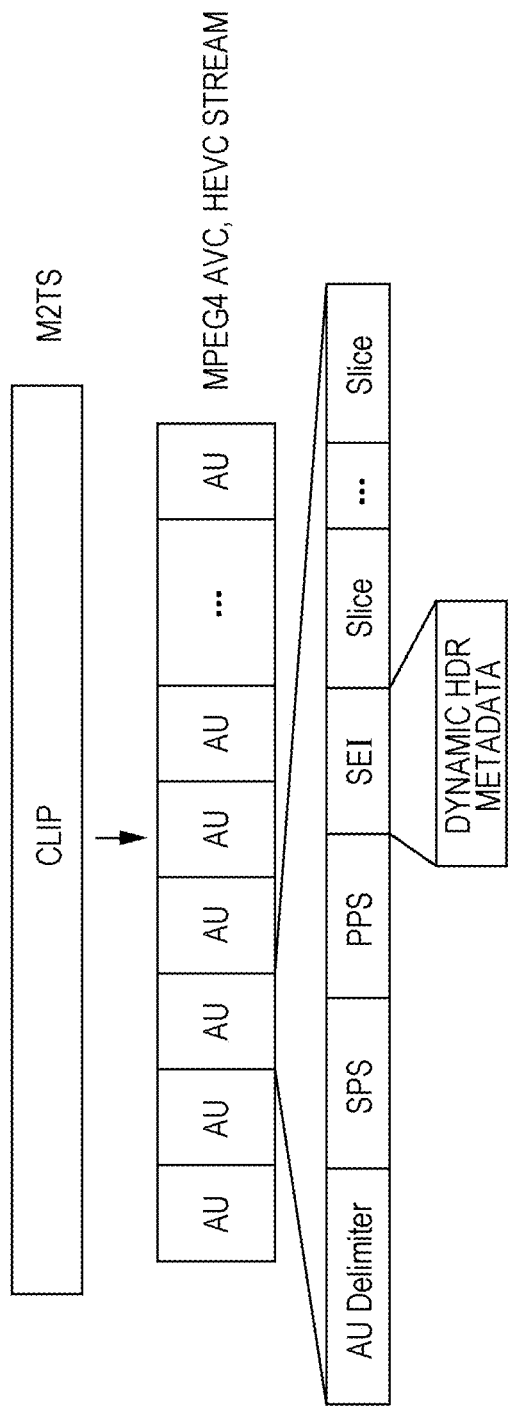
FIG. 6 is a diagram illustrating an example of storage of dynamic HDR metadata.

FIG. 6 is a diagram illustrating an example of storage of the dynamic HDR metadata in the video stream. In MPEG-4 AVC or HEVC (High Efficiency Video Coding), data structure called SEI (Supplemental Enhancement Information) is used to store information regarding playback control of the stream. Therefore, for example, the dynamic HDR metadata is stored in the SEI.

It is assumed that the dynamic HDR metadata is updated for each scene. A head of the scene is an access unit (AU) of a head of a random access unit, such as GOP (Group Of Pictures). Therefore, the dynamic HDR metadata may be stored in the head access unit in order of decoding in the random access unit. The head access unit of the random access unit is an IDR picture or a non-IDR I picture to which SPS (Sequence Parameter Set) is appended. Therefore, a receiving apparatus can acquire the dynamic HDR metadata by detecting an NAL (Network Abstraction Layer) unit that constitutes the head access unit of the random access unit. Alternatively, a unique type may be imparted to the SEI that stores the dynamic HDR metadata.

Note that the type of EOTF function may be stored as attribute information or the like on the stream in SPS. That is, the content data generation method according to the present exemplary embodiment may include generating content data as a video stream coded by HEVC, and storing information for specifying EOTF in SPS included in the video stream.

6. Transmission Method of the Static HDR Metadata

Figure 7:
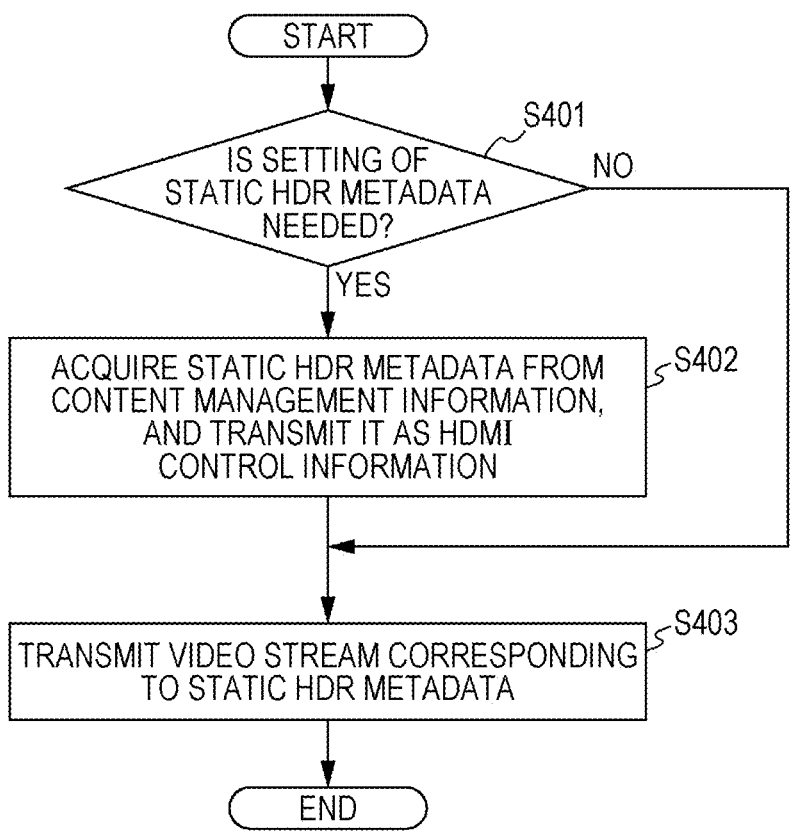
FIG. 7 is a flowchart of a transmission method of the static HDR metadata.

FIG. 7 is a diagram illustrating a transmission method of the static HDR metadata, and is a flowchart illustrating an example of an operation in which a playback apparatus such as a BD player (Blu-ray device) and a recorder transmits the HDR signal to the display apparatus via transmission protocols such as HDMI (registered trademark, and so on).

As described above, the static HDR metadata is fixed for each title or playlist. Therefore, where the static HDR metadata needs to be set (Yes in S401), the playback apparatus acquires the static HDR metadata from content management information when starting playback of the title or playlist, and stores and transmits the acquired static HDR metadata as HDMI control information. That is, before starting transmission of the video signal that constitutes the title or playlist, the playback apparatus acquires the static HDR metadata that corresponds to the title or playlist, and transmits the acquired static HDR metadata as the HDMI control information (S402). More generally, when performing initialization processing of HDMI between the playback apparatus and the display apparatus, the playback apparatus may transmit the static HDR metadata as initialization information.

Subsequently, the playback apparatus transmits the video stream corresponding to the static HDR metadata (S403). Note that, to this video stream, the transmitted static HDR metadata is effective.

Thus, the video stream transmission method according to the present exemplary embodiment is a video stream transmission method for transmitting the video stream. The video stream transmission method includes: an acquisition step of acquiring content data including the video signal, and the static HDR metadata (first metadata) regarding the luminance range of the video signal, the static HDR metadata being information used in common to a plurality of images included in the continuous playback unit; and a transmission step of transmitting the video stream corresponding to the video signal, and the static HDR metadata.

For example, in the transmission step, the video stream and the static HDR metadata are transmitted in accordance with a communication protocol of HDMI.

The dynamic HDR metadata is transmitted as part of the video stream.

Note that the playback apparatus may transmit the dynamic HDR metadata as the HDMI control signal with timing with which the dynamic HDR metadata becomes effective. At this time, the playback apparatus transmits the static HDR metadata and the dynamic HDR metadata while providing identifiers or the like to the static HDR metadata and the dynamic HDR metadata to identify the pieces of metadata.

The control signal may prescribe only data structure of a container for storing the dynamic HDR metadata to allow the content of the SEI to be copied as it is as payload data of the container. This allows the playback apparatus such as a BD player, even if syntax of the dynamic HDR metadata included in the SEI is updated, to support the update without change in implementation of the playback apparatus.

In a similar manner for the static HDR metadata, if the static HDR metadata in the content management information can be copied and transmitted, the playback apparatus may support change in syntax of the static HDR metadata without change in implementation of the playback apparatus. That is, the data structure of the container for storing the static HDR metadata is prescribed, and in the transmission step, the static HDR metadata included in the content data may be copied to the payload of the container, and the container may be transmitted.

7. Processing Method of the HDR Metadata

Figure 8:
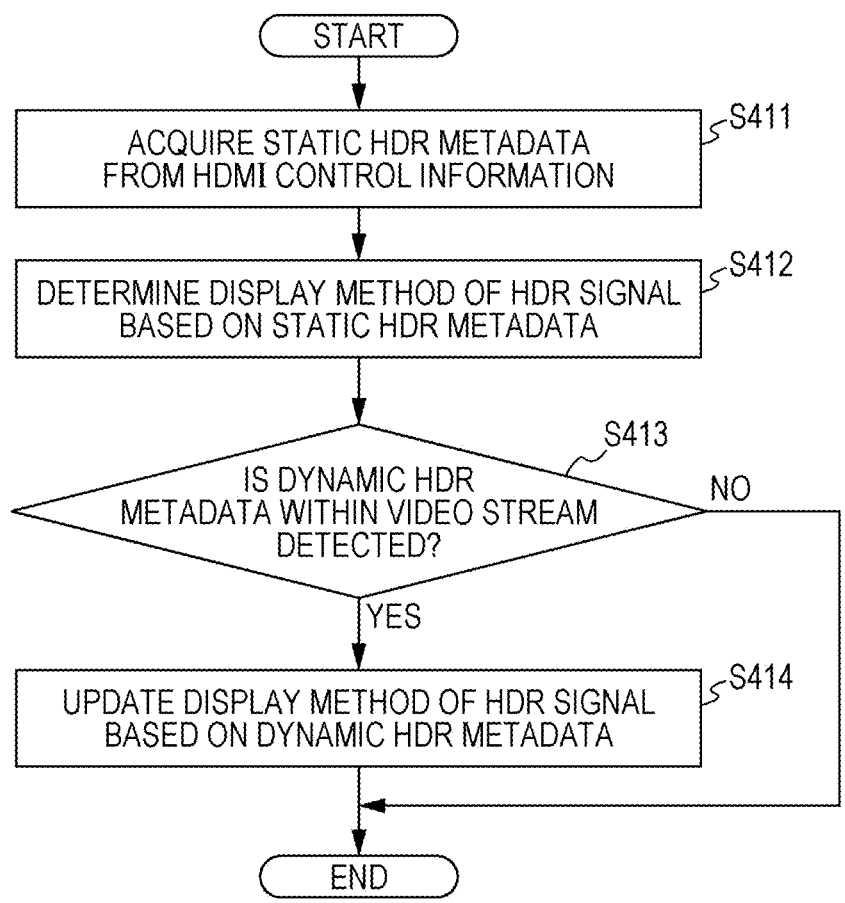
FIG. 8 is a flowchart of a processing method of HDR metadata.

FIG. 8 is a flowchart illustrating an example of a processing method of the HDR metadata when the display apparatus displays the HDR signal. First, the display apparatus acquires the static HDR metadata from the HDMI control information (S411), and determines a display method of the HDR signal based on the acquired static HDR metadata (S412).

When the control information does not include the static HDR metadata, the display apparatus determines the display method of the HDR signal based on a value prescribed in advance in an application standard, or default settings of the display apparatus. That is, when the static HDR metadata cannot be acquired, the video display method according to the present exemplary embodiment determines the display method of a video corresponding to the video signal based on the predetermined value or settings.

When the dynamic HDR metadata is detected in the SEI or the like within the video stream (Yes in S413), the display apparatus updates the display method of the HDR signal based on the dynamic HDR metadata (S414). That is, in the video display method according to the present exemplary embodiment, when the static HDR metadata is acquired, the display method is determined based on the acquired static HDR metadata, and the video is displayed. When the dynamic HDR metadata is acquired, the display method determined based on the static HDR metadata is updated to a display method determined based on the dynamic HDR metadata, and the video is displayed. Alternatively, the display method may be determined based on both the static HDR metadata and the dynamic HDR metadata.

Note that when the display apparatus does not support acquisition of the dynamic HDR metadata, the display apparatus may operate only based on the static HDR metadata. Even when the display apparatus supports acquisition of the dynamic HDR metadata, the display apparatus may be unable to update the display method of the HDR signal while synchronizing with display time (PTS: Presentation Time Stamp) of the access unit that stores the metadata. In this case, after acquiring the metadata, the display apparatus may update the display method from the access unit to be displayed after earliest time when the display method can be updated.

Note that the display apparatus may support the update and addition of the parameter by imparting version information, etc. to the HDR metadata. This allows the display apparatus to determine whether the metadata can be interpreted based on the version information of the HDR metadata. Alternatively, the HDR metadata may include a basic section and an extended section, and the update or addition of the parameter may be implemented by change in the extended section while the basic section is not updated. That is, each of the static HDR metadata and the dynamic HDR metadata may have a plurality versions, and may include the basic section used in common to the plurality of versions and the extended section different for each version. This allows the display apparatus to secure backward compatibility based on the HDR metadata of the basic section.

Thus, the video display method according to the present exemplary embodiment is a video display method for displaying the video based on the video stream. The video display method includes: an acquisition step of acquiring the video stream corresponding to the video signal, and the static HDR metadata (first metadata); and a display step of determining a display method of the video corresponding to the video signal based on the static HDR metadata, and displaying the video.

The luminance value in the video signal is coded as the code value. The static HDR metadata includes information for specifying EOTF that associates the plurality of luminance values with the plurality of code values. In the display step, the video is generated by conversion of the code value indicated by the video signal into the luminance value by using EOTF specified by the static HDR metadata.

8. Data Output Apparatus

Figure 9:
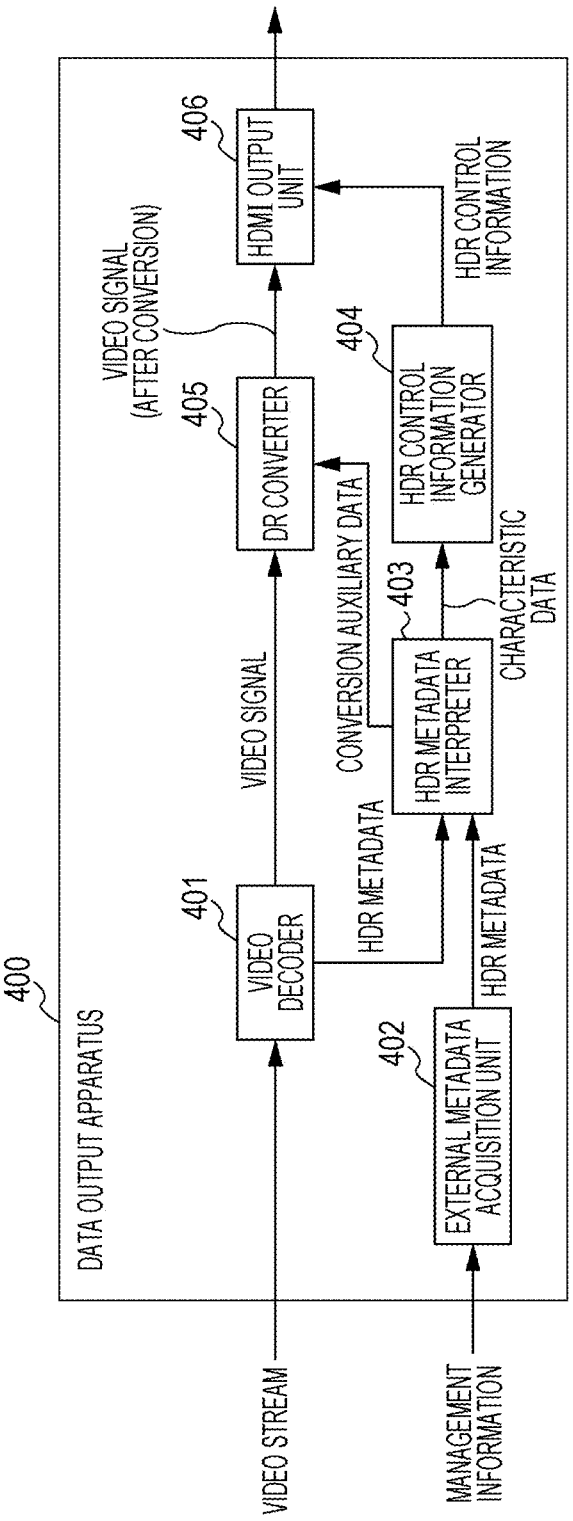
FIG. 9 is a block diagram illustrating a configuration of a data output apparatus.

FIG. 9 is a block diagram illustrating a configuration of data output apparatus 400 that outputs the HDR signal, such as a BD player. The HDR metadata that is input into data output apparatus 400 includes characteristic data indicating the mastering characteristic of the HDR signal, and conversion auxiliary data indicating a tone mapping method for converting the HDR signal into the SDR signal or converting the dynamic range of the HDR signal. These two types of metadata are stored as the static HDR metadata or the dynamic HDR metadata, as described in FIG. 5 and FIG. 6. Furthermore, the static HDR metadata is stored in at least one of the content management information and the video stream.

Data output apparatus 400 includes video decoder 401, external metadata acquisition unit 402, HDR metadata interpreter 403, HDR control information generator 404, DR converter 405, and HDMI output unit 406.

Video decoder 401 decodes the video stream, which is a coded stream of video, to generate the video signal (first video signal), and outputs the obtained video signal to DR converter 405. In addition, video decoder 401 acquires the HDR metadata within the video stream (second metadata) (static HDR metadata or dynamic HDR metadata). Specifically, video decoder 401 outputs the HDR metadata stored in an SEI message or the like of MPEG-4 AVC or HEVC to HDR metadata interpreter 403.

External metadata acquisition unit 402 acquires the static HDR metadata (first metadata) stored in the content management information, such as a playlist, and outputs the acquired static HDR metadata to HDR metadata interpreter 403. Here, the dynamic HDR metadata that may be changed in a predetermined unit that allows random access, such as a play item, may be stored in the content management information. In this case, external metadata acquisition unit 402 acquires the dynamic HDR metadata from the content management information, and outputs the acquired dynamic HDR metadata to HDR metadata interpreter 403.

HDR metadata interpreter 403 determines a type of HDR metadata that is output from video decoder 401 or external metadata acquisition unit 402, outputs the characteristic data to HDR control information generator 404, and outputs the conversion auxiliary data to DR converter 405.

When the static HDR metadata is acquired by both video decoder 401 and external metadata acquisition unit 402, only the static HDR metadata that is output from external metadata acquisition unit 402 may be used as effective metadata. That is, where the first metadata acquired by external metadata acquisition unit 402 and the second metadata acquired by video decoder 401 are the static HDR metadata used in common to a plurality of images included in the continuous playback unit of the first video signal, when HDR metadata interpreter 403 acquires both the first metadata and the second metadata, HDR metadata interpreter 403 analyzes the first metadata to acquire the characteristic data and the conversion auxiliary data.

Alternatively, when external metadata acquisition unit 402 acquires the static HDR metadata, HDR metadata interpreter 403 uses the static HDR metadata as effective metadata. Furthermore, when video decoder 401 acquires the static HDR metadata, HDR metadata interpreter 403 may overwrite the effective metadata with the static HDR metadata. That is, in a case where the first metadata acquired by external metadata acquisition unit 402 and the second metadata acquired by video decoder 401 are the static HDR metadata used in common to the plurality of images included in the continuous playback unit of the first video signal, when only the first metadata is acquired among the first metadata and the second metadata, HDR metadata interpreter 403 analyzes the first metadata to acquire the characteristic data and the conversion auxiliary data. When the second metadata is acquired, HDR metadata interpreter 403 switches metadata to be used from the first metadata to the second metadata.

HDR control information generator 404 generates the HDR control information in HDMI based on the characteristic data, and outputs the generated HDR control information to HDMI output unit 406. Here, regarding the dynamic HDR metadata, output timing of the HDR control information in HDMI output unit 406 is determined so that the HDR control information can be output synchronizing with the video signal of which the metadata becomes effective. That is, HDMI output unit 406 outputs the HDR control information while synchronizing with the video signal of which the metadata becomes effective.

Based on the conversion auxiliary data, DR converter 405 converts the decoded video signal into the SDR signal, or converts the dynamic range. Here, if the display apparatus connected to data output apparatus 400 supports input of the HDR signal, conversion by DR converter 405 is unnecessary. Therefore, data output apparatus 400 may determine whether conversion processing is necessary by confirming whether the connected display apparatus supports input of the HDR signal in HDMI initialization processing, etc. When it is determined that the conversion processing is unnecessary, the first video signal obtained by video decoder 401 is input into HDMI output unit 406, without passing through DR converter 405.

That is, when the display apparatus connected to data output apparatus 400 supports the video output with the luminance range of the HDR signal (first video signal), HDMI output unit 406 outputs the first video signal and the HDR control information to the display apparatus. On the other hand, when the display apparatus connected to data output apparatus 400 fails to support the video output with the luminance range of the HDR signal (first video signal), HDMI output unit 406 outputs the second video signal obtained by converting HDR into SDR, and the HDR control information to the display apparatus. HDMI output unit 406 determines in initialization processing of the transmission protocol (for example, HDMI) whether the display apparatus supports the video output with the luminance range of the HDR signal (first video signal).

HDMI output unit 406 outputs the video signal that is output from DR converter 405 or video decoder 401, and the HDR control information in accordance with the HDMI protocol.

Similar configuration may also be used when data output apparatus 400 receives and outputs broadcast or OTT content. When data output apparatus 400 and the display apparatus are included in a single device, HDMI output unit 406 is unnecessary.

In the above description, data output apparatus 400 includes external metadata acquisition unit 402 that acquires the metadata from the management information or the like, and video decoder 401 has a function of acquiring the metadata from the video stream. However, data output apparatus 400 may have only either one.

The above description has mentioned an example in which data output apparatus 400 outputs data (video signal and HDR control information) according to HDMI. However, data output apparatus 400 may output data according to any transmission protocol.

Thus, data output apparatus 400 includes: the decoder (video decoder 401) that decodes the video stream to generate the first video signal with a first luminance range (HDR); the acquisition unit that acquires the first metadata regarding the luminance range of the first video signal (at least one of video decoder 401 and external metadata acquisition unit 402); the interpreter that interprets the first metadata to acquire the characteristic data indicating the luminance range of the first video signal (HDR metadata interpreter 403); the control information generator that converts the characteristic data into the HDR control information according to the predetermined transmission protocol (for example, HDMI) (HDR control information generator 404); and the output unit that outputs the HDR control information in accordance with the predetermined transmission protocol (HDMI output unit 406).

This allows data output apparatus 400 to generate the control information based on the characteristic data included in the metadata.

The interpreter (HDR metadata interpreter 403) further interprets the first metadata to acquire the conversion auxiliary data for converting the luminance range of the first video signal. Data output apparatus 400 further includes the converter (DR converter 405) that converts the luminance range of the first video signal based on the conversion auxiliary data to generate the second video signal with the luminance range narrower than the luminance range of the first video signal. The output unit (HDMI output unit 406) further outputs at least one of the first video signal and the second video signal in accordance with the predetermined transmission protocol.

This allows data output apparatus 400 to change the luminance range of the first video signal by using the conversion auxiliary data included in the metadata.

The decoder (video decoder 401) further acquires the second metadata (HDR metadata) regarding the luminance range of the first video signal from the video stream. The interpreter (HDR metadata interpreter 403) analyzes at least one of the first metadata and the second metadata to acquire the characteristic data and the conversion auxiliary data.

As illustrated in FIG. 4, the static HDR metadata includes the necessary metadata and the optional metadata, and the dynamic HDR metadata includes only the optional metadata. That is, the static HDR metadata is always used, while the dynamic HDR metadata is used selectively. Thus, the first metadata acquired by external metadata acquisition unit 402 or the second metadata acquired by video decoder 401 is used in common to the plurality of images included in the continuous playback unit of the video signal, and includes the static HDR metadata (static metadata) including the characteristic data. HDR control information generator 404 converts the characteristic data included in the static HDR metadata into the HDR control information according to the predetermined transmission protocol. When outputting the first video signal (HDR signal), HDMI output unit 406 outputs the HDR control information based on the static HDR metadata.

The first metadata acquired by external metadata acquisition unit 402 or the second metadata acquired by video decoder 401 is used in common to a unit finer than the continuous playback unit of the video signal, and includes the dynamic HDR metadata (dynamic metadata) including the characteristic data. HDR control information generator 404 converts the characteristic data included in the static HDR metadata and characteristic data included in the dynamic HDR metadata into the HDR control information according to the predetermined transmission protocol. When outputting the first video signal (HDR signal), HDMI output unit 406 outputs the HDR control information based on the static HDR metadata and the dynamic HDR metadata.

The data generation method according to the present disclosure is a data generation method to be performed by the data generation apparatus, and includes a first generation step of generating the metadata regarding the luminance range of the video signal, and a second generation step of generating the video stream including the video signal and the metadata. The metadata includes the characteristic data indicating the luminance range of the video signal, and the conversion auxiliary data for converting the luminance range of the video signal.

9. Example of Storage of the HDR Metadata

Figure 10:
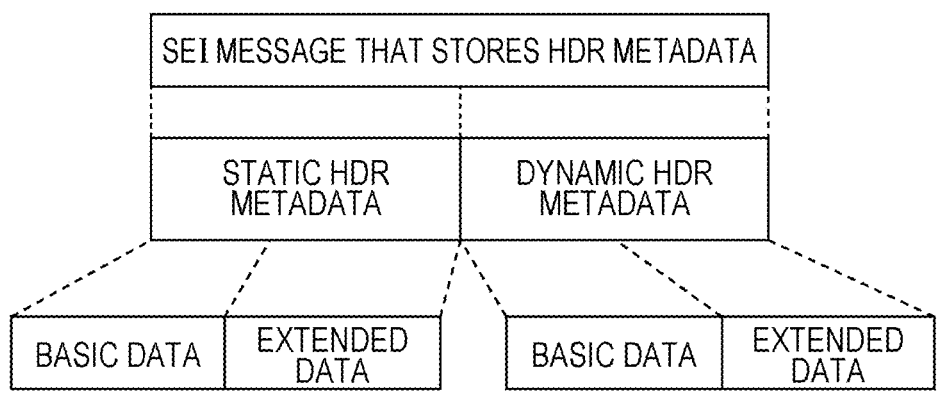
FIG. 10 is a diagram illustrating an example of data structure of an SEI message that stores the HDR metadata.

FIG. 10 is a diagram illustrating an example of data structure of the SEI message that stores the HDR metadata. As illustrated in FIG. 10, the SEI message dedicated to the HDR metadata may be defined. That is, the metadata may be stored in the message dedicated to the metadata.

Alternatively, the HDR metadata may be stored in a general-purpose SEI message for user data storage, and information indicating that the HDR metadata is stored in the message (HDR extended identification information described later) may be provided in a payload section of the message.

The HDR metadata includes the static HDR metadata and the dynamic HDR metadata. In addition, flag information indicating whether the static HDR metadata is stored, and flag information indicating whether the dynamic HDR metadata is stored may be provided. This allows the use of three kinds of storage methods, including a method for storing only the static HDR metadata, a method for storing only the dynamic HDR metadata, and a method for storing both the static HDR metadata and the dynamic HDR metadata.

Furthermore, the basic data (basic section) whose interpretation is necessary and the extended data (extended section) whose interpretation is optional (interpretation is not necessary) may be defined to each piece of the metadata. For example, type information indicating a type (basic data or extended data) and a size of metadata are included in header information, and a format of the container that stores the metadata is defined in the payload. That is, the metadata includes the payload, the information indicating whether the data in the payload is the basic data or the extended data, and the information indicating the data size of the payload. In other words, the metadata includes the type information indicating the type of metadata. For example, the basic data is stored in the container whose type value is 0. In addition, the extended data is assigned with a value equal to or larger than 1 as the type value, and the type of extended data is indicated by the value.

The data output apparatus and the display apparatus acquire data in the container that the data output apparatus and the display apparatus can interpret with reference to the type value. That is, the data output apparatus (or display apparatus) uses the type information to determine whether the data output apparatus (or display apparatus) is capable of interpreting the metadata. When the data output apparatus (or display apparatus) is capable of interpreting the metadata, the data output apparatus (or display apparatus) interprets the metadata to acquire the characteristic data and the conversion auxiliary data.

The metadata may be generated so that a maximum size of the HDR metadata be set in advance, and that a sum total of the size of the basic data and the size of the extended data be equal to or less than the maximum size. That is, the maximum value of the data size of the metadata is prescribed, and in the data generation method according to the present disclosure, the metadata is generated so that the data size of the sum of the basic data and the extended data is equal to or less than the maximum value.

By including a memory for this maximum size, the data output apparatus and the display apparatus can guarantee that all HDR metadata be stored within the memory. Alternatively, it is also possible to secure a data area of a fixed size for the static HDR metadata or the dynamic HDR metadata, and to leave areas other than an area that stores the basic data as areas for future extension.

Such data structure may be used for storing the HDR metadata in the content management information.

Figure 11:
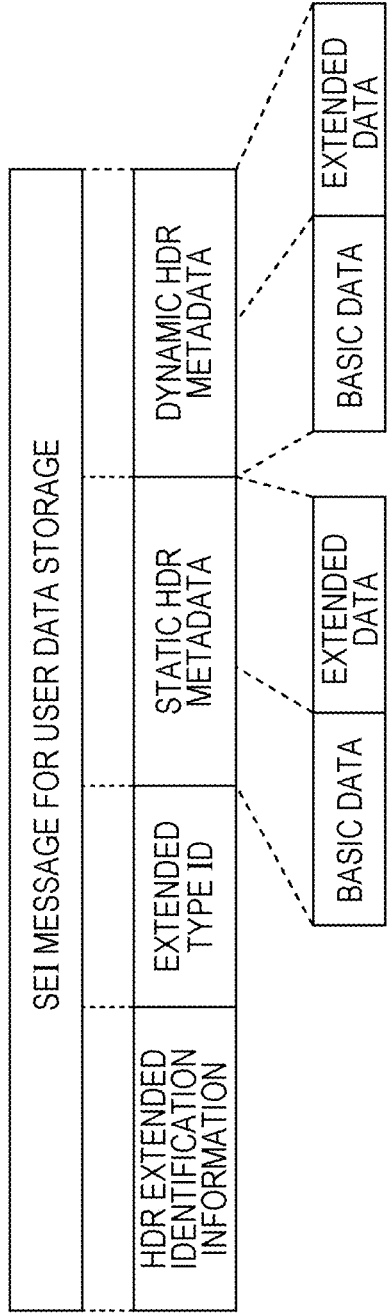
FIG. 11 is a diagram illustrating an example of the data structure of the SEI message that stores the HDR metadata.

FIG. 11 is a diagram illustrating an example of data structure in a case where the HDR metadata is stored in the SEI message for user data storage. The data structure of FIG. 11 is similar to the data structure of FIG. 10 except that the message includes the HDR extended identification information and an extended type ID. The HDR extended identification information indicates that the message includes the HDR metadata. The extended type ID indicates information such as a version of the HDR metadata. That is, the metadata is stored in the SEI message of HEVC, and the SEI message includes the HDR extended identification information indicating whether the metadata is included in the SEI message.

In this case, the data output apparatus receives the SEI message for user data storage including the HDR extended identification information, and when the display apparatus connected to the data output apparatus supports input of the HDR signal and the HDR control information, the data output apparatus copies and outputs the received SEI message as it is in accordance with a protocol of output I/F to the display apparatus, such as HDMI. That is, when the SEI message is acquired including the HDR extended identification information indicating that the SEI message includes the metadata, and the display apparatus to which the data is output supports input of the HDR control information, the data output apparatus outputs the SEI message as it is in accordance with the predetermined transmission protocol (for example, HDMI).

This allows the data output apparatus to output the HDR metadata to the display apparatus regardless of content of the metadata. Such a configuration allows the data output apparatus to output new HDR metadata to the display apparatus, even when new DR conversion processing is developed and new HDR metadata is defined in the future, and a display apparatus that supports this new HDR metadata is connected to the data output apparatus that does not support this new HDR metadata. Such a configuration allows the display apparatus to implement DR conversion processing according to the new HDR metadata.

10. Example of Storage of a Plurality of Pieces of HDR Metadata

Figure 12:
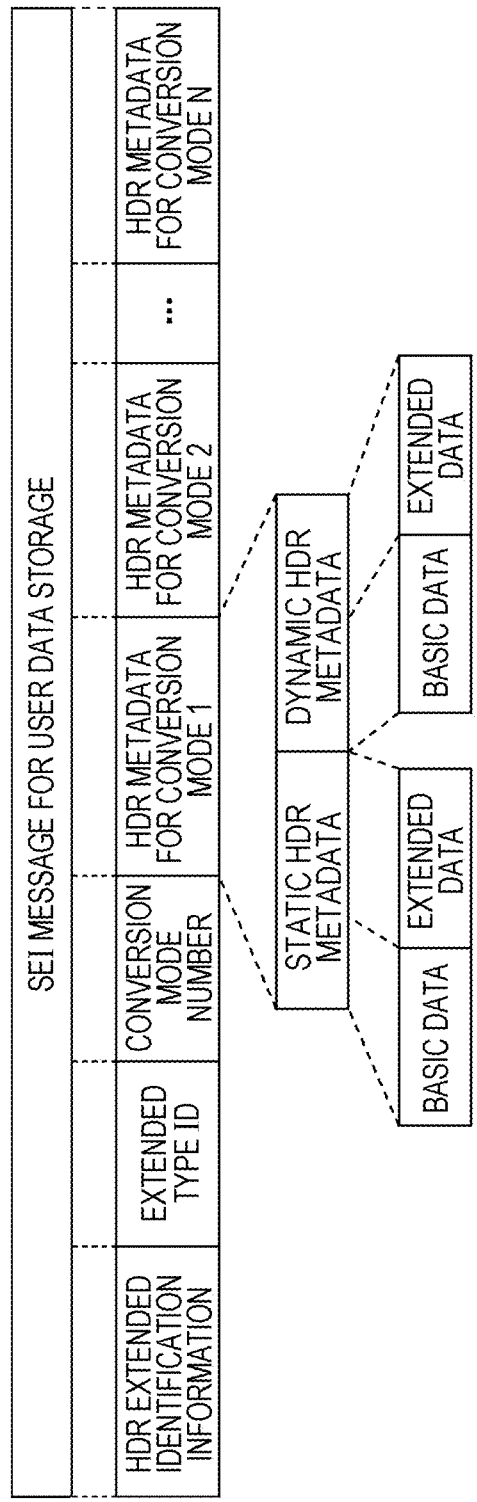
FIG. 12 is a diagram illustrating an example of the data structure of the SEI message that stores the HDR metadata.

FIG. 12 is a diagram illustrating an example of data structure in storing a plurality of pieces of HDR metadata in one SEI message for user data storage. This SEI message stores the plurality of pieces of HDR metadata for a plurality of conversion modes (schemes) regarding conversion of the dynamic range (luminance range).

In the data structure illustrated in FIG. 12, a field indicating a number of conversion modes in which the HDR metadata is provided (conversion mode number) is added to the data structure illustrated in FIG. 11. In addition, the plurality of pieces of HDR metadata corresponding to the respective conversion modes are sequentially stored after the conversion modal number.

That is, the data generation method according to the present exemplary embodiment is a data generation method to be performed by the data generation apparatus. The data generation method includes a first generation step of generating one or more pieces of metadata (HDR metadata) corresponding to one or more conversion modes in which the luminance range of the video signal is converted, and a second generation step of generating the video stream including the video signal, the one or more pieces of metadata, and the conversion mode number indicating the number of one or more conversion modes.

11. Configuration of the Data Output Apparatus and the DR Converter

Figure 13:
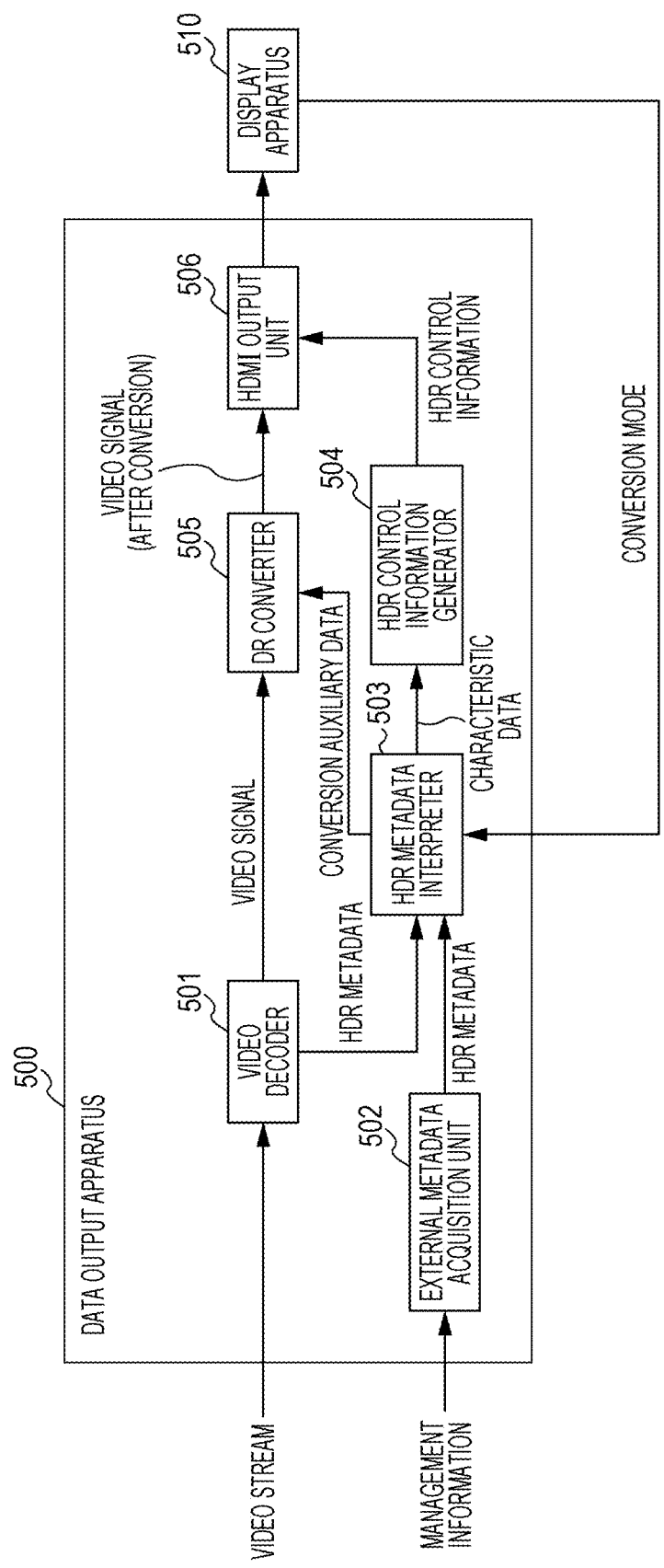
FIG. 13 is a block diagram illustrating an example of the configuration of the data output apparatus.

FIG. 13 is a block diagram illustrating an example of a configuration of data output apparatus 500 according to the present exemplary embodiment. Data output apparatus 500 includes video decoder 501, external metadata acquisition unit 502, HDR metadata interpreter 503, HDR control information generator 504, DR converter 505, and HDMI output unit 506. Operations of HDR metadata interpreter 503 and DR converter 505 differ from operations of data output apparatus 400 illustrated in FIG. 9. That is, the operations of video decoder 501, external metadata acquisition unit 502, HDR control information generator 504, and HDMI output unit 506 are similar to the operations of video decoder 401, external metadata acquisition unit 402, HDR control information generator 404, and HDMI output unit 406.

Data output apparatus 500 is connected to display apparatus 510 (display unit), and outputs the generated video signal and HDR control information to display apparatus 510 via the predetermined transmission protocols such as HDMI.

DR converter 505 and display apparatus 510 each support the plurality of conversion modes (conversion schemes) of a dynamic range. Here, "support" means having a function of performing processing of the conversion mode. First, HDR metadata interpreter 503 acquires the static HDR metadata and the dynamic HDR metadata from external metadata acquisition unit 502 and video decoder 501, respectively. The content management information or coded video stream stores the plurality of pieces of HDR metadata for the plurality of conversion modes. HDR metadata interpreter 503 determines the plurality of conversion modes corresponding to the plurality of pieces of HDR metadata, as the plurality of available conversion modes.

HDR metadata interpreter 503 acquires information on the conversion modes of the HDR signal that display apparatus 510 supports by communicating with display apparatus 510 or separately through a network. Then, HDR metadata interpreter 503 determines (1) which of data output apparatus 500 and display apparatus 510 is to perform conversion processing of a dynamic range, and (2) the conversion mode to use, based on (1) the conversion modes the HDR metadata supports, (2) the conversion modes supported by DR converter 505, and (3) the conversion modes display apparatus 510 supports.

When it is determined that data output apparatus 500 is to perform the conversion processing, DR converter 505 converts the HDR signal into the SDR signal in accordance with the conversion mode instructed from HDR metadata interpreter 503. When it is determined that display apparatus 510 is to perform the conversion processing, data output apparatus 500 transmits the video signal (HDR signal) to display apparatus 510, and transmits the HDR metadata required for the conversion to display apparatus 510 as a control signal of HDMI (HDR control information).

Although DR converter 505 supports the plurality of conversion modes in the above description, DR converter 505 only needs to support one or more conversion modes. In this case, data output apparatus 500 only needs to acquire one or more pieces of HDR metadata that support one or more conversion modes.

Thus, data output apparatus 500 includes: the decoder that decodes the video stream to generate the first video signal (video decoder 501); the acquisition unit that acquires one or more pieces of metadata that support one or more first conversion modes in which the luminance range of the video signal is converted (at least one of video decoder 501 and external metadata acquisition unit 502); the interpreter that interprets one of the one or more pieces of metadata to acquire the characteristic data indicating the luminance range of the first video signal and the conversion auxiliary data for converting the luminance range of the first video signal (HDR metadata interpreter 503); the control information generator that converts the characteristic data into the HDR control information in accordance with the predetermined transmission protocol (for example, HDMI) (HDR control information generator 504); the converter that supports one or more second conversion modes in which the luminance range of the video signal is converted, the converter for performing conversion processing of the luminance range of the first video signal in one of the one or more second conversion modes based on the conversion auxiliary data to generate the second video signal with the luminance range narrower than the luminance range of the first video signal, (DR converter 505); and the output unit that outputs the second video signal and the HDR control information to display apparatus 510 in accordance with the predetermined transmission protocol (HDMI output unit 506). The interpreter (HDR metadata interpreter 503) further determines which of data output apparatus 500 and display apparatus 510 is to perform the above-described conversion processing, based on the one or more first conversion modes, the one or more second conversion modes, and third conversion modes in which the luminance range of the video signal is converted, the third conversion modes being supported by display apparatus 510.

This allows data output apparatus 500 to determine which of data output apparatus 500 and display apparatus 510 is to perform the conversion processing, based on the first conversion modes corresponding to the one or more pieces of metadata, the second conversion modes that data output apparatus 500 supports, and the third conversion modes that display apparatus 510 supports. This allows data output apparatus 500 to determine the apparatus to perform the conversion processing appropriately.

The one or more second conversion modes that data output apparatus 500 supports may include at least part of the plurality of first conversion modes corresponding to the one or more pieces of metadata, and may include none of the one or more first conversion modes. Similarly, the third conversion modes that display apparatus 510 supports may include at least part of the one or more first conversion modes, and may include none of the one or more first conversion modes. Also, the third conversion modes may include at least part of the one or more second conversion modes, and may include none of the one or more second conversion modes.

Figure 14:
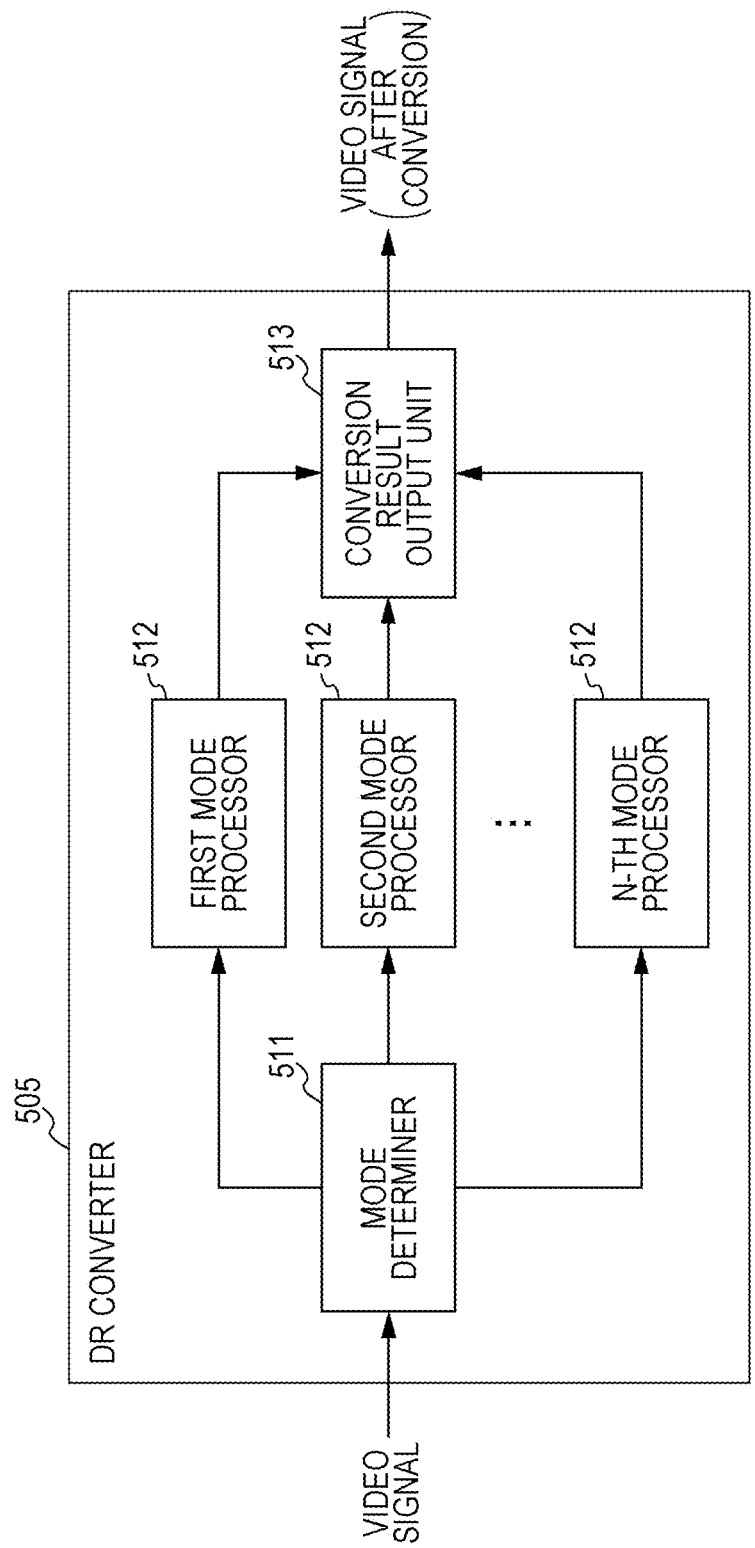
FIG. 14 is a block diagram illustrating an example of a configuration of a DR converter.

Hereinafter, an example of a configuration of DR converter 505 will be described. FIG. 14 is a block diagram illustrating the example of the configuration of DR converter 505. DR converter 505 includes mode determiner 511, N mode processors 512, and conversion result output unit 513. N mode processors 512 support N conversion modes (processing schemes) on a one-to-one basis, and perform processing of the supported conversion modes. Mode determiner 511 acquires the conversion mode instructed from HDR metadata interpreter 503, and determines mode processor 512 to perform the conversion processing. That is, mode determiner 511 selects mode processor 512 that supports the conversion mode instructed from HDR metadata interpreter 503. Determined mode processor 512 performs the conversion processing on the HDR signal (video signal) to generate the SDR signal (converted video signal). Conversion result output unit 513 outputs the converted SDR signal.

Figure 15:
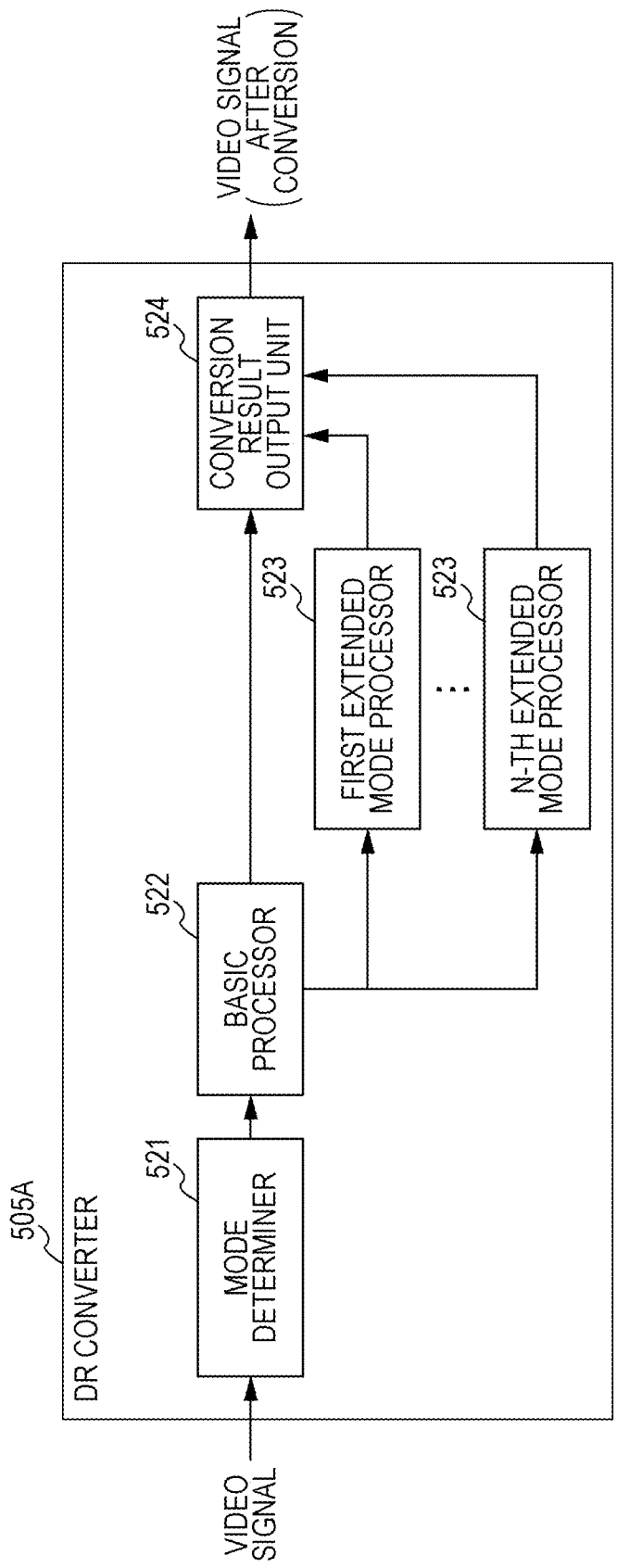
FIG. 15 is a block diagram illustrating an example of the configuration of the DR converter.

FIG. 15 is a block diagram illustrating an example of the configuration of DR converter 505A which is another example of DR converter 505. DR converter 505A includes mode determiner 521, basic processor 522, N extended mode processors 523, and conversion result output unit 524.

Basic processor 522 performs default conversion processing which is processing common to N conversion modes. N extended mode processors 523 perform extended processing such as dynamically controlling the parameter of the conversion processing by using the dynamic HDR metadata, in addition to processing of basic processor 522. In addition, N extended mode processors 523 support N conversion modes on a one-to-one basis, and perform extended processing on the supported conversion modes. For example, basic processor 522 operates only using the static HDR metadata, and extended mode processors 523 operate using the dynamic HDR metadata in addition to the static HDR metadata.

12. Example of Operation of the HDR Metadata Interpreter

FIG. 16 and FIG. 17 are diagrams each illustrating an example of instructions of HDR metadata interpreter 503 based on the conversion mode in which the HDR metadata is provided, presence of support of each mode in data output apparatus 500, and presence of support of each mode in display apparatus 510. Basically, HDR metadata interpreter 503 selects an operation in which reproducibility for a master image becomes highest from selectable combinations. Here, the master image refers to an image that is output without change in the luminance range.

For example, in the example illustrated in FIG. 16, data output apparatus 500 supports mode 1 and mode 2, and display apparatus 510 supports none of the conversion modes. Note that between mode 1 and mode 2, reproducibility for the master image is higher in mode 2. HDR metadata interpreter 503 grasps reproducibility for the master image in each mode in advance. In this case, HDR metadata interpreter 503 determines that data output apparatus 500 is to perform the conversion processing, and selects mode 2 with higher reproducibility from between mode 1 and mode 2.

In the example illustrated in FIG. 17, data output apparatus 500 supports mode 1, and display apparatus 510 supports mode 1 and mode 2. In this case, HDR metadata interpreter 503 determines that display apparatus 510 is to perform the conversion processing, and selects mode 2 with higher reproducibility from between mode 1 and mode 2. Data output apparatus 500 outputs the HDR metadata corresponding to the conversion processing in mode 2 to display apparatus 510 as HDMI control information (HDR control information). Display apparatus 510 uses the control information to perform the conversion processing in mode 2.

Thus, HDR metadata interpreter 503 further determines, as the conversion mode of the conversion processing to be performed by data output apparatus 500, the conversion mode which is included in the one or more first conversion modes that correspond to the one or more pieces of metadata on a one-to-one basis, and is included in the one or more second conversion modes that data output apparatus 500 supports. Specifically, HDR metadata interpreter 503 further determines, as the conversion mode of the conversion processing to be performed by data output apparatus 500 or display apparatus 510, the conversion mode which is included in the one or more first conversion modes that support the one or more pieces of metadata on a one-to-one basis, and is included in at least one of the one or more second conversion modes supported by data output apparatus 500 and the third conversion modes supported by display apparatus 510.

More specifically, from among the plurality of conversion modes which are included in the plurality of first conversion modes and are included in at least one of the plurality of second conversion modes and the third conversion modes, HDR metadata interpreter 503 determines a conversion mode with highest reproducibility for the master image as the conversion mode of the conversion processing to be performed by data output apparatus 500 or display apparatus 510.

In other words, data output apparatus 500 selects a mode with the highest reproducibility from among the conversion modes supported by data output apparatus 500 and display apparatus 510, and determines that an apparatus that supports the selected mode between data output apparatus 500 and display apparatus 510 is to perform the conversion processing.

More specifically, as illustrated in FIG. 16, when the determined conversion mode of the conversion processing is included in the second conversion modes and is not included in the third conversion modes, HDR metadata interpreter 503 determines that data output apparatus 500 is to perform the conversion processing. Also, as illustrated in FIG. 17, when the determined conversion mode of the conversion processing is included in the third conversion modes and is not included in the second conversion modes, HDR metadata interpreter 503 determines that display apparatus 510 is to perform the conversion processing.

This allows data output apparatus 500 to determine the conversion mode to be used, based on the first conversion modes corresponding to the plurality of pieces of metadata, the second conversion modes supported by the data output apparatus, and the third conversion modes supported by the display apparatus. In addition, since data output apparatus 500 can select the conversion mode with the highest reproducibility for the master image, data output apparatus 500 can improve image quality of the displayed video.

FIG. 18 is a diagram illustrating an example of determining the conversion processing according to whether data output apparatus 500 is capable of acquiring the parameter of display apparatus 510. The parameter of display apparatus 510 includes the peak luminance of display apparatus 510 (maximum value of the luminance range that display apparatus 510 can display), or the display mode that display apparatus 510 can display, etc. Specifically, as the display mode, this parameter indicates the display mode which is currently viewed. For example, the display mode is a normal mode, dynamic mode, cinema mode, etc.

In the example illustrated in FIG. 18, data output apparatus 500 supports mode 1, mode 2, and mode 3, and display apparatus 510 supports mode 1. In addition, data output apparatus 500 is capable of acquiring the parameter of display apparatus 510 for mode 1 and mode 2, and is not capable of acquiring the parameter of display apparatus 510 for mode 3. In addition, reproducibility is higher in mode 2 than in mode 1, and reproducibility is higher in mode 3 than in mode 2.

In this case, although the mode with highest reproducibility is mode 3 among the modes supported by data output apparatus 500 and display apparatus 510, since data output apparatus 500 cannot acquire the parameter of display apparatus 510 for mode 3, mode 3 is excluded. Then, data output apparatus 500 selects mode 2 which has high reproducibility next to mode 3 and for which the parameter is acquirable, as the conversion mode to be used. Then, data output apparatus 500 acquires the parameter required for mode 2 from display apparatus 510, and uses the acquired parameter to perform the conversion processing in mode 2.

Thus, HDR metadata interpreter 503 further determines the conversion mode of the conversion processing to be performed by data output apparatus 500 or display apparatus 510, according to whether the parameter for each of the plurality of first conversion modes corresponding to the plurality of pieces of metadata is acquirable from display apparatus 510. Specifically, HDR metadata interpreter 503 determines, as the conversion mode of the conversion processing to be performed by data output apparatus 500 or display apparatus 510, the conversion mode which is included in the plurality of first conversion modes, is included in at least one of the plurality of second conversion modes and the third conversion modes, and for which the parameter is acquirable from display apparatus 510.

That is, data output apparatus 500 selects the mode in which reproducibility is highest from among the conversion modes supported by data output apparatus 500 and display apparatus 510. When only data output apparatus 500 supports the selected mode, data output apparatus 500 determines whether the parameter of display apparatus 510 for the mode is acquirable. When the parameter is acquirable, data output apparatus 500 selects the mode. On the other hand, when the parameter is not acquirable, data output apparatus 500 selects another mode (mode with next highest reproducibility).

This allows data output apparatus 500 to select a more appropriate conversion mode because data output apparatus 500 determines the conversion mode to be used according to whether the parameter of display apparatus 510 is acquirable.

13. Data Output Apparatus Configuration Example 2

Figure 19:
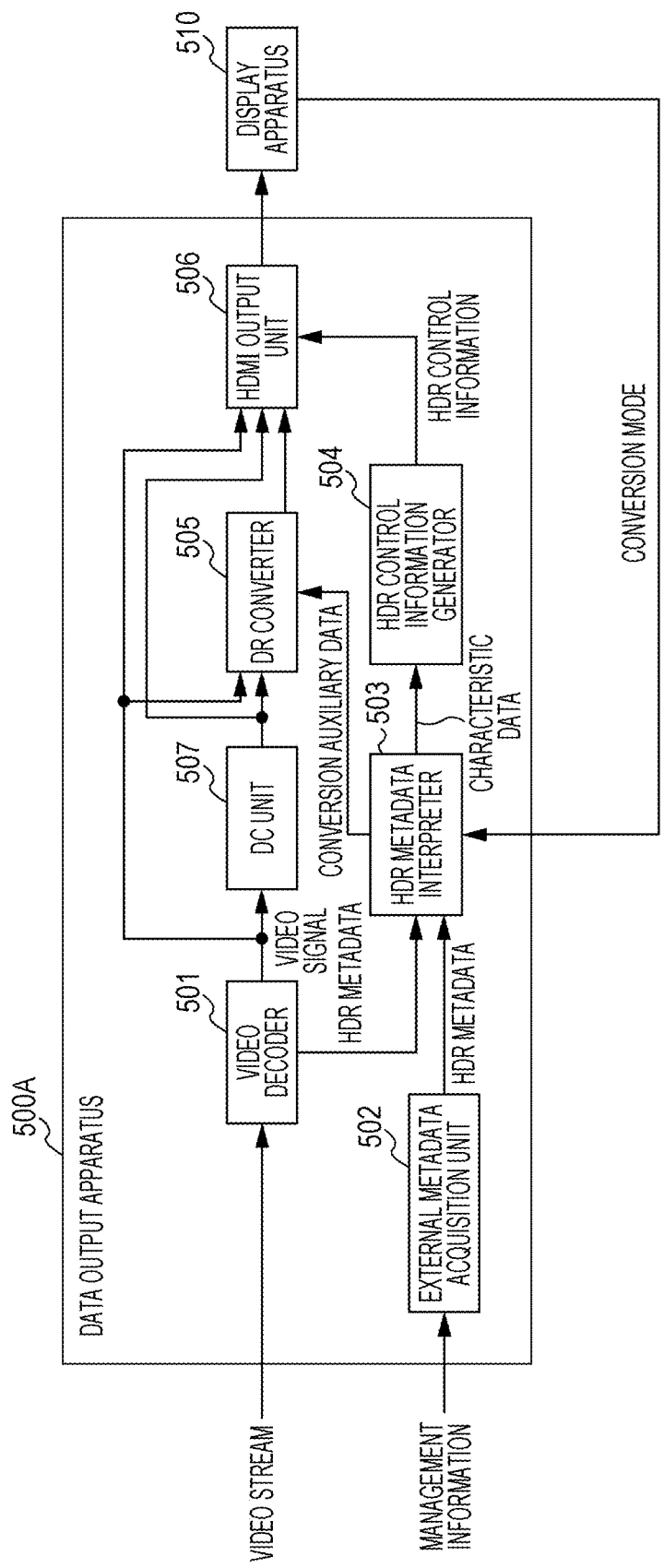
FIG. 19 is a block diagram illustrating an example of the configuration of the data output apparatus.

Hereinafter, another configuration example of the data output apparatus will be described. FIG. 19 is a block diagram illustrating the configuration of data output apparatus 500A. Data output apparatus 500A further includes DC unit 507 in addition to data output apparatus 500 illustrated in FIG. 13. DC unit 507 down-converts the resolution of the video signal obtained by video decoder 501. For example, when the video signal is 4K, DC unit 507 down-converts the video signal of 4K into a video signal of 2K.

This configuration allows data output apparatus 500A, in accordance with the resolution and dynamic range that display apparatus 510 supports, to selectively perform operations such as (1) converting the HDR signal of 4K into the HDR signal of 2K, and outputting the HDR signal of 2K, (2) after the conversion of the HDR signal of 4K into the HDR signal of 2K, DR converter 505 changes the dynamic range and then outputs the HDR signal, and (3) converting the SDR signal of 4K into the SDR signal of 2K and outputting the SDR signal of 2K. That is, data output apparatus 500A is capable of switching the operation in accordance with the resolution of display apparatus 510, presence of support of the HDR signal, and the like.

FIG. 20 is a diagram illustrating an example of combination of the characteristic of the video signal in content (resolution and dynamic range (luminance range)), the characteristic of display apparatus 510, and an output signal from data output apparatus 500A. Data output apparatus 500A selects a form of the output signal so that the form of the output signal be consistent with the resolution of display apparatus 510 and presence of support of the HDR signal, and controls DC unit 507 and DR converter 505 to generate the output signal of the selected form.

For example, when the video signal in content is the HDR signal with a resolution of 4K, and display apparatus 510 does not support display of the HDR signal with a resolution of 4K and supports display of the HDR signal with a resolution of 2K, data output apparatus 500A converts the video signal in content into the HDR signal with a resolution of 2K, and outputs the 2K HDR signal (refer to the example of combination described in the second row of FIG. 20). At this time, the conversion of the resolution of the video signal is performed by DC unit 507.

Also, when the video signal in content is the HDR signal with a resolution of 4K, and display apparatus 510 does not support display of the HDR signal with a resolution of 4K and the HDR signal with a resolution of 2K, and supports display of the SDR signal with a resolution of 2K, data output apparatus 500A converts the video signal in content into the SDR signal with a resolution of 2K, and outputs the 2K SDR signal (refer to the example of combination described in the third row of FIG. 20). At this time, the conversion of the resolution of the video signal is performed by DC unit 507, and the conversion of the luminance range is performed by DR converter 505.

This allows display apparatus 510 to reproduce the video signal of content with higher fidelity. Note that data output apparatus 500A may operate so that display apparatus 510 perform the conversion of the resolution, or the conversion of the dynamic range as described in FIG. 13.

Thus, data output apparatus 500A includes down conversion unit (DC unit 507) that generates a third video signal by lowering the resolution of the first video signal obtained by video decoder 501. The converter (DR converter 505) further generates a fourth video signal with the luminance range narrower than the luminance range of the third video signal by performing the conversion processing of the luminance range of the third video signal in one of the plurality of second conversion modes based on the conversion auxiliary data. The output unit (HDMI output unit 506) further outputs the third video signal or the fourth video signal to display apparatus 510.

This allows data output apparatus 500A to change the resolution of the video signal, for example, to a resolution suitable for display apparatus 510, etc.

Specifically, when display apparatus 510 does not support display of the video with the resolution of the first video signal, (1) the down conversion unit (DC unit 507) generates the third video signal, and (2) the output unit (HDMI output unit 506) outputs the third video signal to display apparatus 510. For example, as illustrated in FIG. 20, when the resolution of the video signal is 4K and the resolution of display apparatus 510 is 2K, the output signal of 2K is output.

When display apparatus 510 does not support display of the video with the luminance range of the first video signal (HDR), (1) the converter (DR converter 505) generates the second video signal with the luminance range (SDR) narrower than the luminance range of the first video signal (HDR), and (2) the output unit (HDMI output unit 506) outputs the second video signal and the HDR control information to display apparatus 510. For example, as illustrated in FIG. 20, when the dynamic range (luminance range) of the video signal is HDR and display apparatus 510 does not support HDR (in the case of SDR), the video signal of HDR is converted into the video signal of SDR, and the video signal (output signal) of SDR is output.

When display apparatus 510 does not support display of the video with the resolution of the first video signal and does not support display of the video with the luminance range of the first video signal (HDR), (1) the down conversion unit (DC unit 507) generates the third video signal, (2) the converter (DR converter 505) generates the fourth video signal with the luminance range (SDR) narrower than the luminance range of the third video signal (HDR), and (3) the output unit (HDMI output unit 506) outputs the fourth video signal to display apparatus 510. For example, as illustrated in FIG. 20, when the resolution of the video signal is 4K, the dynamic range (luminance range) of the video signal is HDR, the resolution of display apparatus 510 is 2K, and display apparatus 510 does not support HDR (in the case of SDR), the output signal of 2K and SDR is output.

14. Operation Model of Playing HDR Signal and 4K Signal

Figure 21:
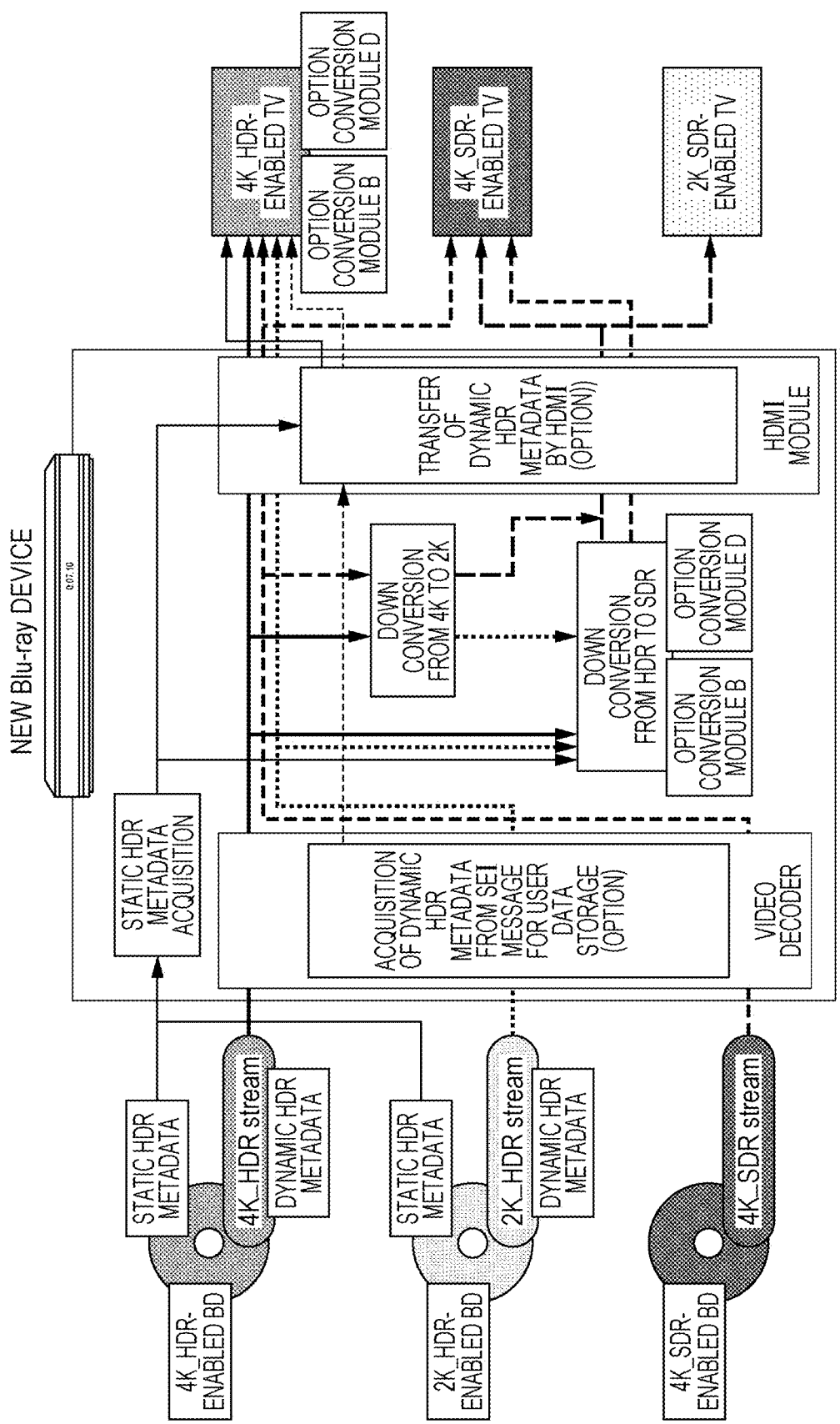
FIG. 21 is a diagram illustrating an example of an operation model in playing various signals and outputting the signals to various TVs.

FIG. 21 is a diagram illustrating an example of an operation model in which a next-generation Blu-ray playback apparatus plays the HDR signal of 4K, HDR signal of 2K, and SDR signal of 4K, and outputs the played signal to one of an HDR-enabled 4K TV, HDR-disabled 4K TV, and SDR-enabled 2K TV.

The Blu-ray playback apparatus acquires the static HDR metadata stored in the content management information, and the dynamic HDR metadata stored in the coded stream of video. The Blu-ray playback apparatus uses such HDR metadata to convert the HDR signal of video into the SDR signal and to output the signal in accordance with the characteristic of an output destination TV connected by HDMI, or to output the HDR metadata as the HDMI control signal.

It is assumed that each of the conversion processing from the HDR signal to the SDR signal, and the conversion processing from the HDR signal to a video signal with the luminance range with which the display apparatus is compliant can be selected from among a plurality of schemes and implemented. Storing the HDR metadata corresponding to the implemented conversion processing in the content management information or the coded stream of video at a time of content production can enhance an effect of the conversion processing. It is possible to store the plurality of pieces of HDR metadata in the content management information or the coded stream for each conversion scheme.

Note that, like an option conversion module B or option conversion module D in the diagram, the Blu-ray playback apparatus may include a plurality of conversion processors, may include only one conversion processor in view of a balance between costs and performance of the apparatus, and may not include the conversion processor. Similarly, the HDR-enabled TV may include the plurality of conversion processors, may include only one conversion processor, and may not include the conversion processor.

Like the SEI message for user data storage illustrated in FIG. 11 or FIG. 12, the HDR metadata is stored in the predetermined container that prescribes the format or input operation in advance. This allows the Blu-ray playback apparatus to output new HDR metadata to the display apparatus even when, in the future, new conversion processing is developed and new HDR metadata is defined, and a display apparatus that supports this new HDR metadata is connected to the Blu-ray playback apparatus that does not support the new HDR metadata. In addition, this allows the display apparatus to perform the conversion processing according to the new HDR metadata. This makes it possible, when a new technique is developed, to support the new technique by following an easy procedure such as assigning an ID to the new HDR metadata. Therefore, this will increase competitiveness of package medium standards, such as Blu-ray, for an application with rapid technical evolution, such as OTT. Note that the Blu-ray playback apparatus that supports the new HDR metadata may apply the above-described new conversion processing to video data within the playback apparatus, and may output the processed video data to the display apparatus.

It is determined by a method such as methods illustrated in FIG. 16 to FIG. 18, which of the Blu-ray playback apparatus and the TV is to perform the conversion processing. Note that, in accordance with the resolution of the TV, the playback apparatus may down-convert the signal of 4K into the signal of 2K, and output the 2K signal.

15. User Guidance Display Method 1

Figure 22:
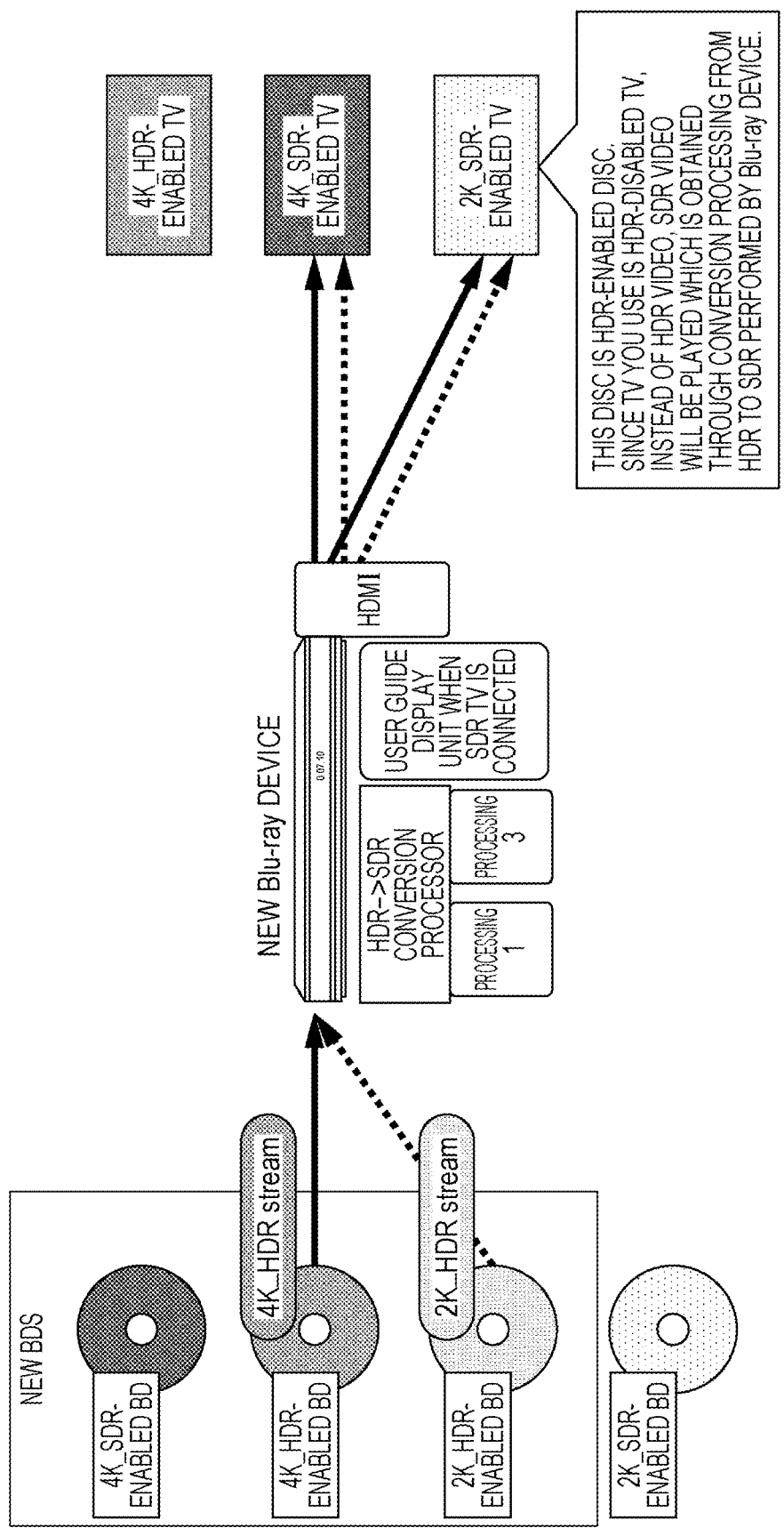
FIG. 22 is a diagram illustrating an example of a user guidance display method.

FIG. 22 is a diagram illustrating a user guidance display method in the Blu-ray device that performs the conversion processing from HDR to SDR.

Since an algorithm of the conversion processing from HDR to SDR has not been established, accurate conversion from HDR to SDR is difficult under current circumstances. It is also possible to implement a plurality of conversion processing algorithms from HDR to SDR.

Therefore, when a user inserts an HDR-enabled disc in an HDR-enabled Blu-ray device connected to an HDR-disabled TV, it is necessary to provide appropriate user guidance.

When the HDR-enabled Blu-ray device connected to the HDR-disabled TV detects start of the conversion processing from HDR to SDR, the Blu-ray device displays a guidance message, for example, "This disc is an HDR-enabled disc. Since the TV you use is an HDR-disabled TV, instead of an HDR video, an SDR video will be played which is obtained through conversion processing from HDR to SDR performed by the Blu-ray device".

Thus, when the display apparatus does not support video output with the luminance range of the first video signal (HDR signal), the data output apparatus (Blu-ray device) outputs the second video signal (SDR signal) obtained through conversion from the first luminance range into the second luminance range, and the HDR control information to the display apparatus, and causes the display apparatus to display that the second video signal obtained through conversion from the first luminance range into the second luminance range will be displayed.

16. User Guidance Display Method 2

Figure 23:
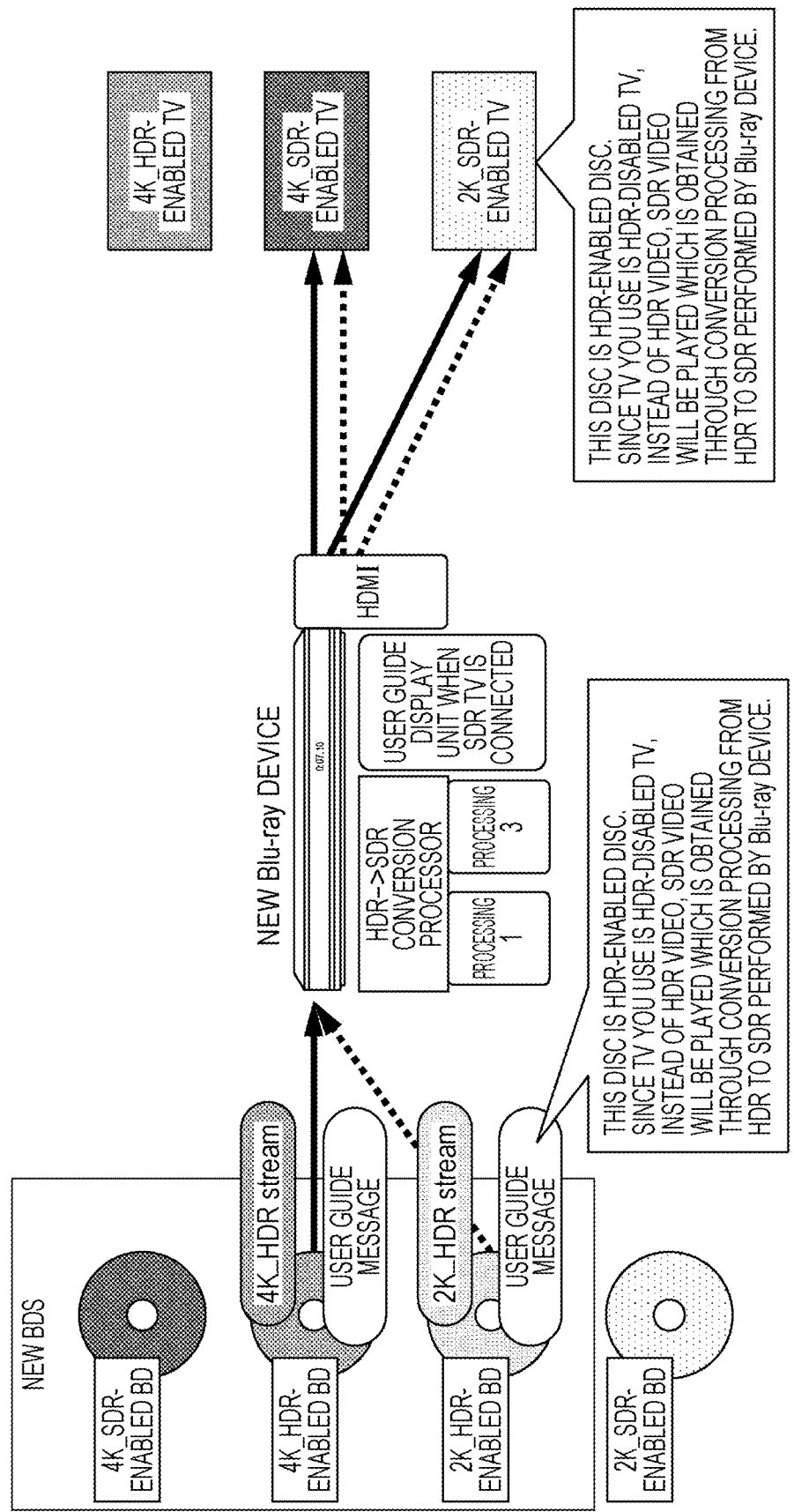
FIG. 23 is a diagram illustrating an example of the user guidance display method.

FIG. 23 is a diagram illustrating the display method of the user guidance at a time of performing the conversion processing from HDR stored in a disc to SDR.

A message (menu) to be displayed by the Blu-ray device when the conversion processing from HDR to SDR is performed is stored in an HDR disc, or a nonvolatile memory within the Blu-ray device, etc. This allows the Blu-ray device to display the message at a time of performing the conversion processing from HDR to SDR. In this case, the message is displayed, for example, "This disc is an HDR-enabled disc. Since the TV you use is an HDR-disabled TV, instead of an HDR video, an SDR video will be played which is obtained through conversion processing from HDR to SDR performed by the Blu-ray device".

17. User Guidance Display Method 3

Figure 24:
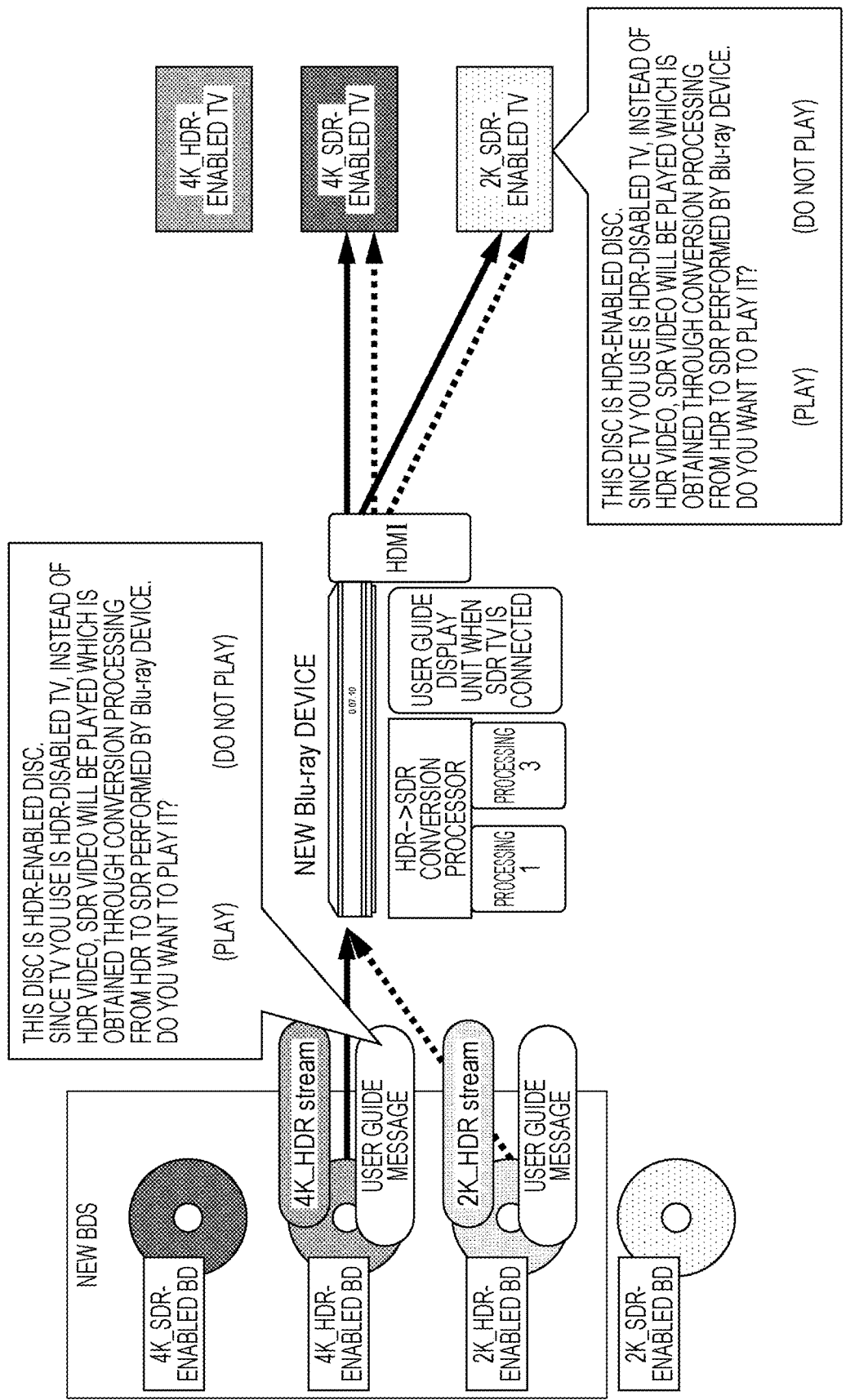
FIG. 24 is a diagram illustrating an example of the user guidance display method.

FIG. 24 is a diagram illustrating the display method of the user guidance menu at a time of performing the conversion processing from HDR stored in a disc to SDR.

By using the Blu-ray menu, the Blu-ray device may display a message such as, "This disc is an HDR-enabled disc. Since the TV you use is an HDR-disabled TV, instead of an HDR video, an SDR video will be played which is obtained through conversion processing from HDR to SDR performed by the Blu-ray device. Do you want to play it?". When the user selects a "Play" button, the Blu-ray device starts displaying the converted image. On the other hand, when the user selects "Do not play", the Blu-ray device stops playing the converted image, and displays a message prompting the user to insert an HDR-disabled Blu-ray disc.

Thus, when the display apparatus does not support the video output with the luminance range of the first video signal (HDR signal), the data output apparatus (Blu-ray device) causes the display apparatus to display the message for the user to select whether to display the second video signal (SDR signal) obtained through conversion from the first luminance range into the second luminance range.

18. User Guidance Display Method 4

Figure 25:
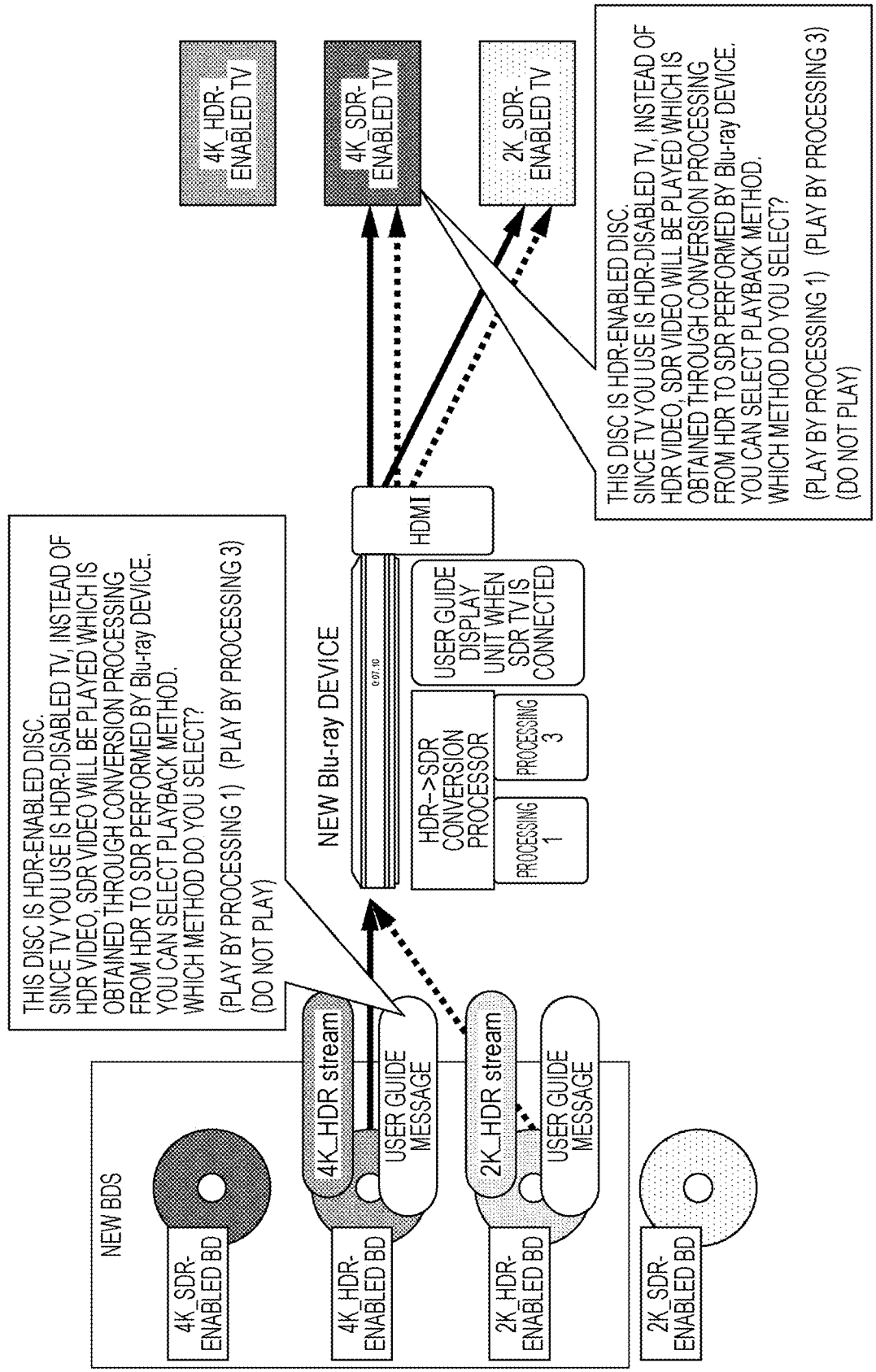
FIG. 25 is a diagram illustrating an example of the user guidance display method.

FIG. 25 is a diagram illustrating the display method of the user guidance menu that allows selection of the processing method at a time of performing the conversion processing from HDR stored within a disc to SDR.

When metadata for the conversion processing from HDR to SDR is stored in Blu-ray, the Blu-ray device displays that the metadata is stored in Blu-ray. The Blu-ray device displays a message prompting that more beautiful conversion will be available if the user selects a specified conversion scheme. That is, with Java (registered trademark) commands within the disc, etc., determination is made what type of conversion processing from HDR to SDR is implemented in the Blu-ray device. This allows the Blu-ray device to display a selection menu of conversion processing schemes from HDR to SDR, such as, "This disc is an HDR-enabled disc. Since the TV you use is an HDR-disabled TV, instead of an HDR video, an SDR video will be played which is obtained through conversion processing from HDR to SDR performed by the Blu-ray device. Which method do you select? (Play by processing 1), (Play by processing 3), (Do not play)". Here, processing 1 and processing 3 are different types of conversion processing from HDR to SDR.

Thus, when the display apparatus does not support video output of the luminance range of the first video signal (HDR signal), the data output apparatus (Blu-ray device) causes the display apparatus to display the message for the user to select one of the plurality of conversion schemes for converting the first luminance range into the second luminance range.

19. User Guidance Display Method 5

Note that a similar message can also be displayed for broadcast. For example, a TV or playback apparatus that does not support the HDR signal displays a message by using an application of data broadcasting, etc, saying that a broadcast program uses the HDR signal and may not be displayed correctly when viewed with such a TV or playback apparatus. A TV or playback apparatus that supports the HDR signal may not display the message. In addition, a tag value indicating an attribute of the message indicates that the message is an alarm message about the HDR signal. The TV or playback apparatus that supports the HDR signal determines that display of the message is unnecessary with reference to the tag value.

20. Playback Operation of Dual Disc 1

A playback operation of the HDR disc that stores only the HDR signal has been described above.

Figure 26:
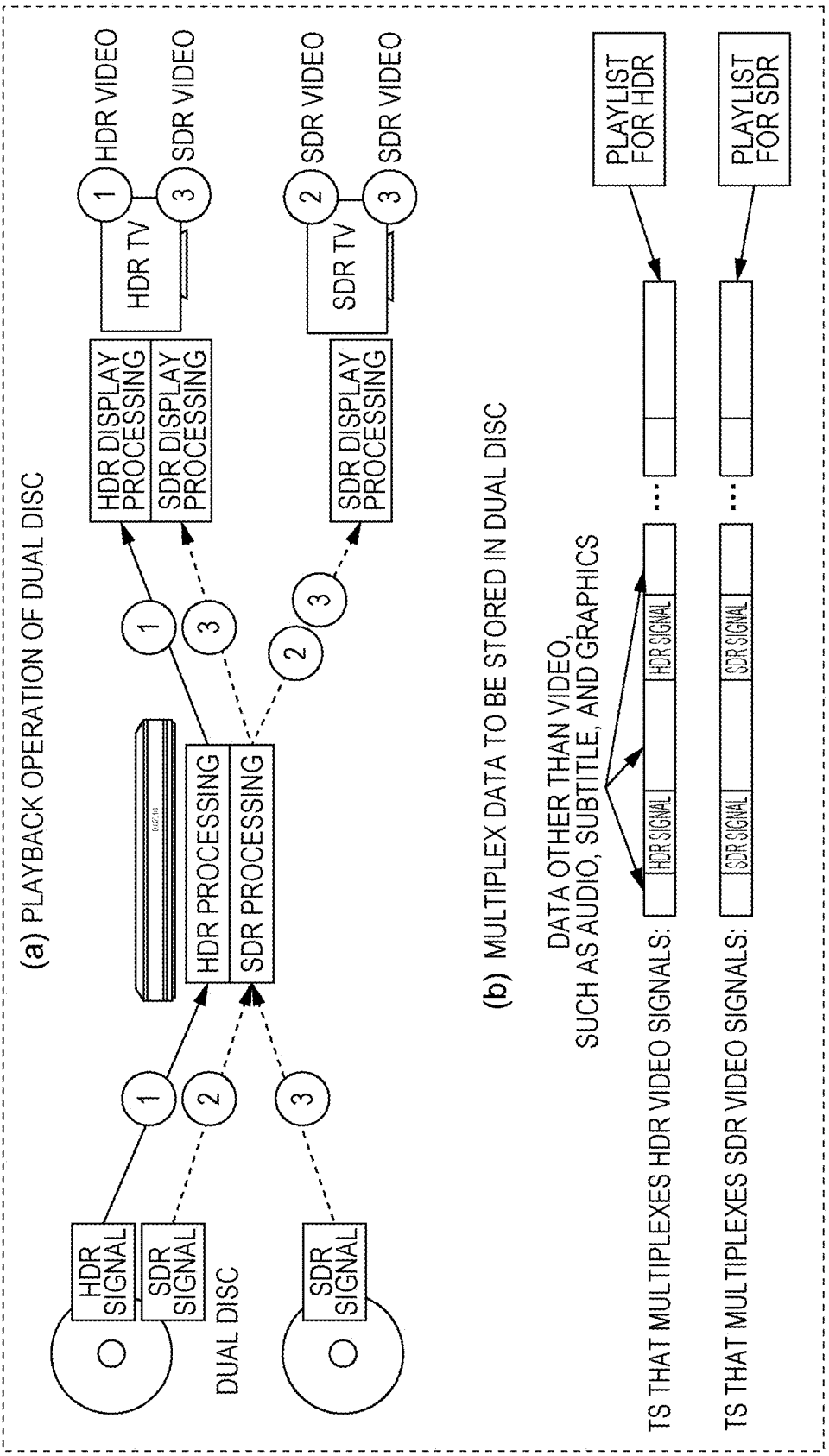
FIG. 26 is a diagram illustrating a playback operation of a dual disc.

Next, multiplex data to be stored in a dual disc that stores both the HDR signal and the SDR signal will be described with reference to FIG. 26. FIG. 26 is a diagram illustrating the multiplex data to be stored in the dual disc.

In the dual disc, as illustrated in FIG. 26, the HDR signal and the SDR signal are stored as multiplex streams different from each other. For example, in an optical disc such as Blu-ray, data of a plurality of media, such as video, audio, subtitles, and graphics, is stored as one multiplex stream by an MPEG-2 TS-based multiplexing scheme called M2TS. These multiplex streams are referenced from metadata for playback control, such as the playlist. During playback, a player selects the multiplex stream to be played, or data of individual language stored in the multiplex stream by analyzing the metadata. This example indicates a case where the playlist for HDR and the playlist for SDR are stored individually, and where each playlist references the HDR signal or the SDR signal. Identification information or the like indicating that both the HDR signal and the SDR signal are stored may be indicated separately.

Although it is possible to multiplex both the HDR signal and the SDR signal in an identical multiplex stream, it is necessary for such multiplexing to satisfy a buffer model, such as T-STD (System Target Decoder) prescribed in MPEG-2 TS. In particular, it is difficult to multiplex two videos with high bit rate within a range of a predetermined data reading rate. Therefore, preferably the multiplex streams are separated.

It is necessary to store data of audio, subtitles, graphics, etc. in each multiplex stream, and data volume increases as compared with multiplexing in one stream. However, against the increase in the data volume, the data volume of video can be reduced by using a video coding scheme with a high compression ratio. For example, changing MPEG-4 AVC used in conventional Blu-ray into HEVC (High Efficiency Video Coding) is expected to provide improvement in the compression ratio by a factor of 1.6 to 2. Only a combination that fits into capacity of an optical disc may be allowed to be stored in a dual disc, such as storing a combination of two 2K streams or a combination of a 4K stream and a 2K stream, including a combination of a 2K HDR stream and a 2K SDR stream, and a combination of a 4K SDR stream and a 2K HDR stream, by prohibiting storage of two 4K streams.

21. Playback Operation of Dual Disc 2

Figure 27:
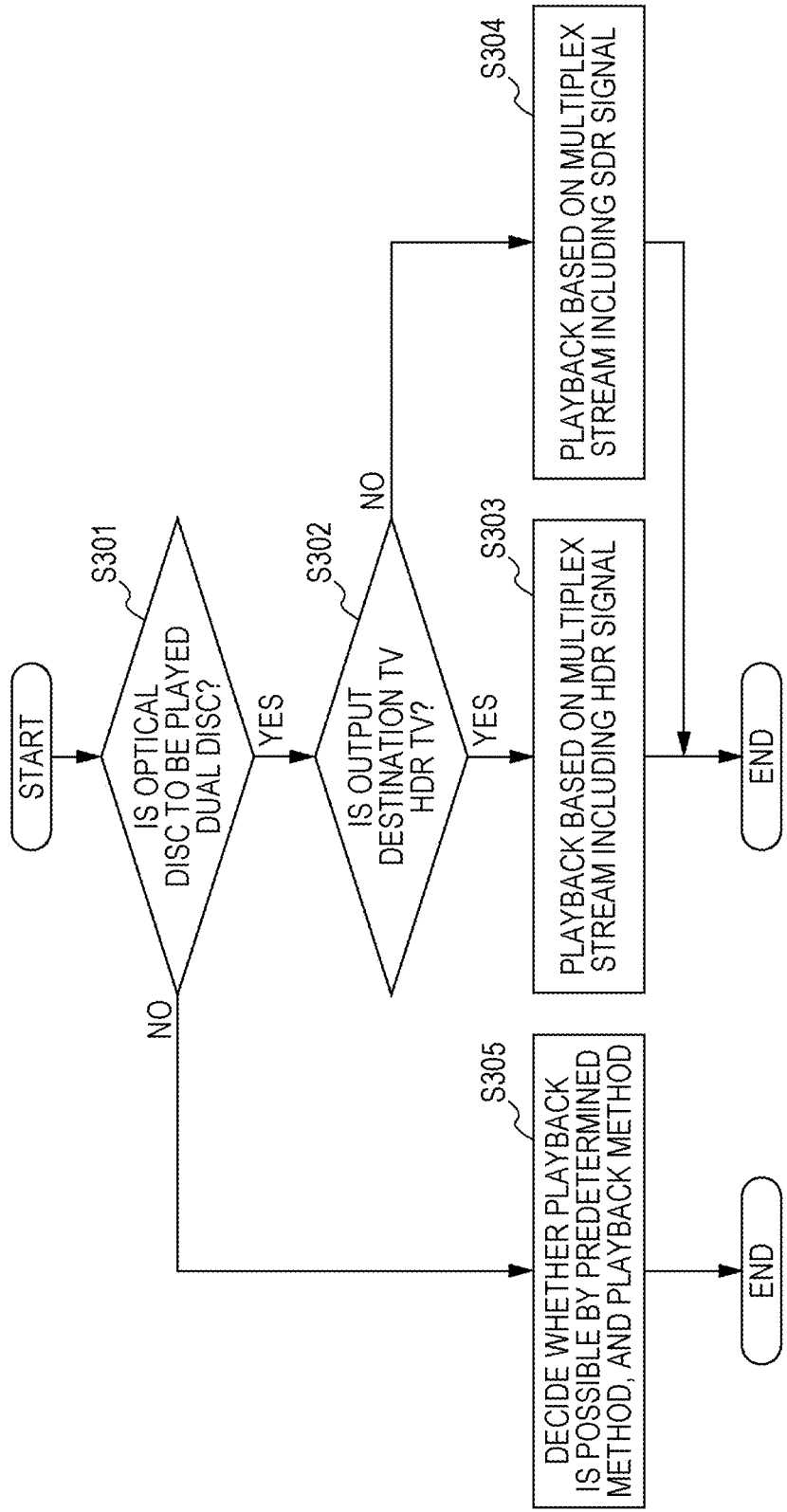
FIG. 27 is a flowchart illustrating the playback operation of the dual disc.

FIG. 27 is a flowchart illustrating the playback operation of the dual disc.

First, the playback apparatus determines whether an optical disc to be played is a dual disc (S301). When it is determined that the optical disc to be played is a dual disc (Yes in S301), the playback apparatus determines whether an output destination TV is an HDR TV or SDR TV (S302). When it is determined that the TV is an HDR TV (Yes in S302), the processing advances to step S303. When it is determined that the TV is an SDR TV (No in S302), the processing advances to step S304. In step S303, the playback apparatus acquires a video signal of HDR from the multiplex stream including the HDR signal within the dual disc, and decodes and outputs the video signal to the HDR TV. In step S304, the playback apparatus acquires a video signal of SDR from the multiplex stream including the SDR signal within the dual disc, and decodes and outputs the video signal to the SDR TV. When it is determined in step S301 that the optical disc to be played is not a dual disc (No in S301), the playback apparatus determines whether playback is possible by a predetermined method, and decides a playback method based on a result of the determination (S305).

22. Types of Disc

As described above, in response to high resolution and high luminance range of the display apparatus, a plurality of types of Blu-ray disc adapted to specifications of the display apparatus (hereinafter referred to as BD) is provided. FIG. 28 is a diagram illustrating the types of BD. As illustrated in FIG. 28, the following describes that a BD on which a video signal is recorded with the resolution of the first resolution and the luminance range of the first luminance range is described as a 2K_SDR-enabled BD. The video signal with the resolution of the first resolution and the luminance range of the first luminance range is stored on the BD as a stream. This stream is described as a 2K_SDR stream. The 2K_SDR-enabled BD is a conventional BD.

Also, a BD on which a video signal is recorded with the resolution of the second resolution and the luminance range of the first luminance range is described as a 4K_SDR-enabled BD. The video signal with the resolution of the second resolution and the luminance range of the first luminance range is stored on the BD as a stream. This stream is described as a 4K_SDR stream.

Similarly, a BD on which a video signal is recorded with the resolution of the first resolution and the luminance range of the second luminance range is described as a 2K_HDR-enabled BD. The video signal with the resolution of the first resolution and the luminance range of the second luminance range is stored on the BD as a stream. This stream is described as a 2K_HDR stream.

Also, a BD on which a video signal is stored with the resolution of the second resolution and the luminance range of the second luminance range is described as a 4K_HDR-enabled BD. The video signal with the resolution of the second resolution and the luminance range of the second luminance range is stored on the BD as a stream. This stream is described as a 4K_HDR stream.

Note that the first resolution, which is for example so-called 2K resolution (1920×1080, 2048×1080), may be any resolution including such resolution. Hereinafter, the first resolution may be just described as 2K.

Also, the second resolution, which is so-called 4K resolution (3840×2160, 4096×2160), may be any resolution including such resolution. The second resolution is resolution with a larger pixel number than that of the first resolution.

Note that the first luminance range is, for example, SDR (the luminance range with a peak luminance of 100 nit) described above. The second luminance range is, for example, HDR (the luminance range with the peak luminance exceeding 100 nit) described above. The second luminance range includes the entire first luminance range, and the peak luminance of the second luminance range is larger than the peak luminance of the first luminance range.

Figure 29:
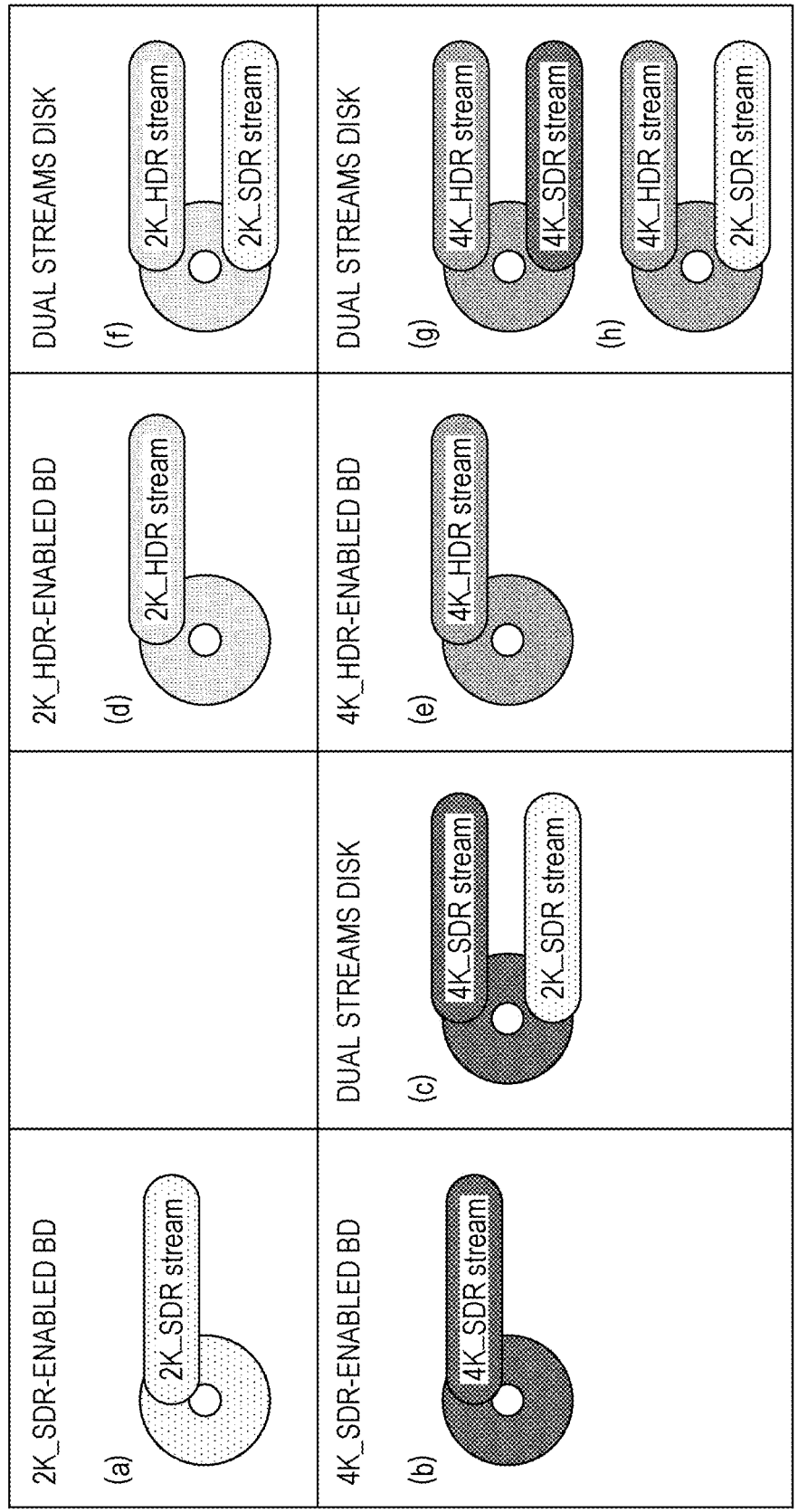
FIG. 29 is a diagram illustrating the types of BD in more detail.

FIG. 29 is a diagram illustrating the types of BD in more detail.

As illustrated in FIG. 29 (c), (f), (g), and (h), a dual-stream disc may be considered in which one BD supports a plurality of video representation methods. The dual-stream disc is a BD on which a plurality of video signals for playing identical content is recorded. At least one of resolution and luminance range of the plurality of video signals differs.

Specifically, the dual-stream disc illustrated in FIG. 29 (c) is a BD on which the 4K_SDR stream and the 2K_SDR stream are recorded. The dual-stream disc illustrated in FIG. 29 (f) is a BD on which the 2K_HDR stream and the 2K_SDR stream are recorded.

The dual-stream disc illustrated in FIG. 29 (g) is a BD on which the 4K_HDR stream and the 4K_SDR stream are recorded. The dual-stream disc illustrated in FIG. 29 (h) is a BD on which the 4K_HDR stream and the 2K_SDR stream are recorded.

Note that the dual-stream disc illustrated in FIG. 29 (c) is not necessary because the Blu-ray device is capable of performing down conversion of resolution (hereinafter also referred to as down convert) from 4K to 2K,

23. Disc Capacity 1

Figure 30:
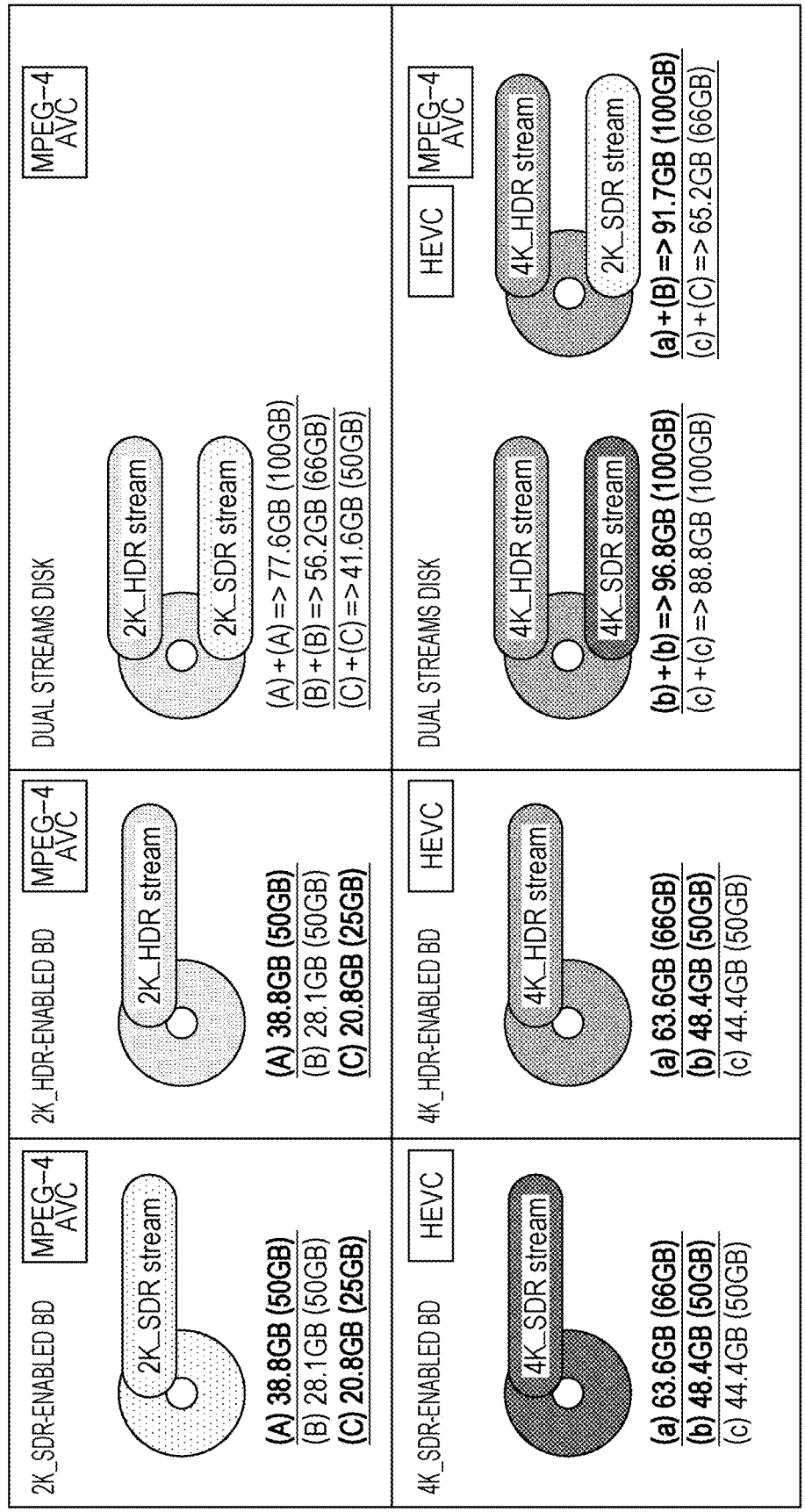
FIG. 30 is a first diagram illustrating data volume to be recorded on a BD.
Figure 31:
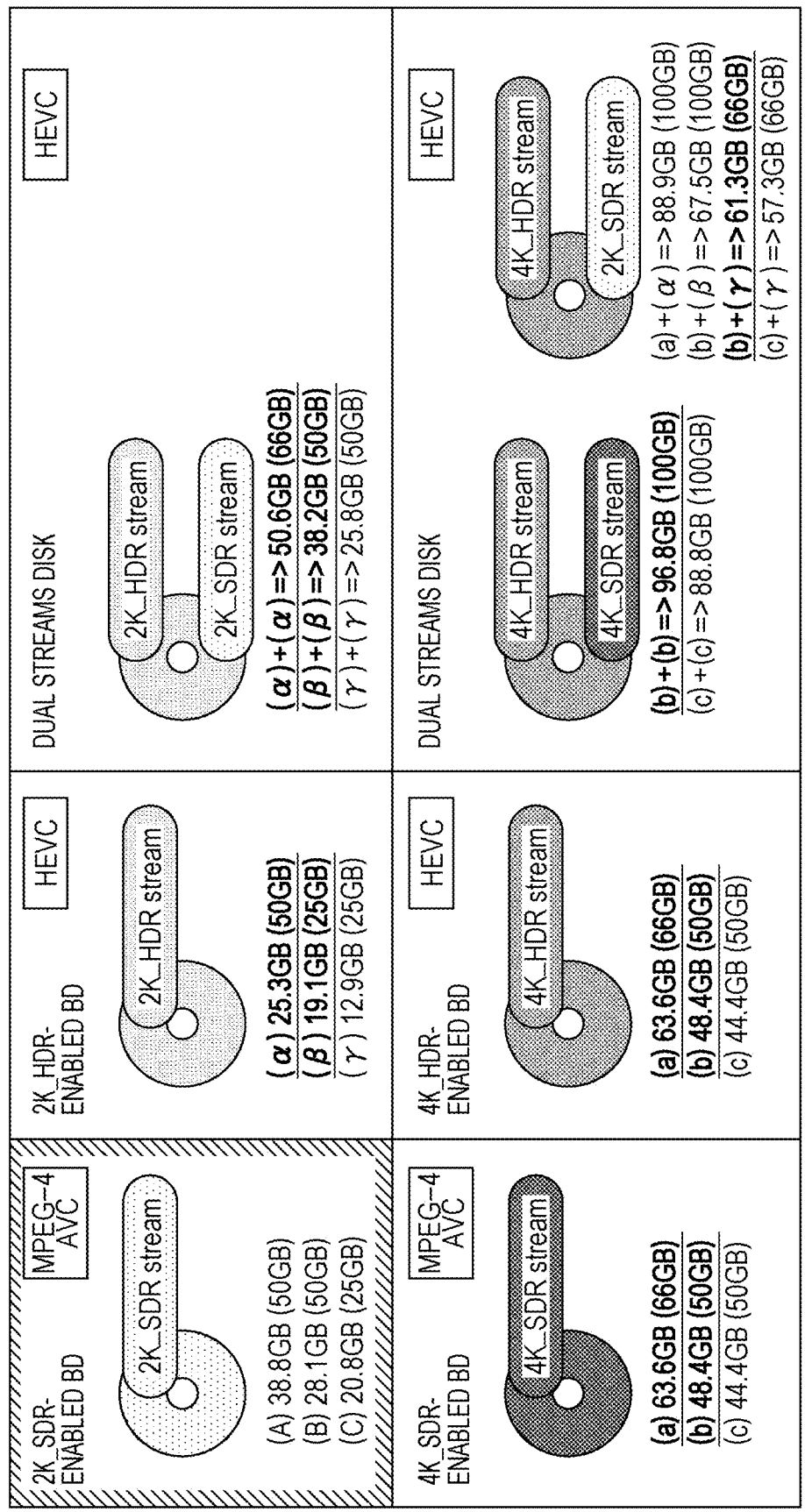
FIG. 31 is a second diagram illustrating the data volume to be recorded on the BD.

Here, each BD as described above will be supplemented with reference to FIG. 30 and FIG. 31. FIG. 30 and FIG. 31 are diagrams each illustrating data volumes to be recorded on a BD.

FIG. 30 and FIG. 31 each illustrate the data volumes of streams actually used in each BD and dual-stream disc.

FIG. 30 illustrates a case where the streams with a resolution of 2K (2K_SDR streams and 2K_HDR streams) are compressed using MPEG-4 AVC. Bit rates of Movie length, lossless Audio, and Compressed Audio are as follows. Note that the BD records voice streams for a number of languages (Lossless Audio and Compressed Audio).

Movie length: 150 min (14 to 18 mbps)
Lossless Audio: 0 to 2 languages (4.5 mbps)
Compressed Audio: 3 to 5 languages (1.5 mbps)

In this case, a maximum value (A), intermediate value (B), and minimum value (C) of necessary disc capacity are as follows.

$$(18+4.5*2+1.5*5) \text{mbps}*(150*60)\text{s}/8=38.8 \text{ GB} \qquad (A)$$

$$(16+4.5*1+1.5*3) \text{mbps}*(150*60)\text{s}/8=28.1 \text{ GB} \qquad (B)$$

$$(14+4.5*0+1.5*3) \text{mbps}*(150*60)\text{s}/8=20.8 \text{ GB} \qquad (C)$$

In addition, FIG. 30 illustrates a case where streams with a resolution of 4K (4K_SDR streams and 4K_HDR streams) are compressed using HEVC. The bit rates of Movie length, lossless Audio, and Compressed Audio are as follows.

Movie length: 150 min (35 to 40 mbps)
Lossless Audio: 0 to 2 languages (4.5 mbps)
Compressed Audio: 3 to 6 languages (1.5 mbps)

In this case, the maximum value (a), intermediate value (b), and minimum value (c) of necessary disc capacity are as follows.

$$(40+4.5*2+1.5*5)\text{mbps}*(150*60)\text{s}/8=63.6\text{ GB} \quad \text{(a)}$$

$$(37+4.5*0+1.5*4)\text{mbps}*(150*60)\text{s}/8=48.4\text{ GB} \quad \text{(b)}$$

$$(35+4.5*0+1.5*3)\text{mbps}*(150*60)\text{s}/8=44.4\text{ GB} \quad \text{(c)}$$

Here, the disc capacity required for a dual-stream disc in which both the 2K_HDR stream compressed using MPEG-4 AVC and the 2K_SDR stream compressed using MPEG-4 AVC are recorded is calculated by (A)+(A), (B)+(B), and (C)+(C) described above. Specifically, the maximum value is 77.6 GB, the intermediate value is 56.2 GB, and the minimum value is 41.6 GB.

Since discs of 66 GB and 100 GB are used in addition to a conventional disc of 50 GB, the dual-stream discs described above are also feasible from a viewpoint of capacity.

Here, the disc capacity required for the dual-stream disc in which both the 4K_HDR stream compressed using HEVC and the 2K_HDR stream compressed using HEVC are recorded is calculated as 96.8 GB according to (b)+(b) described above, and as 88.8 GB according to (c)+(c) described above. Therefore, such a dual-stream disc is feasible with a disc with a capacity of 100 GB.

Similarly, the disc capacity required for the dual-stream disc in which both the 4K_HDR stream compressed using HEVC and the 2K_SDR stream compressed using MPEG-4 AVC are recorded is calculated as 91.7 GB according to (a)+(B) described above, and as 65.2 GB according to (c)+(C) described above. Therefore, such a dual-stream disc is feasible with a disc with a capacity of 100 GB or a disc with a capacity of 66 GB.

24. Disc Capacity 2

Furthermore, another example will be described with reference to FIG. 31. FIG. 31 illustrates a case where streams with a resolution of 2K (2K_SDR streams and 2K_HDR streams) are compressed using HEVC. The bit rates of Movie length, lossless Audio, and Compressed Audio are as follows.
Movie length: 150 min (7 to 9 mbps)
Lossless Audio: 0 to 2 languages (4.5 mbps)
Compressed Audio: 3 to 5 languages (1.5 mbps)

In this case, the maximum value (A), intermediate value (B), and minimum value (C) of necessary disc capacity are as follows.

$$(9+4.5*2+1.5*5)\text{mbps}*(150*60)\text{s}/8=25.3\text{ GB} \quad (\alpha)$$

$$(8+4.5*1+1.5*3)\text{mbps}*(150*60)\text{s}/8=19.1\text{ GB} \quad (\beta)$$

$$(7+4.5*0+1.5*3)\text{mbps}*(150*60)\text{s}/8=12.9\text{ GB} \quad (\gamma)$$

Here, the disc capacity required for a dual-stream disc in which both the 2K_HDR stream compressed using HEVC and the 2K_SDR stream compressed using HEVC are recorded is calculated by $(\alpha)+(\alpha)$, $(\beta)+(\beta)$, and $(\gamma)+(\gamma)$ described above. Specifically, the maximum value is 50.6 GB, the typical value is 38.2 GB, and the minimum value is 25.8 GB.

Since discs of 66 GB and 100 GB are used in addition to a conventional disc of 50 GB, the dual-stream discs described above are also feasible from a viewpoint of capacity.

Similarly, the disc capacity required for a dual-stream disc in which both the 4K_HDR stream compressed using HEVC and the 2K_SDR stream compressed using HEVC are recorded is calculated as 88.9 GB according to $(a)+(\alpha)$ described above, as 67.5 GB according to $(b)+(\beta)$ described above, as 61.3 GB according to $(b)+(\gamma)$ described above, and as 57.3 GB according to $(c)+(\gamma)$ described above. Therefore, such a dual-stream disc is feasible with a disc with a capacity of 100 GB or a disc with a capacity of 66 GB.

25. Details of Disc Type 1

In more detail, a video stream and a graphic stream (stream of graphics of a first exemplary embodiment) are recorded on the BD. Here, FIG. 32 is a diagram illustrating an example of a combination of the video streams and the graphic streams recorded on each disc for each BD including the dual-stream discs.

Figure 32:
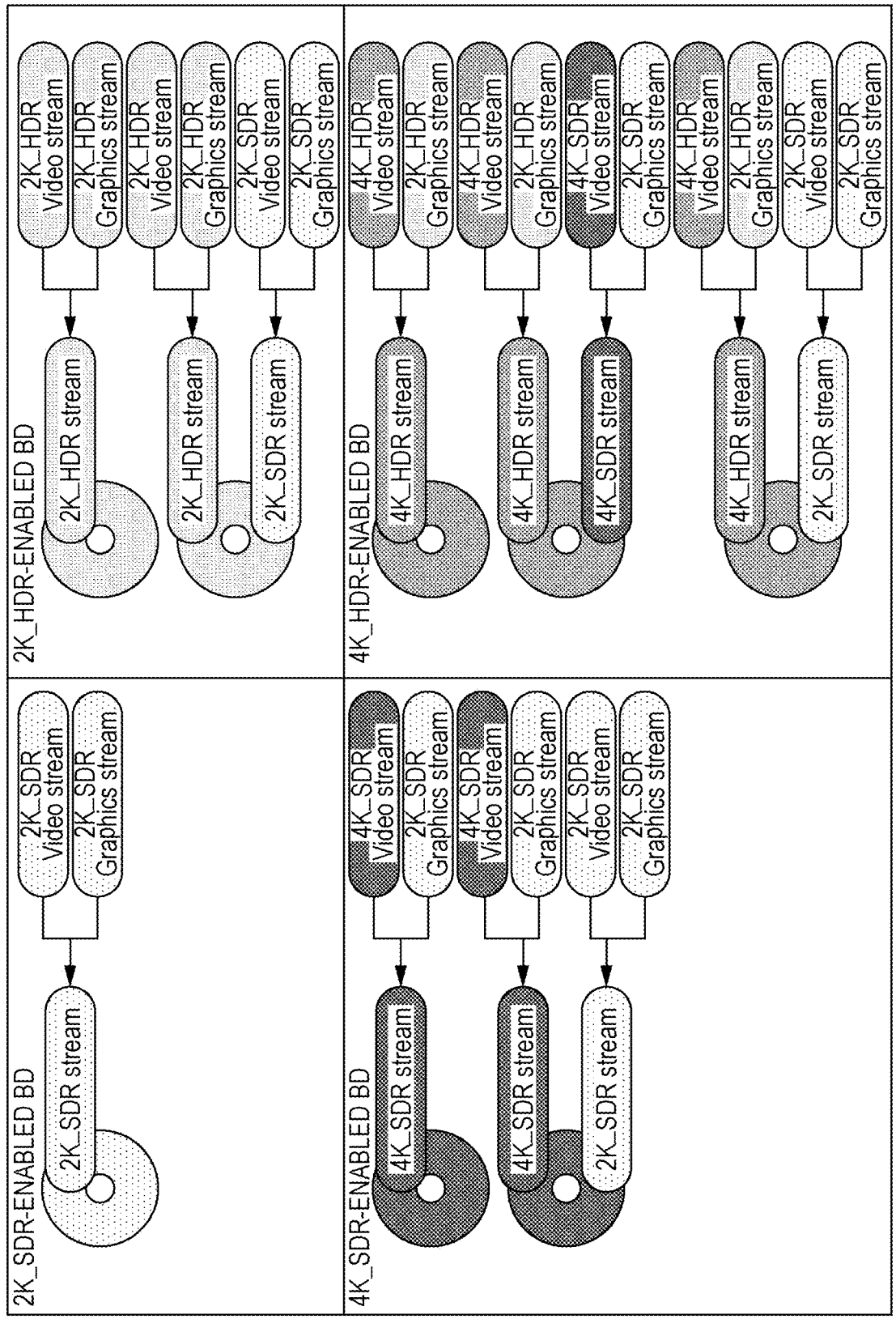
FIG. 32 is a diagram illustrating an example of combination of video streams and graphic streams recorded on each disc of BD and dual-stream disc.

In FIG. 32, the graphic stream is recorded in a resolution of 2K regardless of the resolution of the corresponding video stream, in consideration of time and effort of content (BD) production. The graphic stream can be shared between the 2K_SDR stream and the 4K_SDR stream. However, the graphic stream is recorded in the luminance range adapted to the luminance range of the corresponding video stream. When the video stream is HDR, the graphic stream of HDR is recorded. When the video stream is SDR, the graphic stream of SDR is recorded. Conversion of the graphic stream from SDR to HDR is performed when content is produced.

26. Details of Disc Type 2

Figure 33:
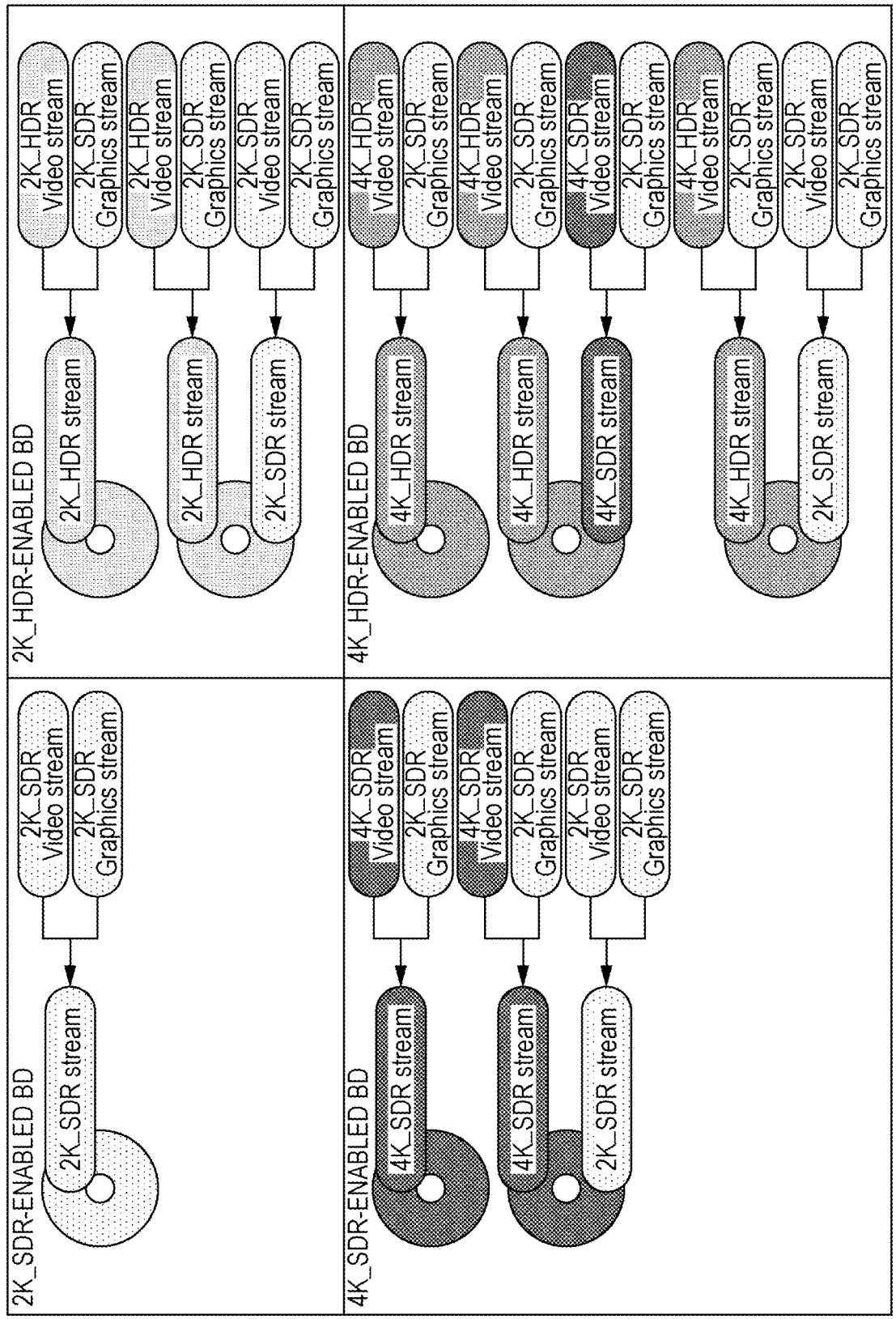
FIG. 33 is a diagram illustrating another example of combination of the video streams and the graphic streams recorded on each disc of BD and dual-stream disc.

FIG. 33 is a diagram illustrating another example of the combination of the video streams and the graphic streams recorded on each disc for each BD including the dual-stream discs.

In FIG. 33, the graphic stream is recorded in a resolution of 2K and luminance range of SDR regardless of the resolution and luminance range of the corresponding video stream, in consideration of time and effort of content production. The graphic stream can be shared among all of the 2K_SDR stream, 4K_SDR stream, 2K_HDR stream, and 4K_HDR stream. In this case, both of conversion of the resolution of the graphic stream from 2K to 4K, and conversion of the luminance range of the graphic stream from SDR to HDR are performed by the Blu-ray device.

27. Details of Disc Type 3

Figure 34:
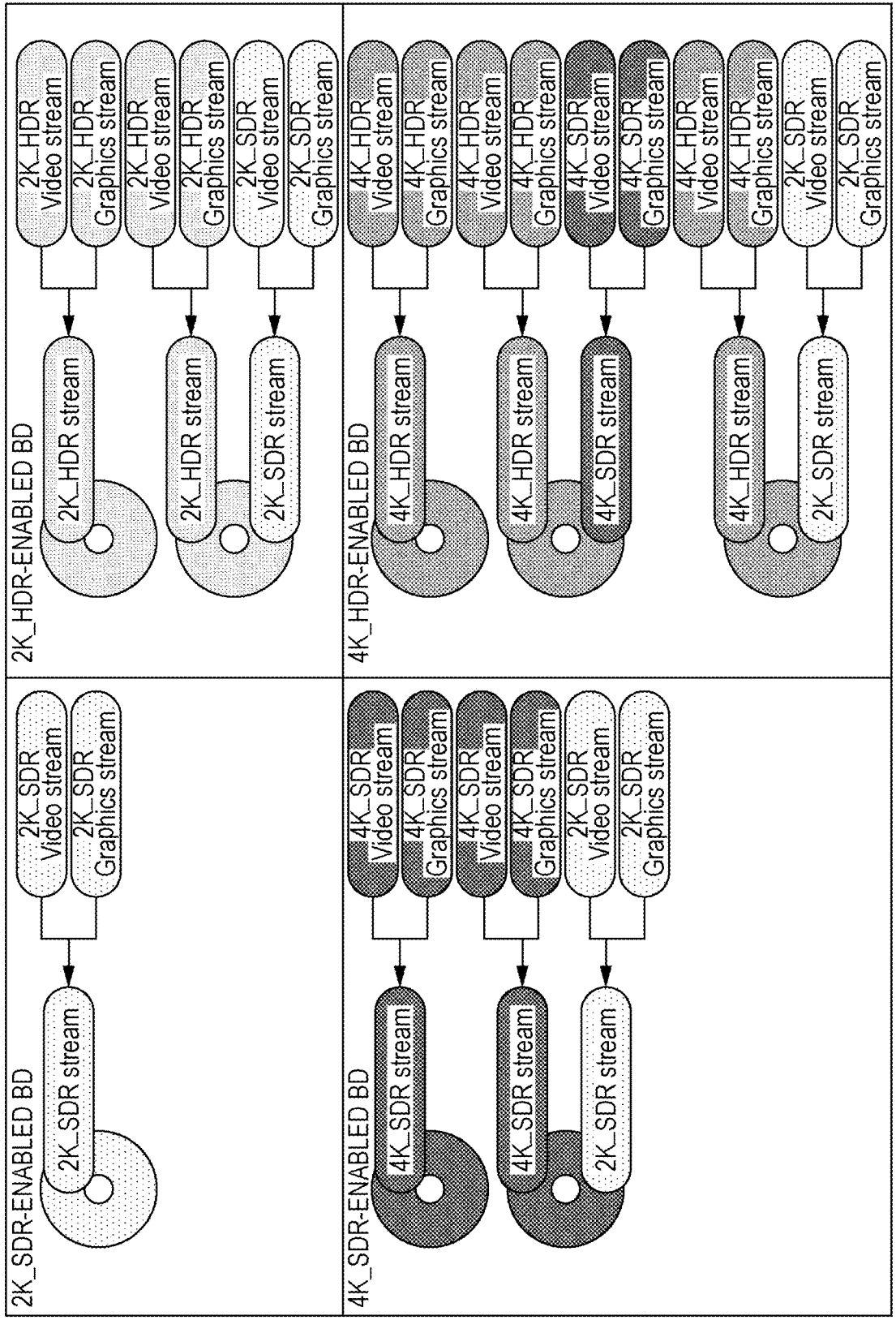
FIG. 34 is a diagram illustrating still another example of combination of the video streams and the graphic streams recorded on each disc of BD and dual-stream disc.

FIG. 34 is a diagram illustrating still another example of the combination of the video streams and the graphic streams recorded on each disc for each BD including the dual-stream discs.

In FIG. 34, in order to eliminate the need for conversion of the graphic stream in the Blu-ray device, the graphic stream is recorded with the resolution and luminance range of the graphic stream adapted to the resolution and luminance range of the corresponding video stream when content is produced.

28. Summary

The Blu-ray device that plays a 4K-enabled BD or HDR-enabled BD needs to support four TVs, including a 2K_SDR-enabled TV, 2K_HDR-enabled TV, 4K_SDR-enabled TV, and 4K_HDR-enabled TV. Specifically, the Blu-ray device needs to support three sets of HDMI/HDCP standards (HDMI 1.4/HDCP 1.4, HDMI 2.0/HDCP 2.1, HDMI 2.1/HDCP 2.2).

Furthermore, when playing four types of Blu-ray discs (2K_SDR-enabled BD, 2K_HDR-enabled BD, 4K_SDR-enabled BD, and 4K_HDR-enabled BD), the Blu-ray device needs to select appropriate processing and HDMI/HDCP for each BD (content) and for each connected display apparatus (TV). Furthermore, when compositing video and graphics, the Blu-ray device needs to change the processing in accordance with the type of BD and the type of connected display apparatus (TV).

This complicates internal processing of the Blu-ray device significantly. The aforementioned third exemplary embodiment has provided various techniques for relatively simplifying the internal processing of the Blu-ray device.

[1] When the HDR signal is displayed on an HDR-disabled TV, the conversion from HDR to SDR is required. In order to make this conversion an option in the Blu-ray device, the aforementioned third exemplary embodiment has proposed the BD configuration called dual-stream disc.

[2] In addition, the aforementioned third exemplary embodiment has applied limitation to the graphic stream to reduce the type of combination of the video stream and the graphic stream.

[3] The aforementioned third exemplary embodiment has significantly reduced a number of combination of complicated processing steps in the Blu-ray device by the dual stream disc and limitation of the graphic stream.

[4] The aforementioned third exemplary embodiment has presented internal processing and HDMI processing that do not produce inconsistency in processing of the dual-stream disc, even when pseudo HDR conversion is introduced.

In a case of displaying the HDR video on the SDR TV in the conversion method of the present disclosure, by making use of the fact that the peak luminance of the SDR TV for display exceeds 100 nit (normally 200 nit or more), "HDR to pseudo HDR conversion processing" is implemented that allows conversion of the HDR video into a pseudo HDR video similar to an original HDR and display on the SDR TV, by converting the HDR video while maintaining gradation of a region exceeding 100 nit to some extent, instead of conversion of the HDR video into the SDR video of 100 nit or less.

In this conversion method, the conversion method of the "HDR to pseudo HDR conversion processing" may be switched in accordance with the display characteristic of the SDR TV (maximum luminance, input-output characteristic, and display mode).

Conceivable acquisition methods of display characteristic information include (1) automatic acquisition through HDMI or a network, (2) generation by causing the user to input information such as a manufacturer name and model number, and (3) acquisition from a cloud, etc. using the information such as the manufacturer name and the model number.

Conceivable acquisition timing of the display characteristic information by conversion apparatus 100 includes (1) acquisition immediately before pseudo HDR conversion, and (2) when connected to display apparatus 200 (such as the SDR TV) for the first time (when the connection is established).

In this conversion method, the conversion method may be switched in accordance with luminance information on the HDR video (CAL, CPL).

Examples of the conceivable acquisition method of the luminance information on the HDR video by conversion apparatus 100 include (1) acquisition as metadata information appended to the HDR video, (2) acquisition by causing the user to input title information on content, and (3) acquisition from a cloud, etc. using input information that is input by the user.

Details of the conversion method include (1) conversion so that the luminance would not exceed DPL, (2) conversion so that CPL would become DPL, (3) not changing the luminance equal to or less than CAL and vicinity thereof, (4) conversion using a natural logarithm, and (5) clip processing at DPL.

In order to enhance an effect of pseudo HDR, this conversion method may include transmitting display settings such as a display mode and display parameter of the SDR TV to display apparatus 200 for switching. For example, a message prompting the user to make display settings may be displayed on a screen.

29. Necessity for Pseudo HDR 1

Next, necessity for pseudo HDR will be described with reference to FIG. 35A to FIG. 35C.

FIG. 35A is a diagram illustrating an example of display processing for converting an HDR signal and performing HDR display within an HDR TV.

As illustrated in FIG. 35A, in displaying an HDR video, a maximum value of the luminance range of HDR (peak luminance (HPL (HDR Peak Luminance): example 1500 nit)) may not be displayed as it is even if the display apparatus is an HDR TV. In this case, luminance conversion is performed to adapt a linear signal after inverse quantization using EOTF of HDR to a maximum value of the luminance range of the display apparatus (peak luminance (DPL (Display Peak luminance): example 750 nit)). Then, inputting a video signal obtained through the luminance conversion into the display apparatus allows for displaying the HDR video adapted to the maximum luminance range which is a limit of the display apparatus.

FIG. 35B is a diagram illustrating an example of display processing for performing HDR display by using an HDR-enabled playback apparatus and SDR TV.

As illustrated in FIG. 35B, in displaying the HDR video, when the display apparatus is an SDR TV, by making use of the fact that the maximum value of the luminance range of the SDR TV for display (peak luminance (DPL: example 300 nit)) exceeds 100 nit, "EOTF conversion of HDR" performed in the HDR TV and "luminance conversion" using DPL (example: 300 nit), which is the maximum value of the luminance range of the SDR TV, are performed in the "HDR to pseudo HDR conversion processing" within the HDR-enabled playback apparatus (Blu-ray device) of FIG. 35B. If a signal obtained by performing the "luminance conversion" can be input directly into the "display apparatus" of the SDR TV, an effect identical to the effect of the HDR TV can be achieved even if the SDR TV is used.

However, this cannot be achieved because the SDR TV does not have means for performing direct input of such a signal from outside.

Figure 35C:
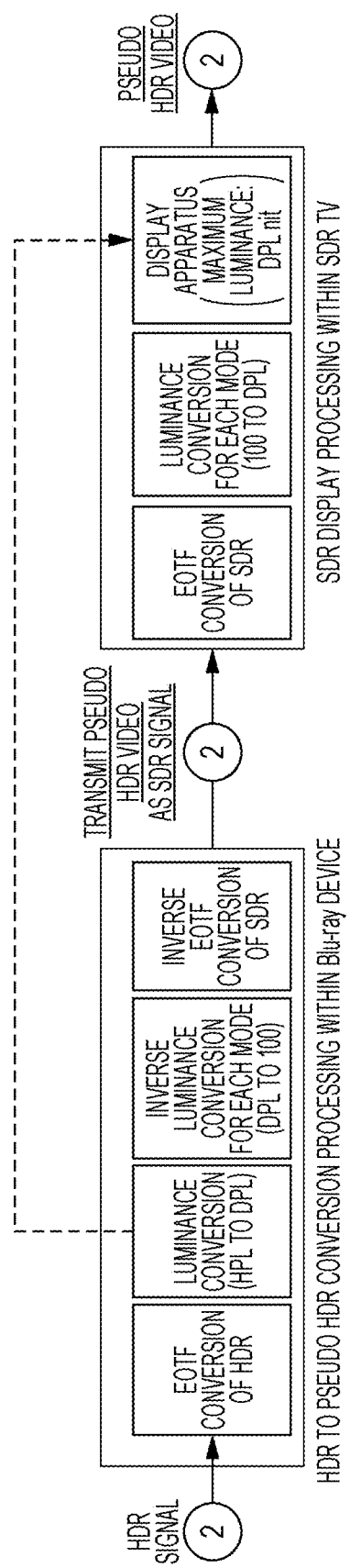
FIG. 35C is a diagram illustrating an example of display processing to perform HDR display using the HDR-enabled playback apparatus and SDR TV connected to each other via a standard interface.

FIG. 35C is a diagram illustrating an example of display processing for performing HDR display using the HDR-enabled playback apparatus and SDR TV connected to each other via a standard interface.

As illustrated in FIG. 35C, it is necessary to input into the SDR TV a signal that provides the effect of FIG. 35B by using an input interface usually included in the SDR TV (such as HDMI). In the SDR TV, the signal that is input via the input interface passes through "EOTF conversion of SDR", "luminance conversion for each mode", and "display apparatus" sequentially, and displays a video adapted to the maximum luminance range value of the display apparatus. Therefore, within the HDR-enabled Blu-ray device, a signal (pseudo HDR signal) is generated for cancelling "EOTF conversion of SDR" and "luminance conversion for each mode" through which the signal passes immediately after the input interface in the SDR TV. That is, within the HDR-enabled Blu-ray device, by performing "inverse luminance conversion for each mode", and "inverse EOTF conversion of SDR" immediately after "EOTF conversion of HDR" and "luminance conversion" using the peak luminance (DPL) of the SDR TV, a pseudo effect identical to the effect in a case where a signal immediately after the "luminance conversion" is input into the "display apparatus" (dashed arrow of FIG. 35C) is achieved.

30. Necessity for Pseudo HDR 2

A normal SDR TV, whose input signal is 100 nit, has capability of visual representation of 200 nit or more adapted to viewing environments (dark room: cinema mode, bright room: dynamic mode, etc.). However, since a luminance upper limit of the input signal to the SDR TV is determined as 100 nit, the capability cannot be used directly.

In a case of displaying the HDR video on the SDR TV, by making use of the fact that the peak luminance of the SDR TV for display exceeds 100 nit (normally 200 nit or more), "HDR to pseudo HDR conversion processing" is performed so that gradation of the luminance range exceeding 100 nit be maintained to some extent, instead of conversion of the HDR video into the SDR video of 100 nit or less. Therefore, the HDR video may be displayed on the SDR TV as a pseudo HDR video close to the original HDR video.

Figure 36:
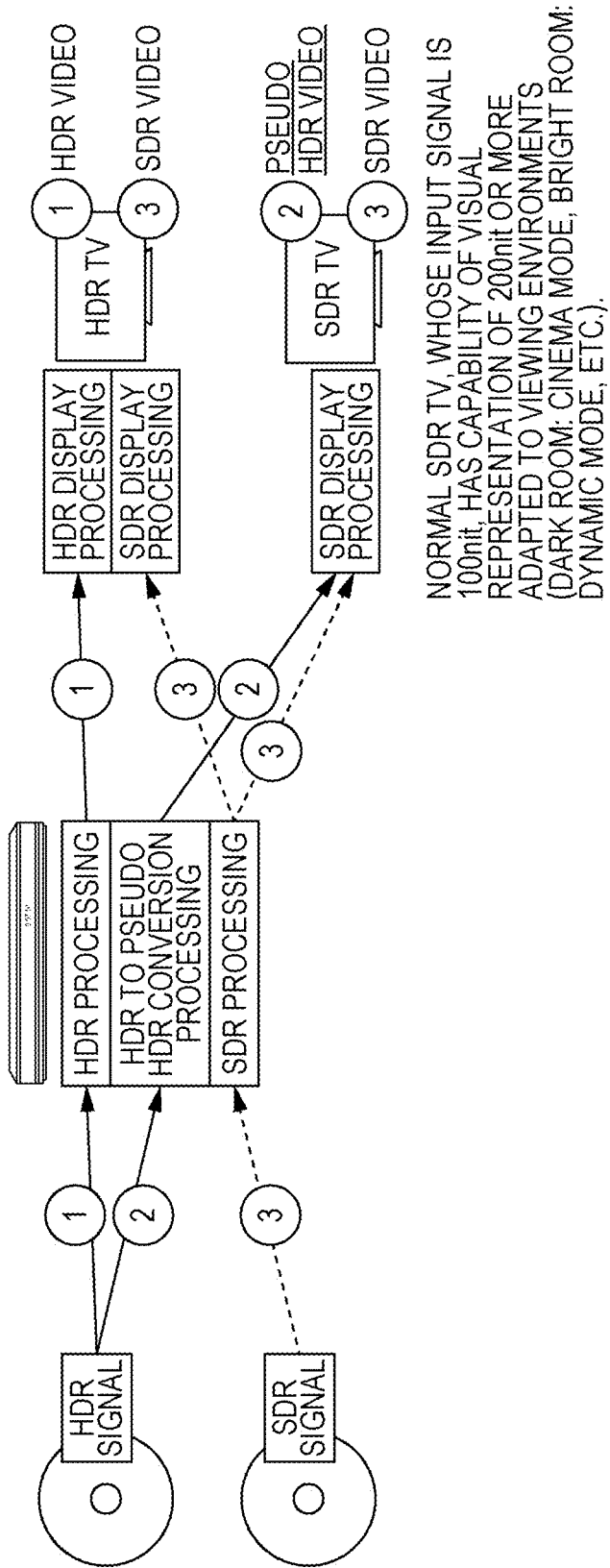
FIG. 36 is a diagram illustrating conversion processing from HDR to pseudo HDR.

When this "HDR to pseudo HDR conversion processing" technique is applied to Blu-ray with an HDR disc storing only the HDR signal and the SDR TV connected to the Blu-ray device as illustrated in FIG. 36, the Blu-ray device performs the "HDR to pseudo HDR conversion processing", converts the HDR signal into the pseudo HDR signal, and sends the pseudo HDR signal to the SDR TV. This allows the SDR TV to display a video with a pseudo HDR effect by converting the received pseudo HDR signal into a luminance value. Thus, even where there is no HDR-enabled TV, when the HDR-enabled BD and HDR-enabled Blu-ray device are prepared, even the SDR TV can display a pseudo HDR video with higher display quality than that of the SDR video.

Therefore, although it has been considered that the HDR-enabled TV is required for watching the HDR video, the pseudo HDR video that provides feeling of an HDR-like effect can be watched with the existing SDR TV. Accordingly, wide use of HDR-enabled Blu-ray is expected.

31. Advantageous Effects, Etc

The HDR signal sent by broadcast, package media such as Blu-ray, and Internet delivery such as OTT is converted into the pseudo HDR signal by performing the HDR-pseudo HDR conversion processing. This allows the HDR signal to be displayed on the existing SDR TV as the pseudo HDR video.

32. About EOTF

Here, EOTF will be described with reference to FIG. 37A and FIG. 37B.

FIG. 37A is a diagram illustrating an example of EOTF (Electro-Optical Transfer Function) that supports each of HDR and SDR.

EOTF is commonly called a gamma curve, indicates correspondence between a code value and a luminance value, and converts the code value into the luminance value. That is, EOTF is correspondence information that indicates the correspondence between a plurality of code values and the luminance value.

Figure 37B:
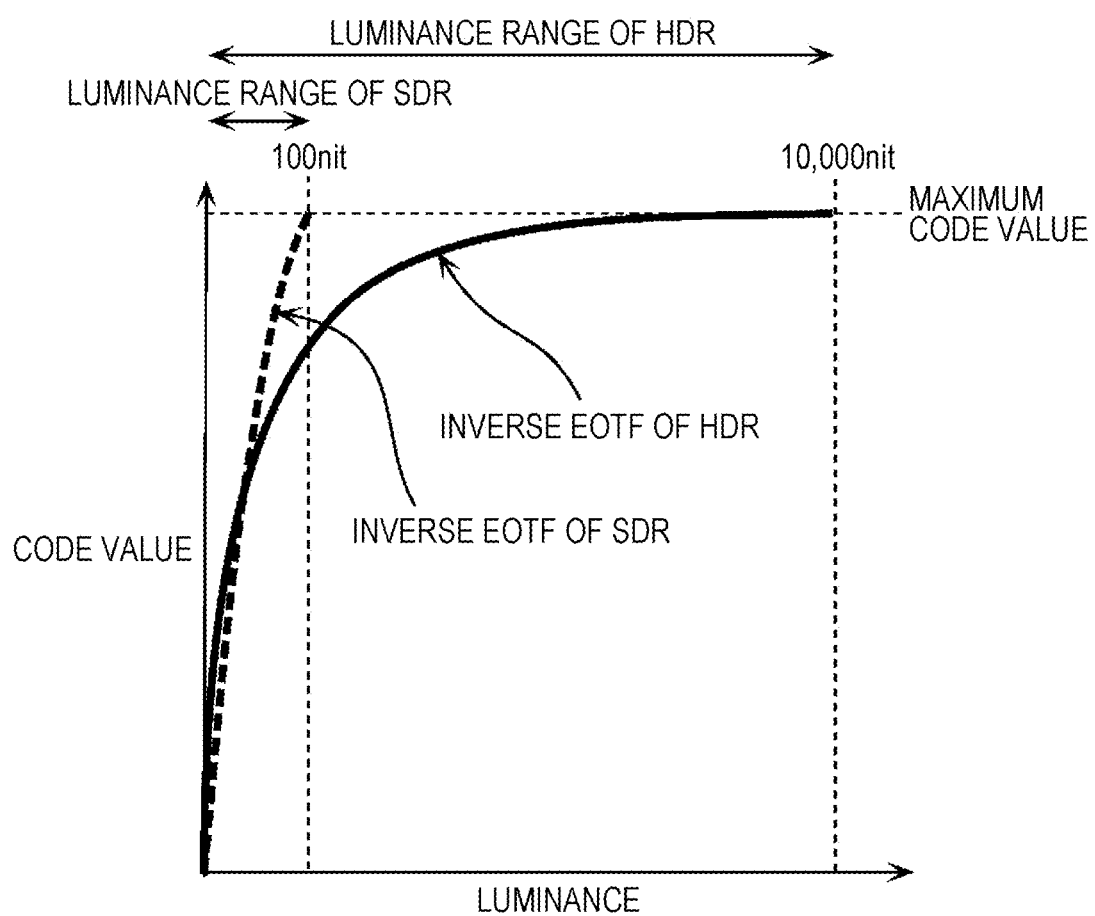
FIG. 37B is a diagram illustrating an example of inverse EOTF that supports each of HDR and SDR.

FIG. 37B is a diagram illustrating an example of inverse EOTF that supports each of HDR and SDR.

Inverse EOTF indicates correspondence between the luminance value and the code value, and quantizes and converts the luminance value into the code value, inversely to EOTF. That is, inverse EOTF is correspondence information that indicates the correspondence between the luminance value and the plurality of code values. For example, in a case of representing a luminance value of an HDR-enabled video with a code value of 10-bit gradation, the luminance value in the luminance range of HDR of up to 10,000 nit is quantized and mapped to 1024 integral values from 0 to 1023. That is, the luminance value (luminance value of the HDR-enabled video) in the luminance range of up to 10,000 nit is converted into the HDR signal of a 10-bit code value by quantization based on inverse EOTF. In HDR-enabled EOTF (hereinafter referred to as "EOTF of HDR") or HDR-enabled inverse EOTF (hereinafter referred to as "inverse EOTF of HDR"), it is possible to represent the luminance value higher than the luminance value in SDR-enabled EOTF (hereinafter referred to as "EOTF of SDR") or SDR-enabled inverse EOTF (hereinafter referred to as "inverse EOTF of SDR"). For example, in FIG. 37A and FIG. 37B, the maximum value of luminance (peak luminance) is 10,000 nit. That is, the luminance range of HDR includes the entire luminance range of SDR, and the peak luminance of HDR is larger than the peak luminance of SDR. The luminance range of HDR is the luminance range with the maximum value enlarged from 100 nit, which is the maximum value of the luminance range of SDR, to 10,000 nit.

For example, one example of EOTF of HDR and inverse EOTF of HDR is SMPTE 2084 standardized by the United States Society of Motion Picture and Television Engineers (SMPTE).

Note that in the following specification, the luminance range described in FIG. 37A and FIG. 37B from 0 nit to 100 nit, which is the peak luminance, may be described as the first luminance range. Similarly, the luminance range described in FIG. 37A and FIG. 37B from 0 nit to 10,000 nit, which is the peak luminance, may be described as the second luminance range.

33. Conversion Apparatus and Display Apparatus

Figure 38:
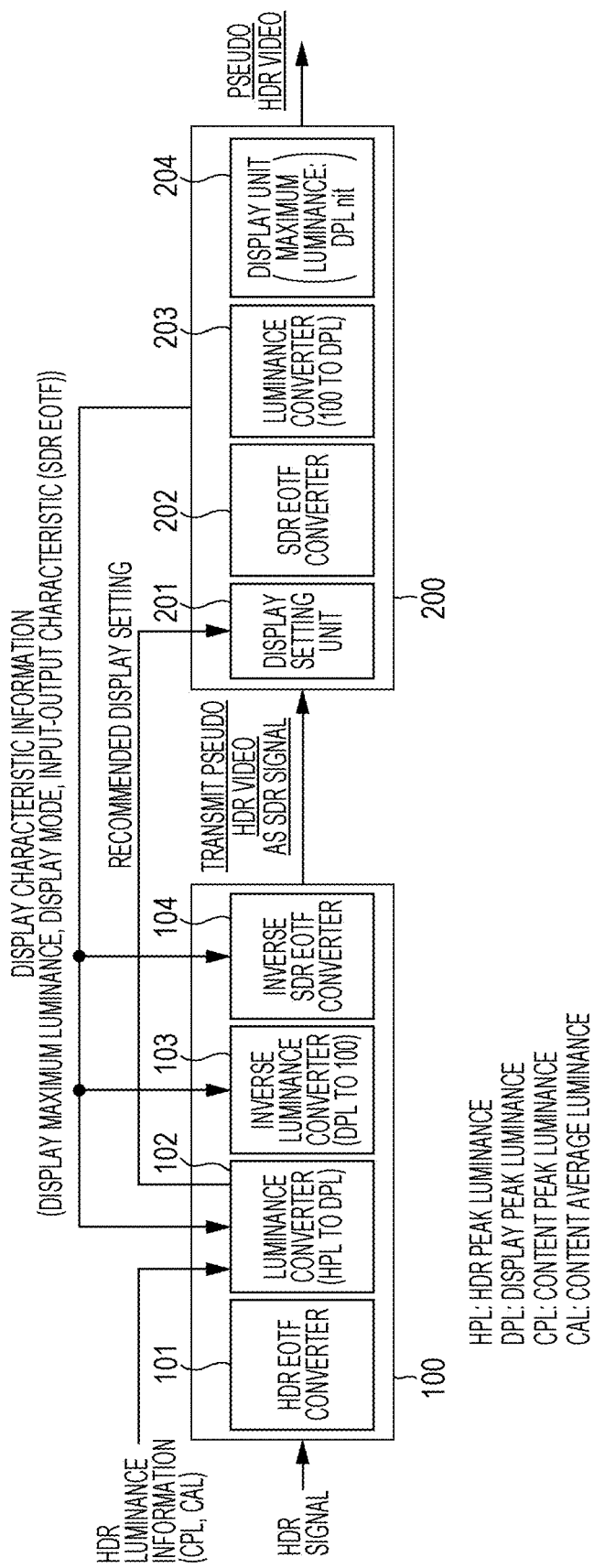
FIG. 38 is a block diagram illustrating a configuration of a conversion apparatus and display apparatus according to the exemplary embodiment.
Figure 39:
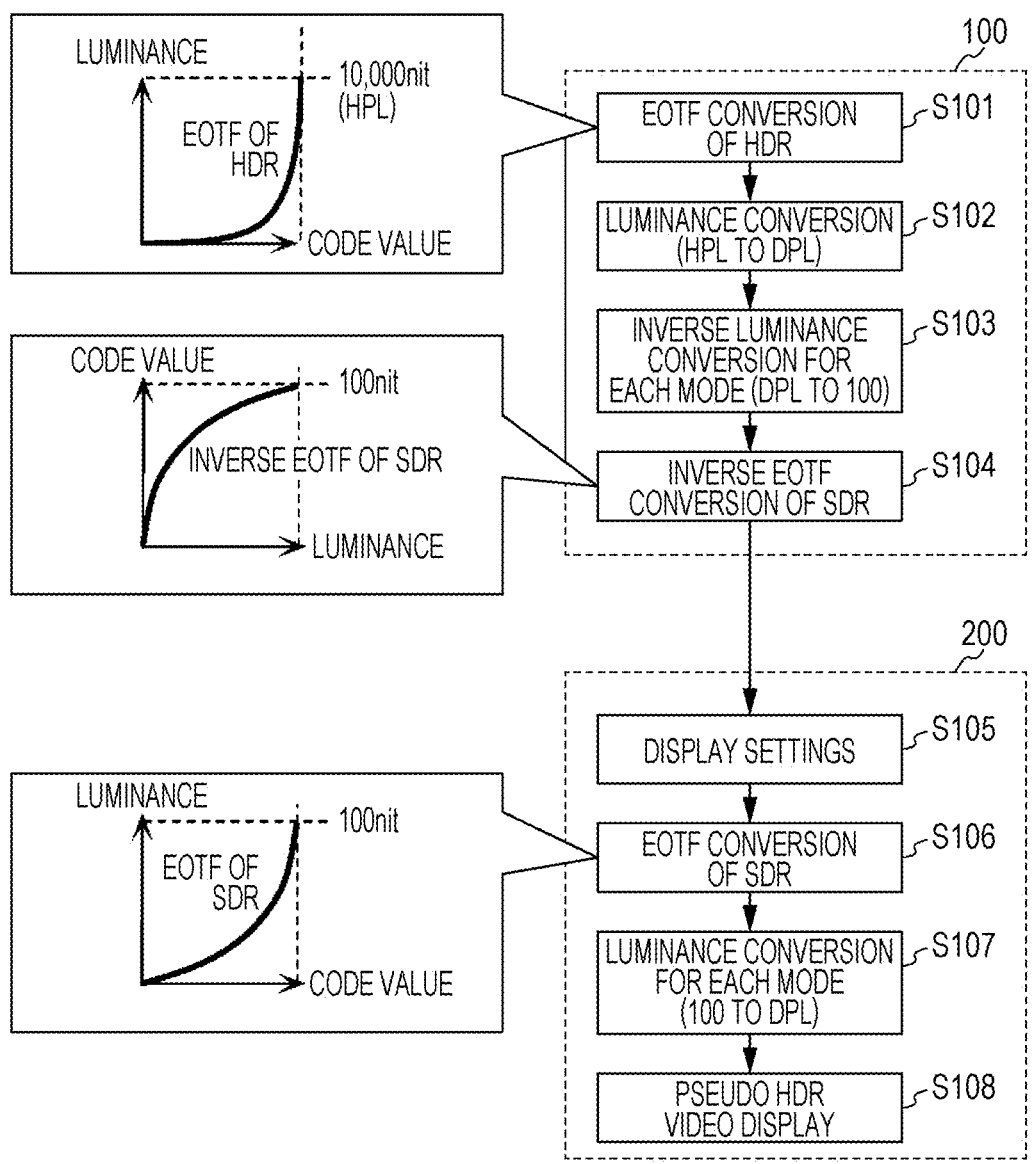
FIG. 39 is a flowchart illustrating a conversion method and display method to be performed by the conversion apparatus and display apparatus according to the exemplary embodiment.

FIG. 38 is a block diagram illustrating a configuration of the conversion apparatus and display apparatus according to the exemplary embodiment. FIG. 39 is a flowchart illustrating the conversion method and display method to be performed by the conversion apparatus and display apparatus according to the exemplary embodiment.

As illustrated in FIG. 38, conversion apparatus 100 includes HDR EOTF converter 101, luminance converter 102, inverse luminance converter 103, and inverse SDR EOTF converter 104. Display apparatus 200 includes display setting unit 201, SDR EOTF converter 202, luminance converter 203, and display unit 204.

Detailed description of each component of conversion apparatus 100 and display apparatus 200 will be made in description of the conversion method and the display method.

34. Conversion Method and Display Method

The conversion method to be performed by conversion apparatus 100 will be described with reference to FIG. 39. Note that the conversion method includes step S101 to step S104 described below.

First, HDR EOTF converter 101 of conversion apparatus 100 acquires the HDR video on which inverse EOTF conversion of HDR is performed. HDR EOTF converter 101 of conversion apparatus 100 performs EOTF conversion of HDR on the HDR signal of the acquired HDR video (S101). Accordingly, HDR EOTF converter 101 converts the acquired HDR signal into a linear signal that indicates the luminance value. An example of EOTF of HDR is SMPTE 2084.

Next, luminance converter 102 of conversion apparatus 100 performs first luminance conversion that converts the linear signal converted by HDR EOTF converter 101 by using the display characteristic information and content luminance information (S102). In the first luminance conversion, the luminance value compatible with the luminance range of HDR (hereinafter referred to as "luminance value of HDR") is converted into the luminance value compatible with the luminance range of the display (hereinafter referred to as "display luminance value"). Details will be described later.

From the aforementioned description, HDR EOTF converter 101 functions as an acquisition unit that acquires the HDR signal as a first luminance signal indicating the code value obtained by quantization of the luminance value of a video. In addition, HDR EOTF converter 101 and luminance converter 102 function as a converter that converts the code value indicated by the HDR signal acquired by the acquisition unit into the display luminance value compatible with the luminance range of the display determined based on the luminance range of the display (display apparatus 200), which is a maximum value (DPL) smaller than a maximum value (HPL) of the luminance range of HDR and larger than 100 nit.

More specifically, in step S101, HDR EOTF converter 101 uses the acquired HDR signal and EOTF of HDR to determine the luminance value of HDR associated with the code value of HDR by EOTF of HDR, the code value of HDR being a first code value indicated by the acquired HDR signal. Note that the HDR signal indicates the code value of HDR obtained by quantization of the luminance value of a video (content) by using inverse EOTF of HDR that associates the luminance value in the luminance range of HDR with the plurality of HDR code values.

In step S102, regarding the luminance value of HDR determined in step S101, luminance converter 102 performs the first luminance conversion that determines the display luminance value compatible with the luminance range of the display associated with the luminance value of HDR in advance, and converts the luminance value of HDR compatible with the HDR luminance range into the display luminance value compatible with the luminance range of the display.

Before step S102, conversion apparatus 100 acquires content luminance information including at least one of a maximum value of luminance (CPL: Content Peak luminance) of a video (content) and an average luminance value (CAL: Content Average luminance) of a video as information regarding the HDR signal. CPL (first maximum luminance value) is, for example, a maximum value of the luminance values of a plurality of images that constitute the HDR video. CAL is, for example, an average luminance value which is an average of the luminance values of the plurality of images that constitute the HDR video.

In addition, before step S102, conversion apparatus 100 acquires the display characteristic information on display apparatus 200 from display apparatus 200. Note that the display characteristic information is information indicating the display characteristic of display apparatus 200, such as a maximum value of luminance that display apparatus 200 can display (DPL), display mode (refer to later description) of display apparatus 200, and input-output characteristic (EOTF supported by the display apparatus).

In addition, conversion apparatus 100 may transmit recommended display setting information (refer to later description, and hereinafter sometimes referred to as "setting information") to display apparatus 200.

Next, inverse luminance converter 103 of conversion apparatus 100 performs inverse luminance conversion according to the display mode of display apparatus 200. Accordingly, inverse luminance converter 103 performs second luminance conversion that converts the luminance value compatible with the luminance range of the display into the luminance value compatible with the luminance range of SDR (0 to 100 [nit]) (S103). Details will be described later. That is, regarding the display luminance value obtained in step S102, inverse luminance converter 103 performs the second luminance conversion that determines the luminance value compatible with SDR (hereinafter referred to as "SDR luminance value") as a third luminance value compatible with the luminance range of SDR with the maximum value of 100 nit associated with the display luminance value in advance, and converts the display luminance value compatible with the luminance range of the display into the SDR luminance value compatible with the luminance range of SDR.

Then, inverse SDR EOTF converter 104 of conversion apparatus 100 performs inverse SDR EOTF conversion to generate the pseudo HDR video (S104). That is, inverse SDR EOTF converter 104 uses inverse EOTF (Electro-Optical Transfer Function) of SDR (Standard Dynamic Range), which is third correspondence information that associates the luminance value in the luminance range of HDR with a plurality of third code values, to quantize the determined luminance value of SDR, determines the third code value obtained by quantization, and converts the luminance value of SDR compatible with the luminance range of SDR into the SDR signal as a third luminance signal indicating the third code value, thereby generating the pseudo HDR signal. Here, each of the third code values is a code value compatible with SDR, and hereinafter referred to as "code value of SDR". That is, the SDR signal is expressed by the code value of SDR obtained by quantization of the luminance value of a video by using inverse EOTF of SDR that associates the luminance value in the luminance range of SDR with the plurality of code values of SDR. Then, conversion apparatus 100 outputs the pseudo HDR signal (SDR signal) generated in step S104 to display apparatus 200.

Conversion apparatus 100 performs the first luminance conversion and the second luminance conversion on the luminance value of HDR obtained by performing inverse quantization on the HDR signal to generate the luminance value of SDR compatible with pseudo HDR. Conversion apparatus 100 quantizes the luminance value of SDR by using EOTF of SDR to generate the SDR signal compatible with pseudo HDR. Although the luminance value of SDR is a numerical value within the luminance range of 0 to 100 nit compatible with SDR, since conversion based on the luminance range of the display is performed, the luminance value of SDR is a numerical value different from the luminance value within the luminance range of 0 to 100 nit compatible with SDR obtained by performing the luminance conversion using EOTF of HDR and EOTF of SDR on the luminance value of HDR.

Next, the display method to be performed by display apparatus 200 will be described with reference to FIG. 39. Note that the display method includes step S105 to step S108 described below.

First, display setting unit 201 of display apparatus 200 uses the setting information acquired from conversion apparatus 100 to set display settings of display apparatus 200 (S105). Here, display apparatus 200 is the SDR TV. The setting information is information indicating display settings recommended to the display apparatus, and is information indicating how to perform EOTF on the pseudo HDR video and which display settings to use for displaying a beautiful video (that is, information for switching the display settings of display apparatus 200 to optimal display settings). The setting information includes, for example, a gamma curve characteristic of output in the display apparatus, display modes such as a living mode (normal mode) and dynamic mode, and a numerical value of a back light (brightness). In addition, a message may be displayed on display apparatus 200 for prompting the user to change the display settings of display apparatus 200 (hereinafter sometimes referred to as "SDR display") by manual operation. Details will be described later.

Note that, before step S105, display apparatus 200 acquires the SDR signal (pseudo HDR signal) and the setting information indicating the display settings recommended to display apparatus 200 in displaying a video.

Display apparatus 200 only needs to acquire the SDR signal (pseudo HDR signal) before step S106, and may acquire the SDR signal after step S105.

Next, SDR EOTF converter 202 of display apparatus 200 performs EOTF conversion of SDR on the acquired pseudo HDR signal (S106). That is, SDR EOTF converter 202 performs inverse quantization on the SDR signal (pseudo HDR signal) by using EOTF of SDR. Accordingly, SDR EOTF converter 202 converts the code value of SDR indicated by the SDR signal into the luminance value of SDR.

Then, luminance converter 203 of display apparatus 200 performs the luminance conversion according to the display mode that is set for display apparatus 200. Accordingly, luminance converter 203 performs third luminance conversion that converts the luminance value of SDR compatible with the luminance range of SDR (0 to 100 [nit]) into the display luminance value compatible with the luminance range of the display (0 to DPL [nit]) (S107). Details will be described later.

As described above, in step S106 and step S107, display apparatus 200 converts the third code value indicated by the acquired SDR signal (pseudo HDR signal) into the display luminance value compatible with the luminance range of the display (0 to DPL [nit]) by using the setting information acquired in step S105.

More specifically, in the conversion from the SDR signal (pseudo HDR signal) into the display luminance value, in step S106, by using EOTF that associates the luminance value in the luminance range of SDR with the plurality of third code values, display apparatus 200 determines the luminance value of SDR associated with the code value of SDR indicated by the acquired SDR signal by EOTF of SDR.

Then, in the conversion into the display luminance value, in step S107, display apparatus 200 performs the third luminance conversion that determines the display luminance value compatible with the luminance range of the display associated in advance with the determined luminance value of SDR, and converts the luminance value of SDR compatible with the luminance range of SDR into the display luminance value compatible with the luminance range of the display.

Finally, display unit 204 of display apparatus 200 displays the pseudo HDR video on display apparatus 200 based on the converted display luminance value (S108).

35. First Luminance Conversion

Figure 40A:
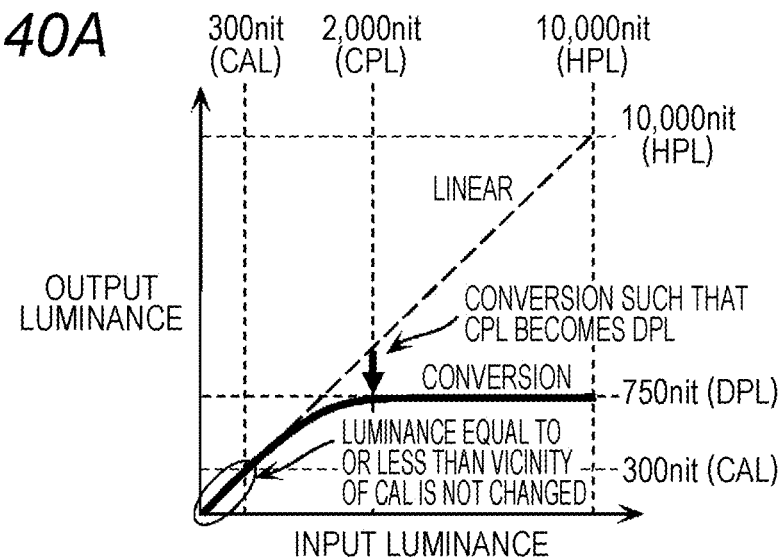
FIG. 40A is a diagram illustrating first luminance conversion.

Next, details of the first luminance conversion (HPL to DPL) of step S102 will be described with reference to FIG. 40A. FIG. 40A is a diagram illustrating an example of the first luminance conversion.

Luminance converter 102 of conversion apparatus 100 performs the first luminance conversion of converting the linear signal (luminance value of HDR) obtained in step S101 by using the display characteristic information and the content luminance information on the HDR video. The first luminance conversion converts the luminance value of HDR (input luminance value) into the display luminance value (output luminance value) that does not exceed the display peak luminance (DPL). DPL is determined using the maximum luminance of the SDR display and the display mode which are the display characteristic information. The display mode is, for example, mode information including a theater mode of relatively dark display on the SDR display and a dynamic mode of relatively bright display. When the display mode is, for example, a mode in which the maximum luminance of the SDR display is 1,500 nit, and the display mode is a mode in which brightness is set to 50% of the maximum luminance, DPL will be 750 nit. Here, DPL (second maximum luminance value) is a maximum value of luminance the SDR display can display in the display mode of current setting. That is, in the first luminance conversion, DPL as the second maximum luminance value is determined by using the display characteristic information which is information indicating the display characteristic of the SDR display.

In addition, in the first luminance conversion, CAL and CPL out of the content luminance information are used. The luminance value equal to or less than vicinity of CAL is identical between before and after the conversion, and only the luminance value equal to or greater than vicinity of CPL is changed. That is, as illustrated in FIG. 40A, in the first luminance conversion, when the luminance value of HDR is equal to or less than CAL, the luminance value of HDR is not converted, and the luminance value of HDR is determined as the display luminance value. When the luminance value of HDR is equal to or greater than CPL, DPL as the second maximum luminance value is determined as the display luminance value.

In addition, in the first luminance conversion, out of the luminance information, the peak luminance of the HDR video (CPL) is used. When the luminance value of HDR is CPL, DPL is determined as the display luminance value.

Figure 40B:
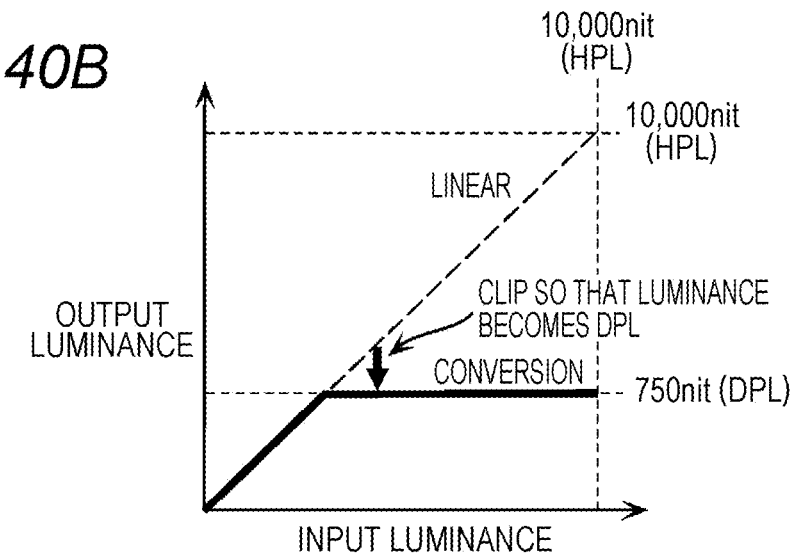
FIG. 40B is a diagram illustrating another example of the first luminance conversion.

Note that, in the first luminance conversion, as illustrated in FIG. 40B, conversion may be performed so that the linear signal (luminance value of HDR) obtained in step S101 may be clipped to a value that does not exceed DPL. Such luminance conversion can simplify processing performed by conversion apparatus 100, and can achieve size reduction, low power consumption, and high-speed processing of the apparatuses. Note that FIG. 40B is a diagram illustrating another example of the first luminance conversion.

36-1. Second Luminance Conversion

Figure 41:
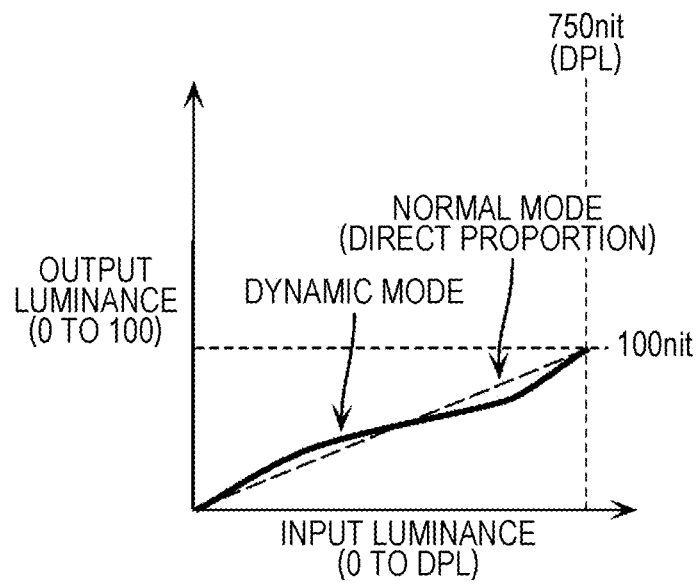
FIG. 41 is a diagram illustrating second luminance conversion.

Next, details of the second luminance conversion of step S103 (DPL to 100 [nit]) will be described with reference to FIG. 41. FIG. 41 is a diagram illustrating the second luminance conversion.

Inverse luminance converter 103 of conversion apparatus 100 applies inverse luminance conversion according to the display mode to the display luminance value in the luminance range of the display converted in the first luminance conversion of step S102 (0 to DPL [nit]). The inverse luminance conversion is processing for acquiring the display luminance value in the luminance range of the display after processing of step S102 (0 to DPL [nit]) when the luminance conversion processing (step S107) according to the display mode is performed by the SDR display. That is, the second luminance conversion is the inverse luminance conversion of the third luminance conversion.

By the aforementioned processing, the second luminance conversion converts the display luminance value in the luminance range of the display (input luminance value) into the luminance value of SDR in the luminance range of SDR (output luminance value).

In the second luminance conversion, a conversion equation is switched according to the display mode of the SDR display. For example, when the display mode of the SDR display is the normal mode, the luminance conversion is performed to a direct proportion value in direct proportion to the display luminance value. In the second luminance conversion, when the display mode of the SDR display is the dynamic mode in which a high-luminance pixel becomes brighter and a low-luminance pixel becomes darker than pixels in the normal mode, the luminance conversion is performed by using an inverse function thereof so that the luminance value of SDR of the low-luminance pixel is converted into a value higher than the direct proportion value in direct proportion to the display luminance value, and that the luminance value of SDR of the high-luminance pixel is converted into a value lower than the direct proportion value in direct proportion to the display luminance value. That is, in the second luminance conversion, regarding the display luminance value determined in step S102, by using luminance-related information according to the display characteristic information which is information indicating the display characteristic of the SDR display, the luminance value associated with the display luminance value is determined as the luminance value of SDR, and the luminance conversion processing is switched according to the display characteristic information. Here, the luminance-related information according to the display characteristic information refers, for example as illustrated in FIG. 41, to information that associates the display luminance value (input luminance value) with the luminance value of SDR (output luminance value) defined for each display parameter of the SDR display (display mode).

36-2. Third Luminance Conversion

Figure 42:
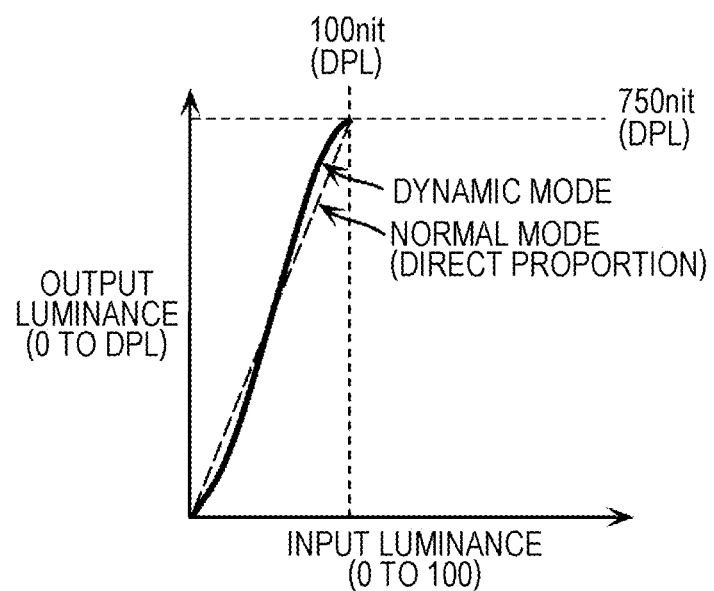
FIG. 42 is a diagram illustrating third luminance conversion.

Next, details of the third luminance conversion of step S107 (100 to DPL [nit]) will be described with reference to FIG. 42. FIG. 42 is a diagram illustrating the third luminance conversion.

Luminance converter 203 of display apparatus 200 converts the luminance value of SDR in the luminance range of SDR (0 to 100 [nit]) into (0 to DPL [nit]) according to the display mode that is set in step S105. This processing is performed so as to become an inverse function of the inverse luminance conversion for each mode of S103.

In the third luminance conversion, the conversion equation is switched according to the display mode of the SDR display. For example, when the display mode of the SDR display is the normal mode (that is, when the set display parameter is a parameter compatible with the normal mode), the luminance conversion of the display luminance value is performed to the direct proportion value in direct proportion to the luminance value of SDR. In the third luminance conversion, when the display mode of the SDR display is the dynamic mode in which a high-luminance pixel becomes brighter and a low-luminance pixel becomes darker than pixels in the normal mode, the luminance conversion is performed so that the display luminance value of the low-luminance pixel is converted into a value lower than the direct proportion value in direct proportion to the luminance value of SDR, and that the display luminance value of the high-luminance pixel is converted into a value higher than the direct proportion value in direct proportion to the luminance value of SDR. That is, in the third luminance conversion, regarding the luminance value of SDR determined in step S106, by using luminance-related information according to the display parameter indicating the display settings of the SDR display, the luminance value associated in advance with the luminance value of SDR is determined as the display luminance value, and the luminance conversion processing is switched according to the display parameter. Here, the luminance-related information according to the display parameter refers, for example as illustrated in FIG. 42, to information that associates the luminance value of SDR (input luminance value) with the display luminance value (output luminance value) defined for each display parameter of the SDR display (display mode).

37. Display Settings

Figure 43:
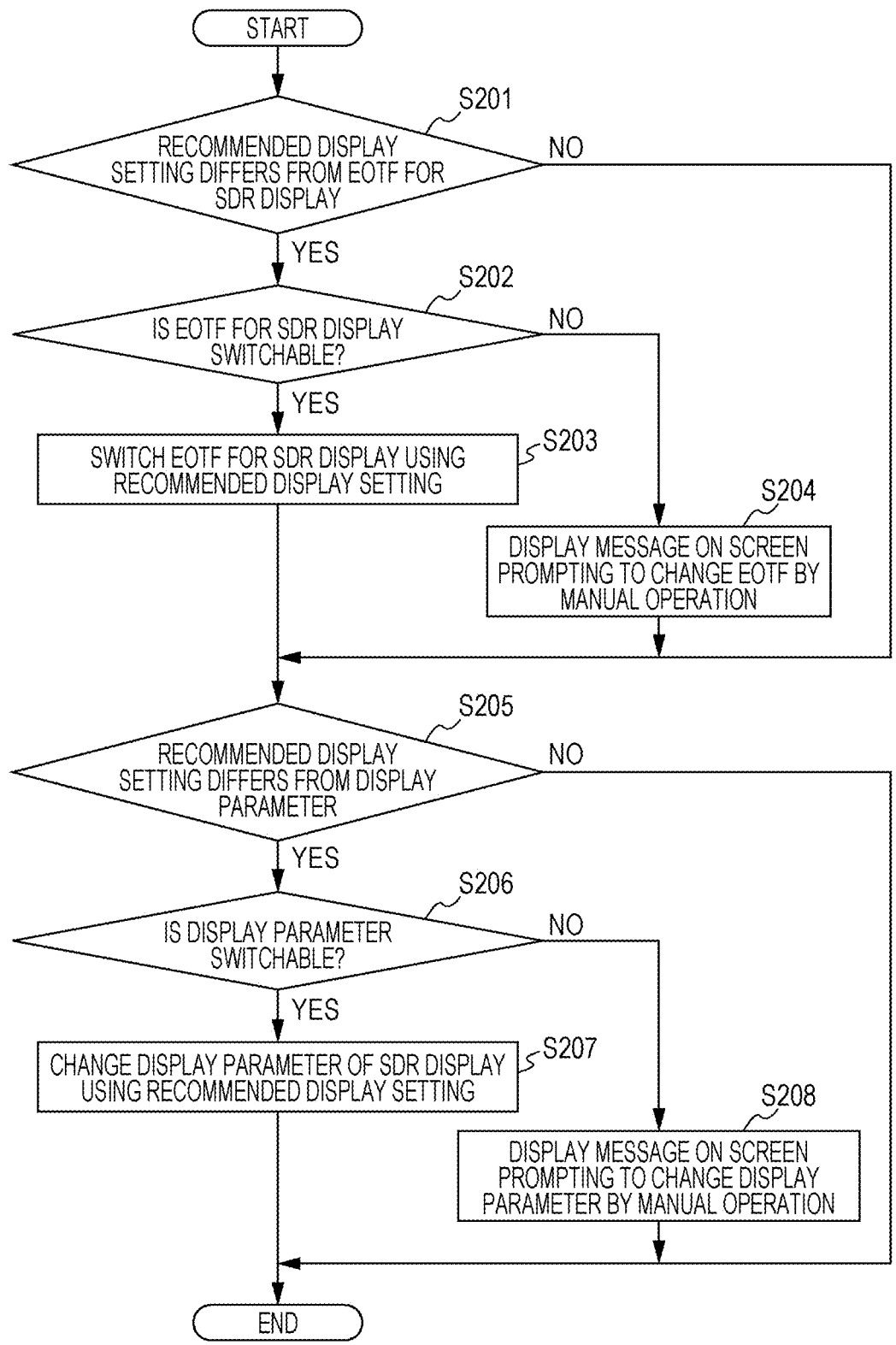
FIG. 43 is a flowchart illustrating detailed processing of display settings.

Next, details of the display settings of step S105 will be described with reference to FIG. 43. FIG. 43 is a flowchart illustrating detailed processing of the display settings.

In step S105, display setting unit 201 of the SDR display performs step S201 to step S208 described below.

First, display setting unit 201 uses the setting information to determine whether EOTF that is set for the SDR display (EOTF for SDR display) is consistent with EOTF assumed at a time of generation of the pseudo HDR video (SDR signal) (S201).

When display setting unit 201 determines that EOTF that is set for the SDR display differs from EOTF indicated by the setting information (EOTF consistent with the pseudo HDR video) (Yes in S201), display setting unit 201 determines whether EOTF for the SDR display is switchable on a system side (S202).

When display setting unit 201 determines that EOTF for the SDR display is switchable, display setting unit 201 uses the setting information to switch EOTF for the SDR display to appropriate EOTF (S203).

From step S201 to step S203, in setting of the display settings (S105), display setting unit 201 sets EOTF that is set for the SDR display as recommended EOTF according to the acquired setting information. This allows determination of the luminance value of SDR by using the recommended EOTF in step S106 to be performed after step S105.

When display setting unit 201 determines that EOTF for the SDR display is not switchable on the system side (No in S202), display setting unit 201 displays a message on a screen prompting the user to change EOTF by manual operation (S204). For example, display setting unit 201 displays a message on the screen saying "Set display gamma to 2.4". That is, when display setting unit 201 cannot switch EOTF that is set for the SDR display in setting of the display settings (S105), display setting unit 201 displays the message on the SDR display for prompting the user to switch EOTF that is set for the SDR display (EOTF for the SDR display) to the recommended EOTF.

Next, although the SDR display displays the pseudo HDR video (SDR signal), before the display, display setting unit 201 uses the setting information to determine whether the display parameter of the SDR display matches the setting information (S205).

When display setting unit 201 determines that the display parameter that is set for the SDR display differs from the setting information (Yes in S205), display setting unit 201 determines whether the display parameter of the SDR display is switchable (S206).

When display setting unit 201 determines that the display parameter of the SDR display is switchable (Yes in S206), display setting unit 201 switches the display parameter of the SDR display in accordance with the setting information (S207).

From step S204 to step S207, in setting of the display settings (S105), display setting unit 201 sets the display parameter that is set for the SDR display as a recommended display parameter according to the acquired setting information.

When display setting unit 201 determines that the display parameter of the SDR display is not switchable on the system side (No in S206), display setting unit 201 displays a message on the screen prompting the user to change the display parameter that is set for the SDR display by manual operation (S208). For example, display setting unit 201 displays a message on the screen saying "Set display mode to dynamic mode, and increase back light to maximum level". That is, in setting (S105), when the display parameter that is set for the SDR display cannot be switched, display setting unit 201 displays the message on the SDR display for prompting the user to switch the display parameter that is set for the SDR display to the recommended display parameter.

38. Variation 1

As described above, the exemplary embodiment has been described by way of example of the technique to be disclosed in this application. However, the technique in the present disclosure is not limited to this example, and is also applicable to the first exemplary embodiment to which change, replacement, addition, omission, etc. are made as appropriate. It is also possible to make a new exemplary embodiment by combining components described in the aforementioned exemplary embodiment.

Therefore, other exemplary embodiment will be illustrated below.

The HDR video is, for example, a video within a Blu-ray disc, DVD, video delivery site on the Internet, broadcast, and HDD.

Conversion apparatus 100 (HDR to pseudo HDR conversion processor) may exist within a disc player, disc recorder, set-top box, TV, personal computer, and smart phone. Conversion apparatus 100 may exist within a server apparatus on the Internet.

Display apparatus 200 (SDR display unit) is, for example, a TV, personal computer, and smart phone.

The display characteristic information to be acquired by conversion apparatus 100 may be acquired from display apparatus 200 through an HDMI cable or LAN cable by using HDMI or other communication protocols. As the display characteristic information to be acquired by conversion apparatus 100, display characteristic information included in model information on display apparatus 200, etc. may be acquired via the Internet. The user may perform manual operation to set the display characteristic information in conversion apparatus 100. Acquisition of the display characteristic information by conversion apparatus 100 may be performed immediately before pseudo HDR video generation (steps S101 to S104), and may be performed with timing of initial setting of a device or display connection. For example, acquisition of the display characteristic information may be performed immediately before conversion into the display luminance value, and may be performed with timing with which conversion apparatus 100 is connected to display apparatus 200 with an HDMI cable for the first time.

One set of information items including CPL and CAL of the HDR video may exist per one piece of content, and may exist for each scene. That is, in the conversion method may be acquired luminance information (CPL, CAL) compatible with each of a plurality of scenes in a video, the luminance information including, for each of the scenes, at least one of a first maximum luminance value which is a maximum value out of the luminance values of a plurality of images that constitute the scene, and an average luminance value which is an average of the luminance values of the plurality of images that constitute the scene. In the first luminance conversion, the display luminance value may be determined in accordance with luminance information corresponding to each of the plurality of scenes.

CPL and CAL may be provided in a medium (such as a Blu-ray disc and DVD) identical to a medium of the HDR video, and may be acquired from a place different from the HDR video, such as conversion apparatus 100 acquires CPL and CAL from the Internet. That is, the luminance information including at least one of CPL and CAL may be acquired as metadata information on the video, and may be acquired via a network.

In the first luminance conversion of conversion apparatus 100 (HPL to DPL), CPL, CAL, and the display peak luminance (DPL) may not be used, and fixed values may be used. The fixed values may be changeable from outside. CPL, CAL, and DPL may be switched among several types, for example, DPL may be only three types including, 200 nit, 400 nit, and 800 nit, and a value closest to the display characteristic information may be used.

EOTF of HDR may not be SMPTE 2084, and EOTF of HDR of another type may be used. The maximum luminance of the HDR video (HPL) may not be 10,000 nit, and may be, for example, 4,000 nit or 1,000 nit.

A bit width of the code value may be, for example, 16, 14, 12, 10, or 8 bits.

Although inverse EOTF conversion of SDR is determined from the display characteristic information, a fixed (changeable from outside) conversion function may be used. Inverse EOTF conversion of SDR may use, for example, a function prescribed by Rec. ITU-R BT.1886. Types of inverse EOTF conversion of SDR may be limited to several types, and a type closest to an input-output characteristic of display apparatus 200 may be selected and used.

A fixed mode may be used as the display mode, and the display mode may not be included in the display characteristic information.

Conversion apparatus 100 may not transmit the setting information, display apparatus 200 may use fixed display settings, and may not change the display settings. In this case, display setting unit 201 is unnecessary. The setting information may be flag information indicating whether a video is the pseudo HDR video, and for example, when a video is the pseudo HDR video, settings may be changed to brightest display. That is, in setting of the display settings (S105), when the acquired setting information indicates a signal indicating the pseudo HDR video that is converted using DPL, brightness settings of display apparatus 200 may be switched to settings of brightest display.

39. Variation 2

The first luminance conversion (HPL to DPL) of conversion apparatus 100 is performed by the next formula, for example.

Here, L denotes a luminance value normalized to 0 to 1, and S1, S2, a, b, and M are values to be set based on CAL, CPL, and DPL. ln is a natural logarithm. V is a converted luminance value normalized to 0 to 1. As in the example of FIG. 40A, when CAL is 300 nit, CPL is 2,000 nit, DPL is 750 nit, conversion is not performed until CAL+50 nit, and conversion is performed for 350 nit or more, respective values are as follows, for example.

$$S1 = 350/10,000$$

$$S2 = 2,000/10,000$$

$$M = 750/10,000$$

$$a = 0.023$$

$$b = S1 - a*\ln(S1) = 0.112105$$

That is, in the first luminance conversion, when the luminance value of SDR is between the average luminance value (CAL) and the first maximum luminance value (CPL), the display luminance value corresponding to the luminance value of HDR is determined using a natural logarithm.

40. Advantageous Effects, Etc

By converting the HDR video by using information including the content peak luminance and content average luminance of the HDR video, the conversion equation may be changed according to content, and it is possible to perform conversion so that gradation of HDR may be maintained as much as possible. It is also possible to inhibit an adverse effect such as too dark and too bright. Specifically, by mapping the content peak luminance of the HDR video on the display peak luminance, gradation is maintained as much as possible. In addition, overall brightness is kept from changing by not changing a luminance value equal to or less than vicinity of the average luminance.

By using the peak luminance value and the display mode of the SDR display to convert the HDR video, the conversion equation may be changed in accordance with display environments of the SDR display. In accordance with performance of the SDR display, a video with feeling of HDR (pseudo HDR video) may be displayed with gradation and brightness similar to gradation and brightness of an original HDR video. Specifically, by determining the display peak luminance in accordance with the maximum luminance and display mode of the SDR display, and by converting the HDR video so as not to exceed the peak luminance value, the HDR video is displayed with little reduction in gradation of the HDR video until brightness that is displayable by the SDR display. For non-displayable brightness levels, the luminance value is decreased to a displayable brightness level.

This makes it possible to reduce non-displayable brightness information, and to display video in a form close to the original HDR video without reducing gradation of displayable brightness. For example, for a display with a peak luminance of 1,000 nit, overall brightness is maintained by conversion into the pseudo HDR video with a peak luminance reduced to 1,000 nit, and the luminance value changes depending on the display mode of the display. Therefore, the conversion equation of luminance is changed according to the display mode of the display. If luminance greater than the peak luminance of the display is allowed in the pseudo HDR video, such great luminance may be replaced with the peak luminance on the display side for display. In this case, the display becomes darker than the original HDR video on the whole. In contrast, when the conversion is performed with the luminance smaller than the peak luminance of the display as the maximum luminance, such small luminance is replaced with the peak luminance on the display side, and the display becomes brighter than the original HDR video on the whole. Moreover, this does not make the most of performance regarding gradation of the display because the luminance is smaller than the peak luminance on the display side.

On the display side, this makes it possible to better display the pseudo HDR video by switching the display settings by using the setting information. For example, when brightness is set to dark, high-luminance display is not possible, and thus feeling of HDR is impaired. In this case, by changing the display settings or by displaying a message prompting to change the display settings, maximum performance of the display is brought out, and a high-gradation video may be displayed.

OVERALL SUMMARY

Although the playback method and the playback apparatus according to one or more aspects of the present disclosure have been described above on the basis of the exemplary embodiment, the present disclosure is not limited to this exemplary embodiment. The exemplary embodiment to which various modifications conceivable by a person skilled in the art are made, and aspects that are made by combining elements of different exemplary embodiment may also be within the scope of the one or more aspects of the present disclosure as long as such aspects do not depart from the gist of the present disclosure.

For example, in the aforementioned exemplary embodiment, each component may be made of dedicated hardware such as a circuit, or may be implemented through execution of a software program suitable for each component. Each component may be implemented by a program execution unit, such as a CPU or a processor, reading and executing the software program recorded in a recording medium such as a hard disk or a semiconductor memory.

The present disclosure is applicable to content data generation apparatuses, video stream transmission apparatuses such as a Blu-ray device, or video display apparatuses such as a TV.

What is claimed is:

1. A playback apparatus connected to a display apparatus, the playback apparatus comprising:
   an input circuitry acquiring a video signal;
   a receiver receiving a first information from the display apparatus, the first information indicating a conversion scheme of luminance supported by the display apparatus;
   a luminance converter converting a luminance of the video signal;
   an output circuitry outputting the video signal; and
   a controller determining which of the display apparatus and the playback apparatus is to perform luminance conversion based on the first information and a second information which indicates a conversion scheme of luminance supported by the playback apparatus,
   wherein the output circuitry outputs the video signal whose luminance is converted by the luminance converter based on the second information when the controller determines that the playback apparatus is to perform luminance conversion, and the video signal is displayed on the display apparatus after being converted by the luminance converter, and
   wherein the output circuitry outputs the video signal whose luminance is not converted by the luminance converter when the controller determines that the display apparatus is to perform luminance conversion, and the video signal is displayed on the display apparatus after luminance conversion is performed by the display apparatus.

2. The playback apparatus according to claim 1, wherein the output circuitry outputs metadata which is necessary for converting the luminance using the conversion scheme indicated by the first information, in addition to the video signal whose luminance is not converted by the luminance converter.

* * * * *